(12) United States Patent
Yasuhara et al.

(10) Patent No.: US 6,478,701 B1
(45) Date of Patent: *Nov. 12, 2002

(54) BELT TYPE NONSTAGE TRANSMISSION SYSTEM

(75) Inventors: Sinji Yasuhara, Yamatokooriyama (JP); Yasuhiko Hasuda, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/341,480

(22) PCT Filed: Nov. 12, 1998

(86) PCT No.: PCT/JP98/05101

§ 371 (c)(1),
(2), (4) Date: Aug. 10, 2000

(87) PCT Pub. No.: WO99/25994

PCT Pub. Date: May 27, 1999

(30) Foreign Application Priority Data

Nov. 13, 1997 (JP) ............................ 9-312493
Nov. 13, 1997 (JP) ............................ 9-312494
Feb. 24, 1998 (JP) ............................ 10-42491

(51) Int. Cl.[7] ............................................. F16H 65/00
(52) U.S. Cl. ........................ 474/12; 474/110; 474/133; 474/135; 305/147
(58) Field of Search ........................... 474/12, 17, 109, 474/110, 133, 135, 101; 305/143, 145, 146; 91/47

(56) References Cited

U.S. PATENT DOCUMENTS 4,007,826 A * 2/1977 Brown, Jr. et al. ......... 198/813
5,055,089 A * 10/1991 Ojima ........................ 474/138
6,017,285 A * 1/2000 Yasuhara et al. ............. 474/12
6,036,612 A * 3/2000 Katogi et al. ............... 474/110

FOREIGN PATENT DOCUMENTS

| JP | 56-164269 | 12/1981 |
| JP | 63-193152 | 12/1988 |
| JP | 4-16029 | 2/1992 |
| JP | 5-500261 | 1/1993 |
| JP | 5-203005 | 8/1993 |
| JP | 9-89059 A | 3/1997 |

* cited by examiner

Primary Examiner—David A. Bucci
Assistant Examiner—Timothy McAnulty
(74) Attorney, Agent, or Firm—Rabin & Berdo, P.C.

(57) ABSTRACT

In a belt type continuously variable speed system, when a hydraulic cylinder (110) operates, the hydraulic cylinder (110) and an elastic member (134) in a tensioner (104) draw a belt (102) against an elastic member contained in a variable radius pulley (107). Consequently, a power transmission ring contained in the variable radius pulley (107) is made eccentric from the axis of the variable radius pulley. The power transmission ring is displaced to the position where a force produced by the hydraulic cylinder (110) and the elastic member (134) in the tensioner (104) to make the power transmission ring eccentric and a force produced by an elastic member contained in the variable radius pulley (107) to urge the power transmission ring toward a position which is concentric with the axis of the variable radius pulley (107) are balanced with each other, thereby achieving speed variation.

24 Claims, 40 Drawing Sheets

F I G. 11
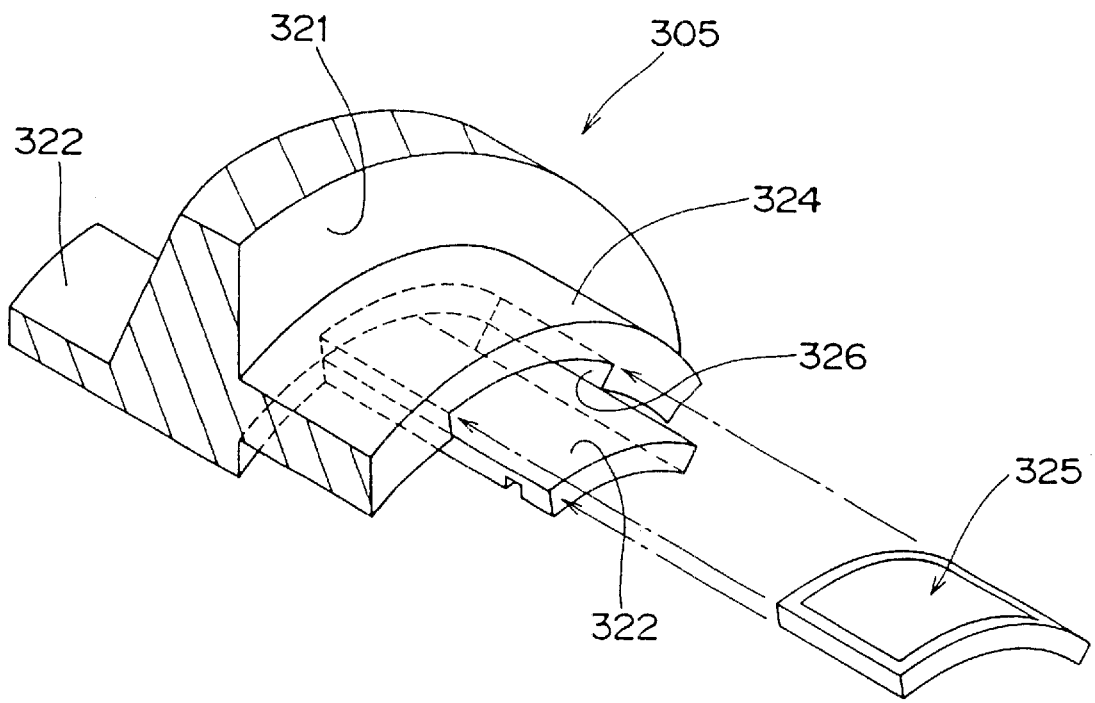

F I G. 18A
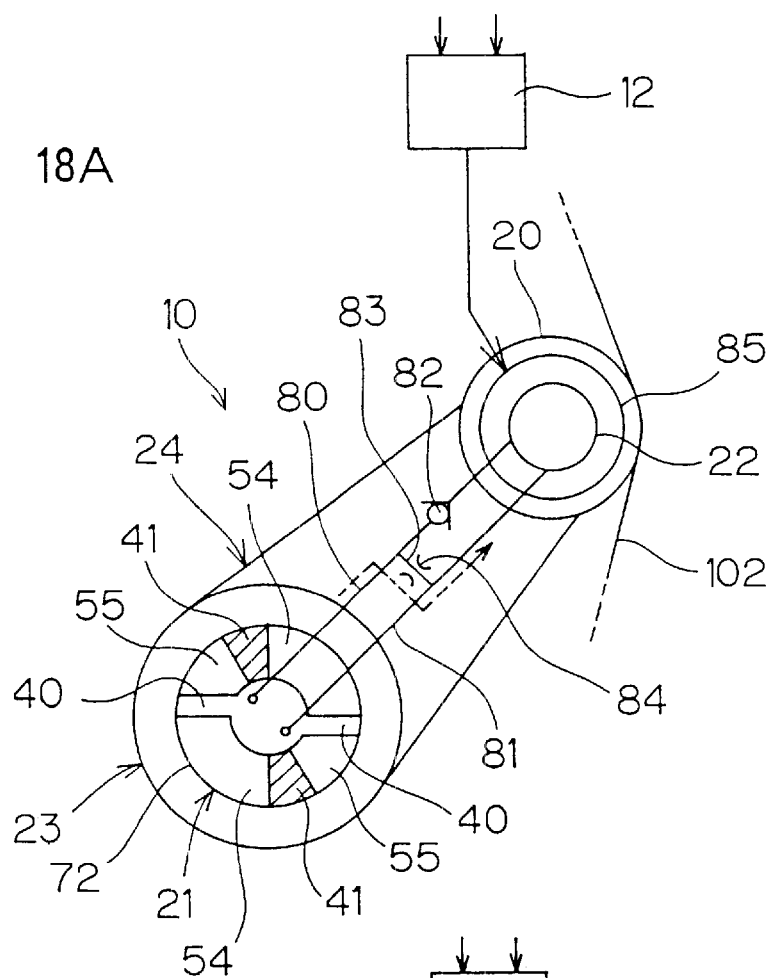
F I G. 18B
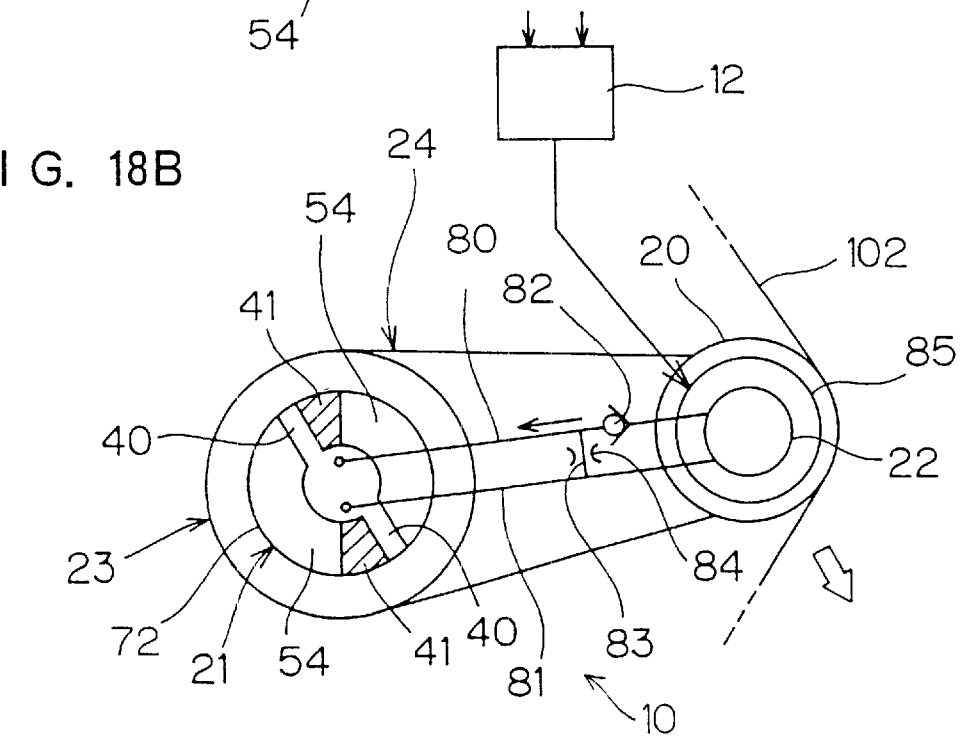

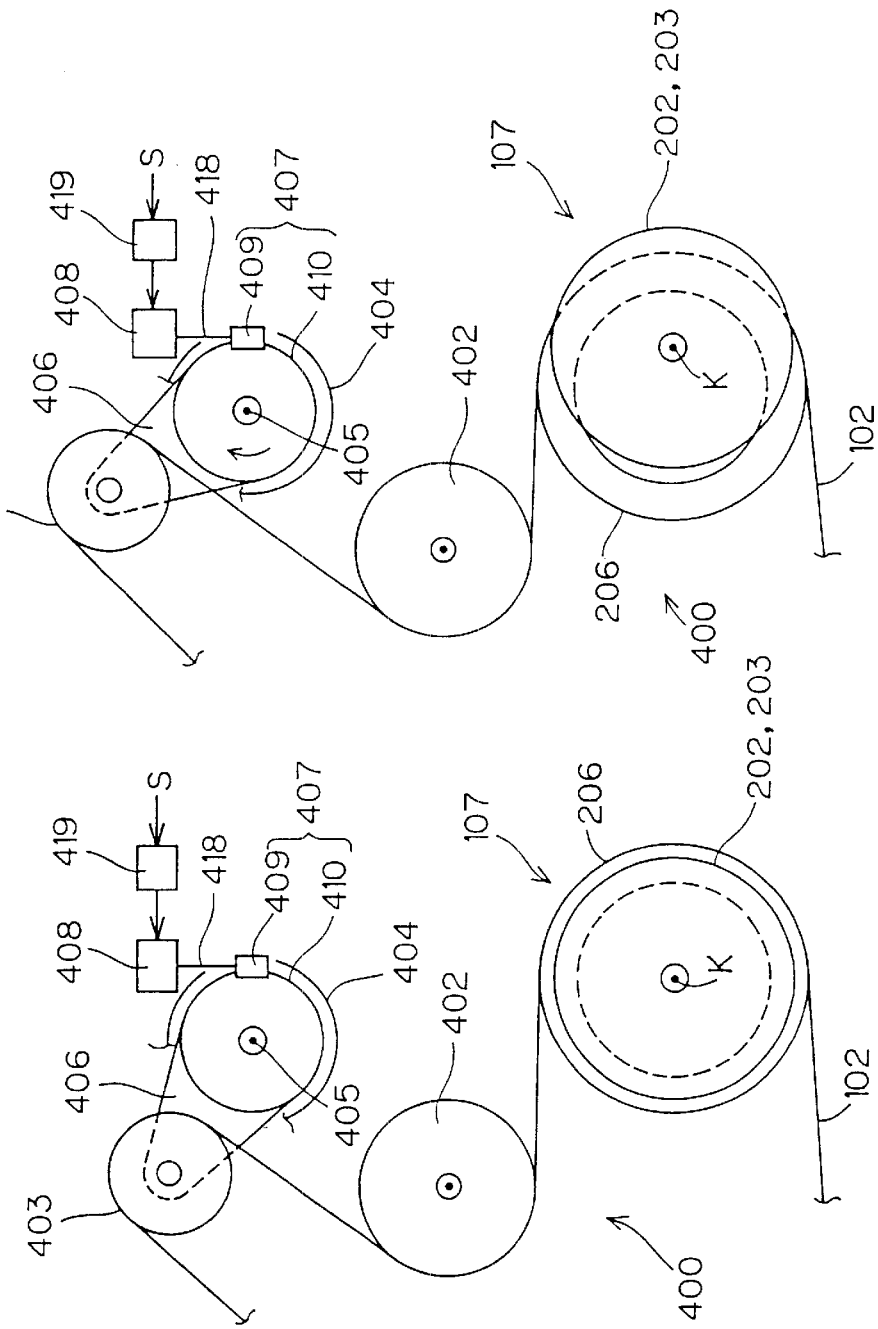

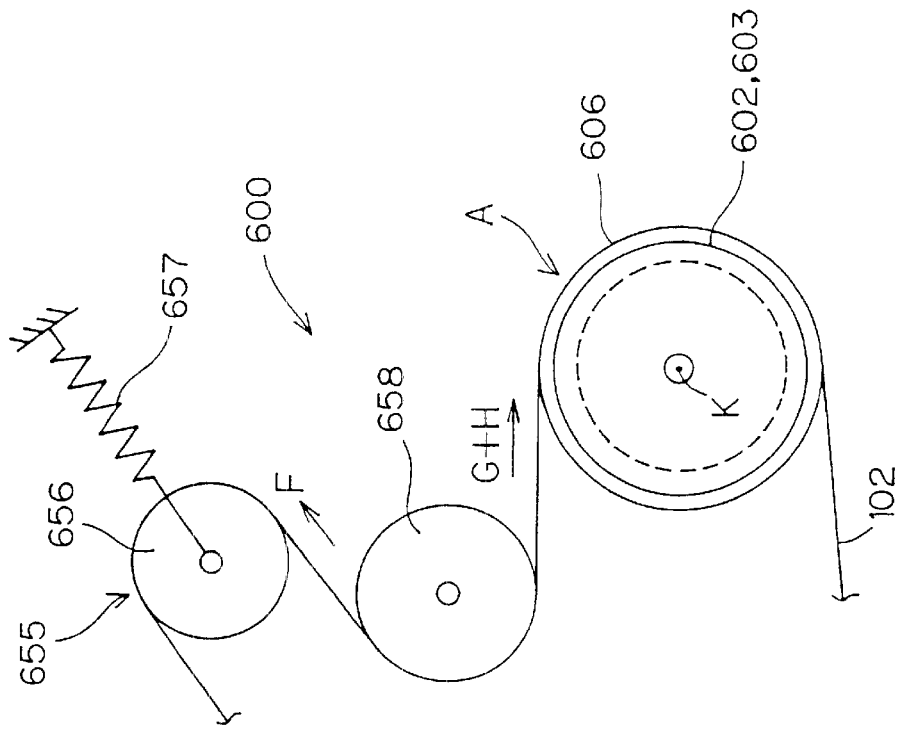
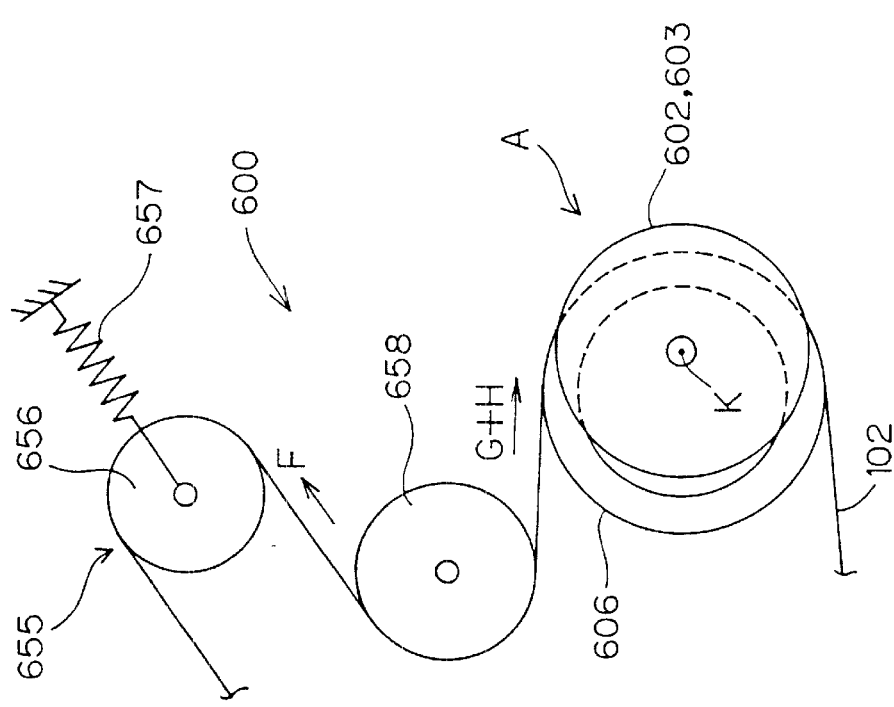

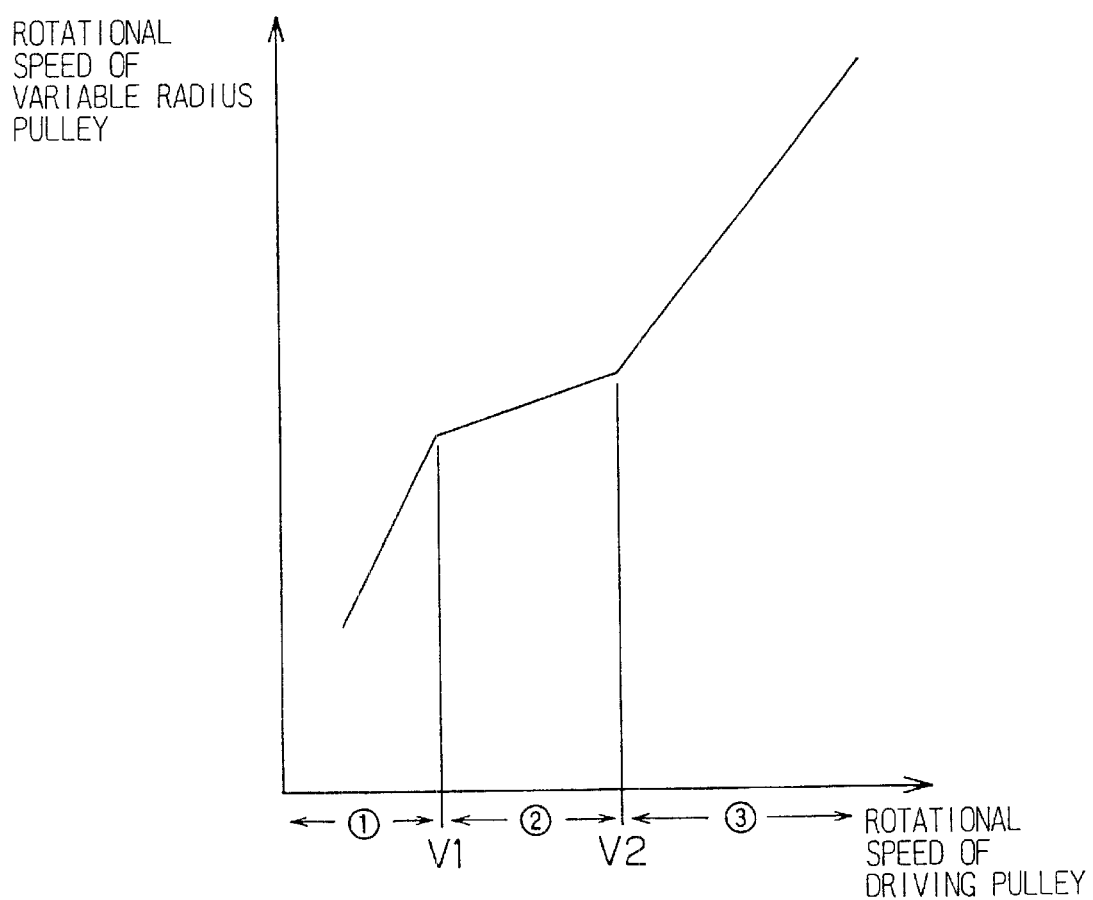

F I G. 35
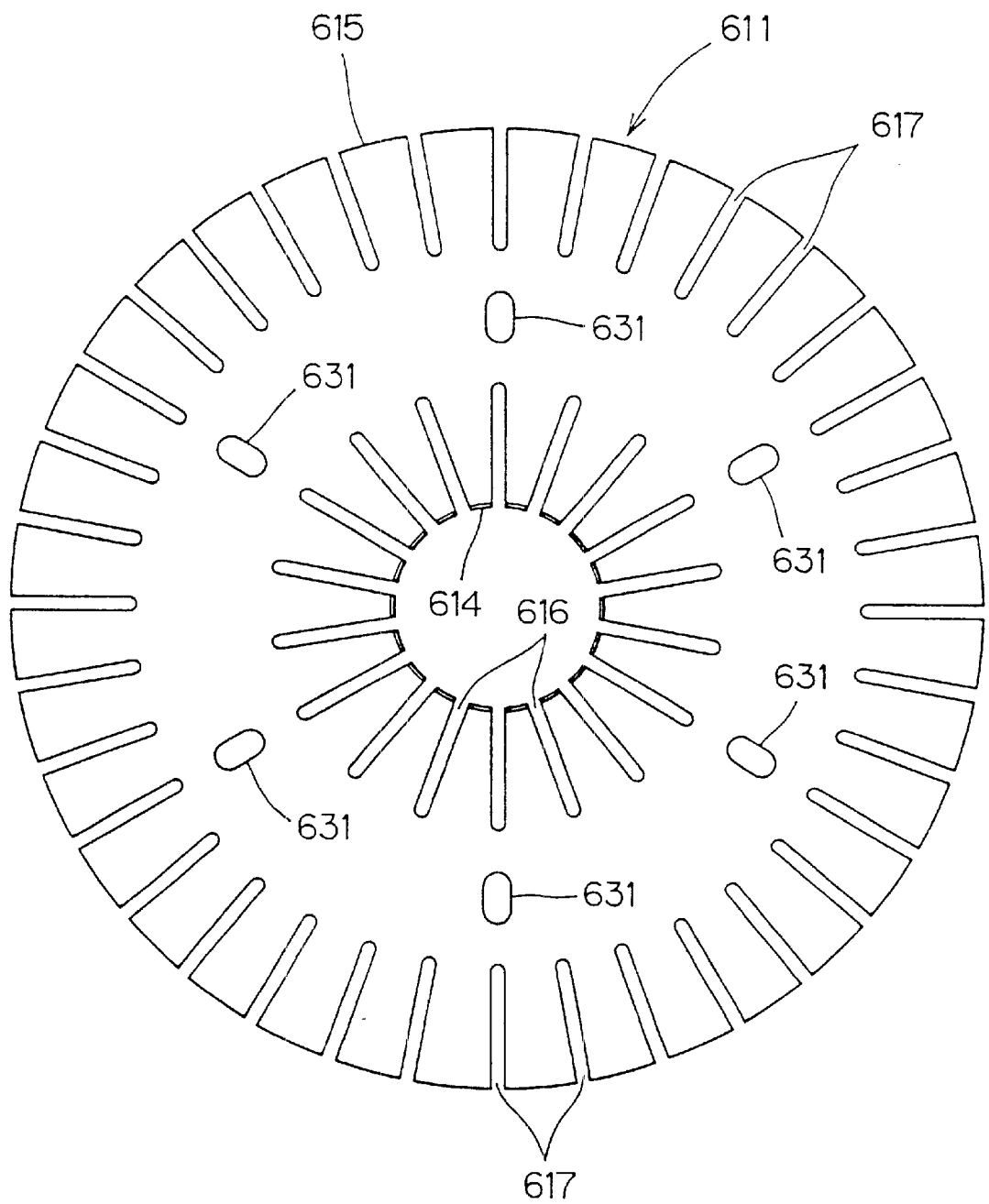

F I G. 36
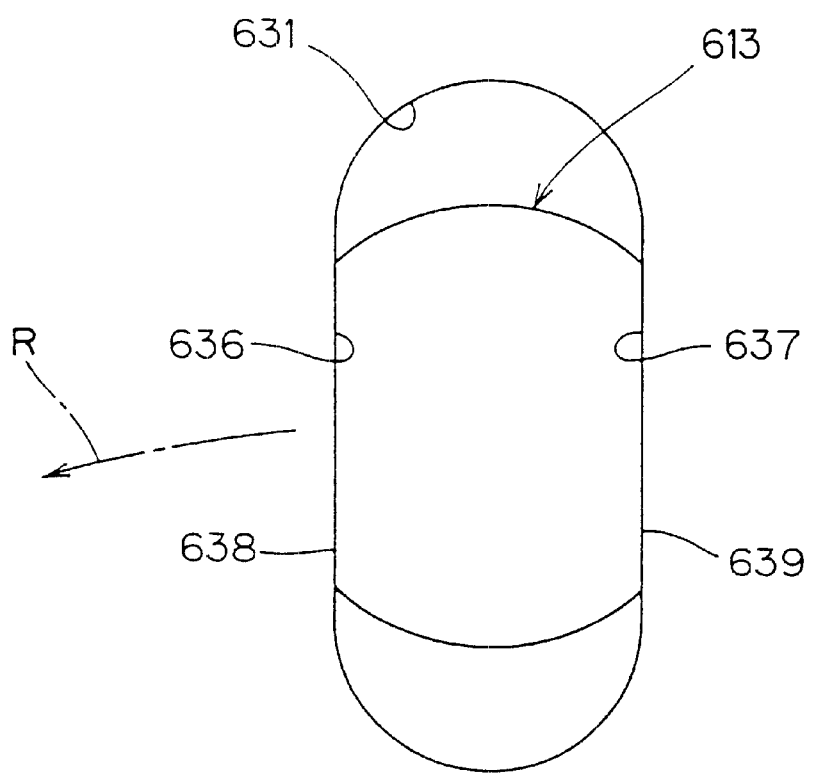

F I G. 37
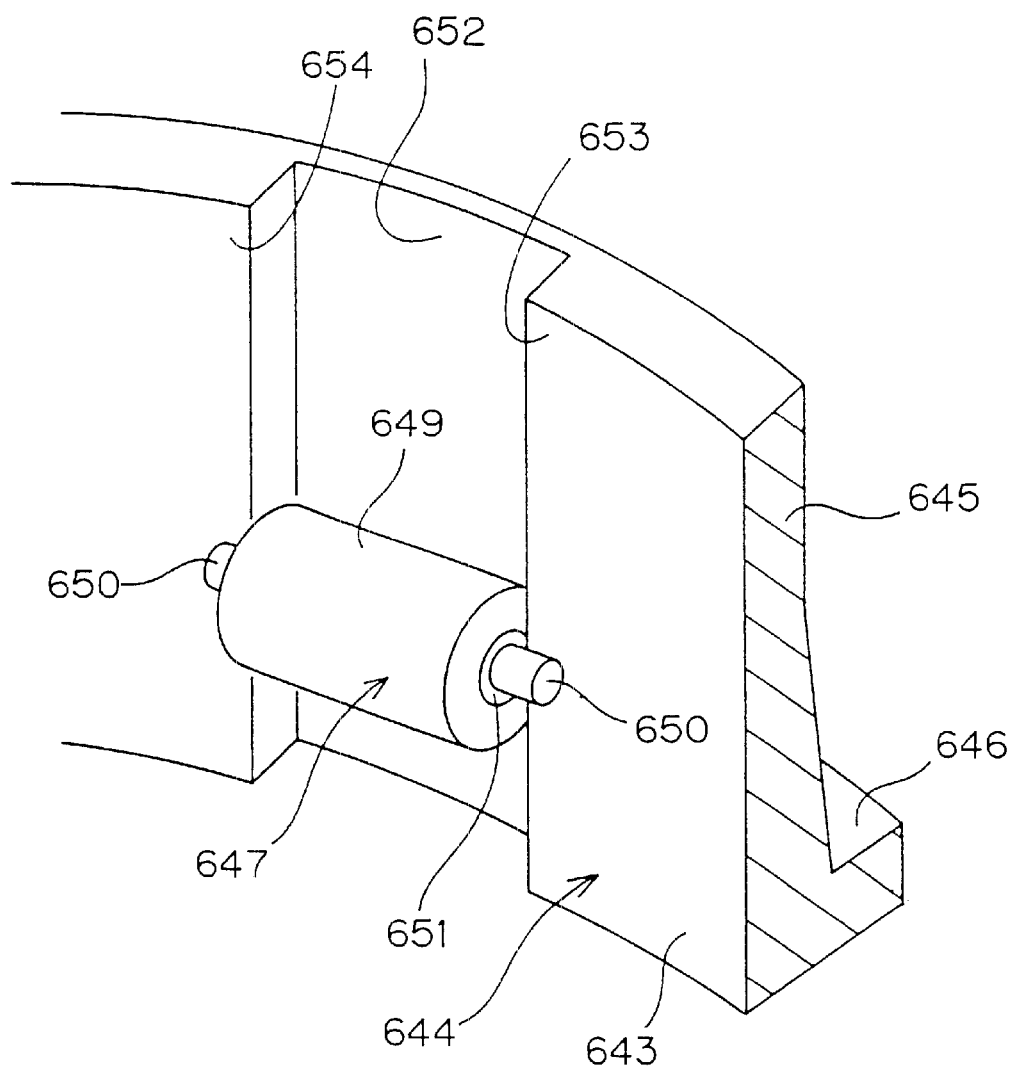

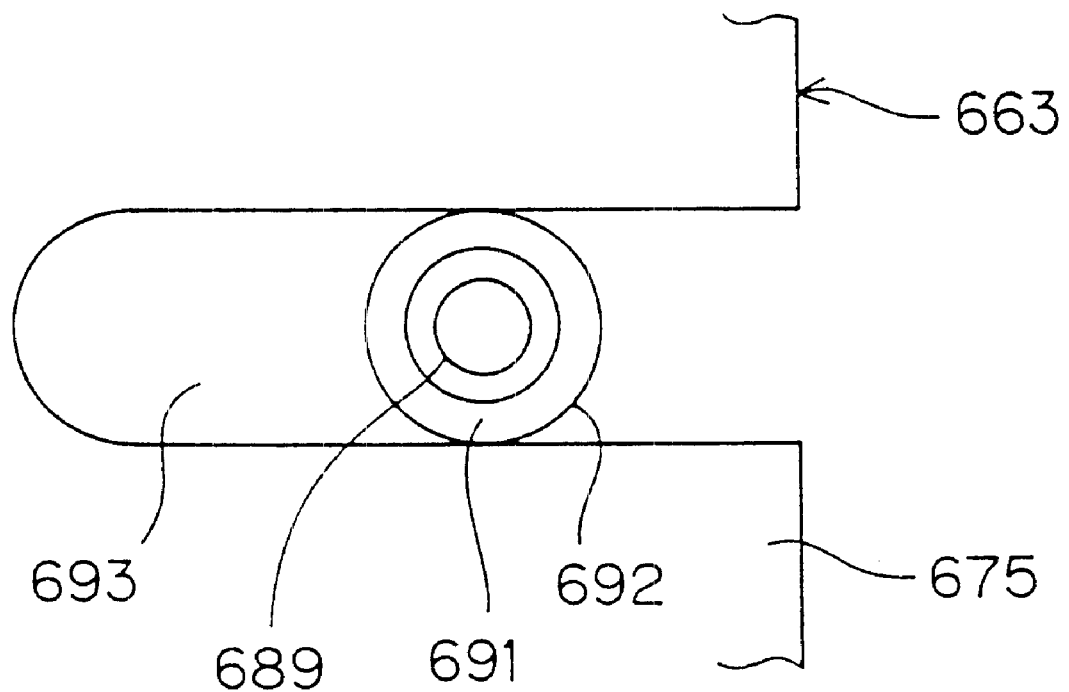
F I G. 39

BELT TYPE NONSTAGE TRANSMISSION SYSTEM

TECHNICAL FIELD

The present invention relates to a belt type continuously variable speed system using a variable radius pulley capable of changing the effective radius of a wound belt.

BACKGROUND ART

Conventionally, a belt transmission gear is used for driving auxiliary machines such as a car compressor, an alternator, a water pump, and an oil pump of an automobile.

In the belt transmission gear, a driving force is transmitted at a predetermined change gear ratio through a pulley and a belt from a crankshaft of an engine, and the number of revolutions of each of the auxiliary machines increases as the number of revolutions of the crankshaft increases. The efficiency of each of the auxiliary machines also increases as the number of revolutions thereof increases. Conversely, the efficiency decreases when the number of revolutions is not less than a predetermined number.

Consequently, to rotate the auxiliary machine any more than necessary uselessly expends energy, and also affects the durability of the auxiliary machine. Therefore, a belt transmission gear so adapted that the number of revolutions of the auxiliary machine can be adjusted has been proposed.

For example, there is a belt transmission gear disclosed in Japanese patent publication JP-A-500261. In the belt transmission gear in this publication, a variable radius pulley for changing the effective radius of a wound belt is used.

The variable radius pulley comprises a great number of belt engagement bars arranged in a circular pattern around a rotating shaft and elastically urged outward in the radial direction by urging means. The diameter of the circular pattern is the effective diameter of the variable radius pulley. The effective diameter of the variable radius pulley is changed by collectively moving the belt engagement bars inward in the radial direction against an urging force produced by the urging means.

Specifically, a lot of radial grooves extending in a spiral shape in opposite directions are respectively formed in a pair of rotating plates opposite to each other, and both ends of the belt engagement bar are respectively supported by the corresponding radial grooves of both the rotating plates. Consequently, each of the belt engagement bars can change the effective radius without changing the arrangement in the circular pattern as both the rotating plates relatively rotate. On the other hand, used as the urging means is a helical torsion coil spring interposed between both the rotating plates and rotating and urging both the rotating plates in the direction in which the effective radius is increased.

In the belt transmission gear in JP-A-5-500261, the above-mentioned great number of belt engaging bars are employed for the variable radius pulley, so that the number of components is large. Moreover, the diameter of the circular pattern must be changed in a state where the belt engagement bars are arranged in a circular pattern. Accordingly, the construction of the belt transmission gear becomes complicated. Therefore, smooth speed variation cannot be achieved.

For example, when the great number of belt engagement bars move in order to change the diameter of the circular pattern, frictional resistance is produced between both the ends of each of the belt engagement bars and the corresponding radial groove. Since there are two frictional portions per belt engagement bar, and the number of belt engagement bars is large, there are a lot of frictional portions. As a result, the frictional resistance is increased, thereby making it impossible to achieve smooth speed variation.

The present invention has been made in view of the above-mentioned problems, and has for its object to provide a belt type continuously variable speed system capable of achieving smooth speed variation.

DISCLOSURE OF THE INVENTION

In order to attain the above-mentioned object, in a preferred embodiment of the present invention, a. belt type continuously variable speed system comprises a variable radius pulley for changing the effective radius of a wound endless belt, and a tensioner for adjusting tension on the belt. The variable radius pulley comprises i) first and second pulley main bodies arranged around a rotating shaft and axially movable so that movable toward the shaft, ii) first and second tapered power transmission surfaces formed on opposite surfaces of the first and second pulley main bodies, iii) a power transmission ring interposed between the first and second power transmission surfaces such that it can be eccentric from the axis of the rotating shaft and having said belt wound around its outer peripheral surface, and iv) first urging means for urging the power transmission ring toward a position which is concentric with the axis through the first and second pulley main bodies. The tensioner comprises i) a fixed member, ii) a movable member which relatively moves from the fixed member, iii) a tensioner pulley supported so as to be rotatable by the movable member and engaged with the belt, and iv) second urging means for urging the tensioner pulley through the movable member in the direction in which the tension is given to the belt. At least one of the first and second urging means comprises means for changing the position where the power transmission ring operates. A force produced by the second urging means to make the power transmission ring eccentric from the axis through the belt and a force produced by the first urging means to urge the power transmission ring toward the position which is concentric with the axis are balanced with each other, so that the position where the power transmission ring operates is defined.

In the present embodiment, the power transmission ring is displaced to the position where the force produced by the second urging means in the tensioner to make the power transmission ring eccentric through the belt and the force produced by the first urging means in the variable radius pulley to urge the power transmission ring toward the position which is concentric with the rotating shaft are balanced with each other, to define the position where the power transmission ring is eccentric. Accordingly, the effective radius of the belt is changed. Speed variation is achieved using the balance between the forces through the belt, thereby making stable and smooth speed variation possible.

The second urging means may, in some cases, comprise an elastic member for giving the tension to the belt through the tensioner pulley, and an actuator for actively changing the position where the tension pulley operates through the variable member so as to adjust the tension on the belt.

In this case, it is preferable that a force produced by the elastic member in the tensioner to make the power transmission ring eccentric through the belt is smaller than a force produced by the urging means in the variable radius pulley to urge the power transmission ring toward the position which is concentric with the axis. The actuator may, in some cases, be a hydraulic actuator such as a hydraulic cylinder or a hydraulic motor. Further, the actuator may, in some cases, be an electric motor.

The first urging means may, in some cases, comprise an elastic member for urging the first and second pulley main bodies in the directions nearer to each other, and an inertia member displaced in the centrifugal direction depending on the rotational speed of the variable radius pulley to urge the first and second pulley main bodies in the directions nearer to each other, and the second urging means may, in some cases, comprise an elastic member for giving the tension to the belt through the tensioner pulley.

In this case, it is preferable that the force produced by the elastic member in the tensioner to make the power transmission ring eccentric through the belt is larger than the force produced by the elastic member in the variable radius pulley to urge the power transmission ring toward the position which is concentric with the axis. The elastic member in the first urging means may be a coil spring or a Belleville spring. The inertia member may, in some cases, be arranged in a containing space which narrows outward along the radius of the variable radius pulley.

The first urging means may, in some cases, comprise a hydraulic actuator such as a hydraulic cylinder or a hydraulic motor or an electric motor as means for changing the position where the power transmission ring operates.

BRIEF DESCRIPTION OF DRAWINGS

FIG. 11 is an exploded perspective view showing a state where a guide member is fitted in an outer peripheral surface of a fitting projection of a pulley main body in the variable radius pulley shown in FIG. 8;

FIGS. 18A and 18B are schematic plan views including a partial cross section which describes the operation of the tensioner shown in FIG. 17, where the cross section corresponds to a cross section taken along a line V—V shown in FIG. 17;

FIGS. 19A and 19B are schematic views of the construction of a principal part of a belt type continuously variable speed system according to a fourth embodiment of the present invention, where FIG. 19A illustrates a state before speed variation, and FIG. 19B illustrates a state after speed variation;

FIG. 26A illustrates a state before speed variation, and FIG. 26B illustrates a state after speed variation;

FIGS. 32A and 32B are schematic views of a principal part of a belt type continuously variable speed system in which the variable radius pulley shown in FIG. 31 is applied to a driven pulley, where FIG. 32A illustrates a state before speed variation, and FIG. 32B illustrates a state after speed variation;

FIG. 33 is a graph showing the relationship between the number of revolutions of a driving pulley and the number of revolutions of the variable radius pulley shown in FIG. 31;

FIG. 35 is a front view of a diaphragm spring in the variable radius pulley shown in FIG. 31;

FIG. 36 is a schematic view showing a pair of surfaces of a connecting hole in the diaphragm spring in the variable radius pulley shown in FIG. 31, engaged with a pair of surfaces of a connecting shaft;

FIG. 37 is a partial broken perspective view showing a principal part of an opposing member fixed to a second pulley main body in the variable radius pulley shown in FIG. 31;

FIG. 39 is a side view showing a part of an outer peripheral surface of a second pulley main body in the variable radius pulley shown in FIG. 38.

BEST MODE FOR CARRYING OUT THE INVENTION

Preferred embodiments of the present invention will be described while referring to the accompanying drawings.

First Embodiment

Referring now to FIGS. 1 to 7, description is made of a belt type continuously variable speed system according to a first embodiment of the present invention. In the first embodiment, the belt type continuously variable speed system is carried in an automobile, and is applied as an auxiliary machine driving system for driving auxiliary machines by a driving source of a vehicle. In the first embodiment, description is made by taking one auxiliary machine, for example, a driven pulley such as a supercharger as a variable radius pulley while conforming to a certain construction. However, it is also possible to take a driving pulley as a variable radius pulley. As the auxiliary machine, an air pump, an alternator, a compressor for an air conditioner, a hydraulic pump for a power steering system, and a water pump, for example, can be exemplified in addition to the above-mentioned supercharger. The system can be constructed as a system for driving a plurality of auxiliary machines. In this case, in one system, one, two, or more driven pulleys can be taken as variable radius pulleys.

Overall Construction

Figure 1:
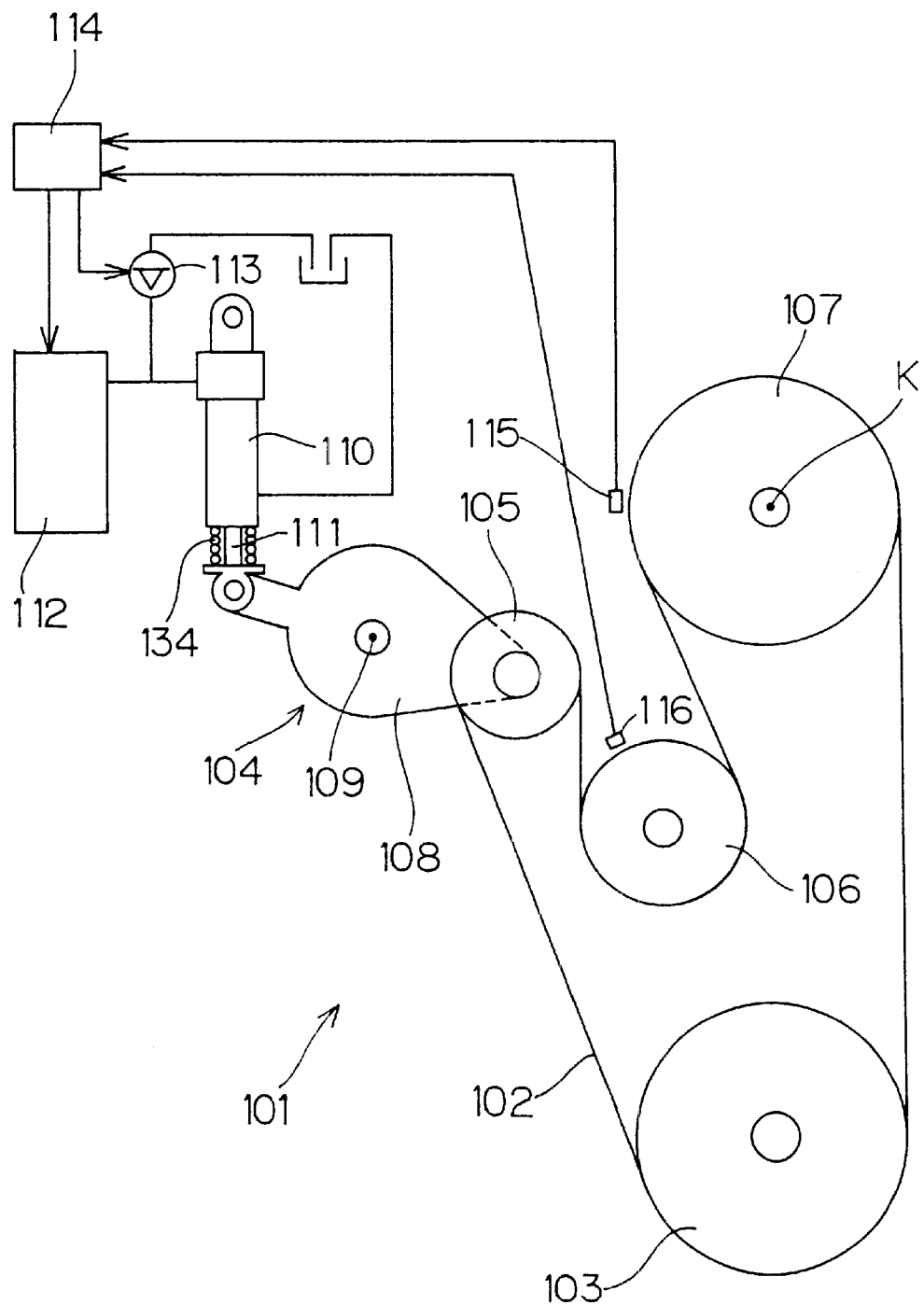
FIG. 1 is a schematic view of the construction of a belt type continuously variable speed system according to a first embodiment of the present invention, which illustrates a state before speed variation.
Figure 2:
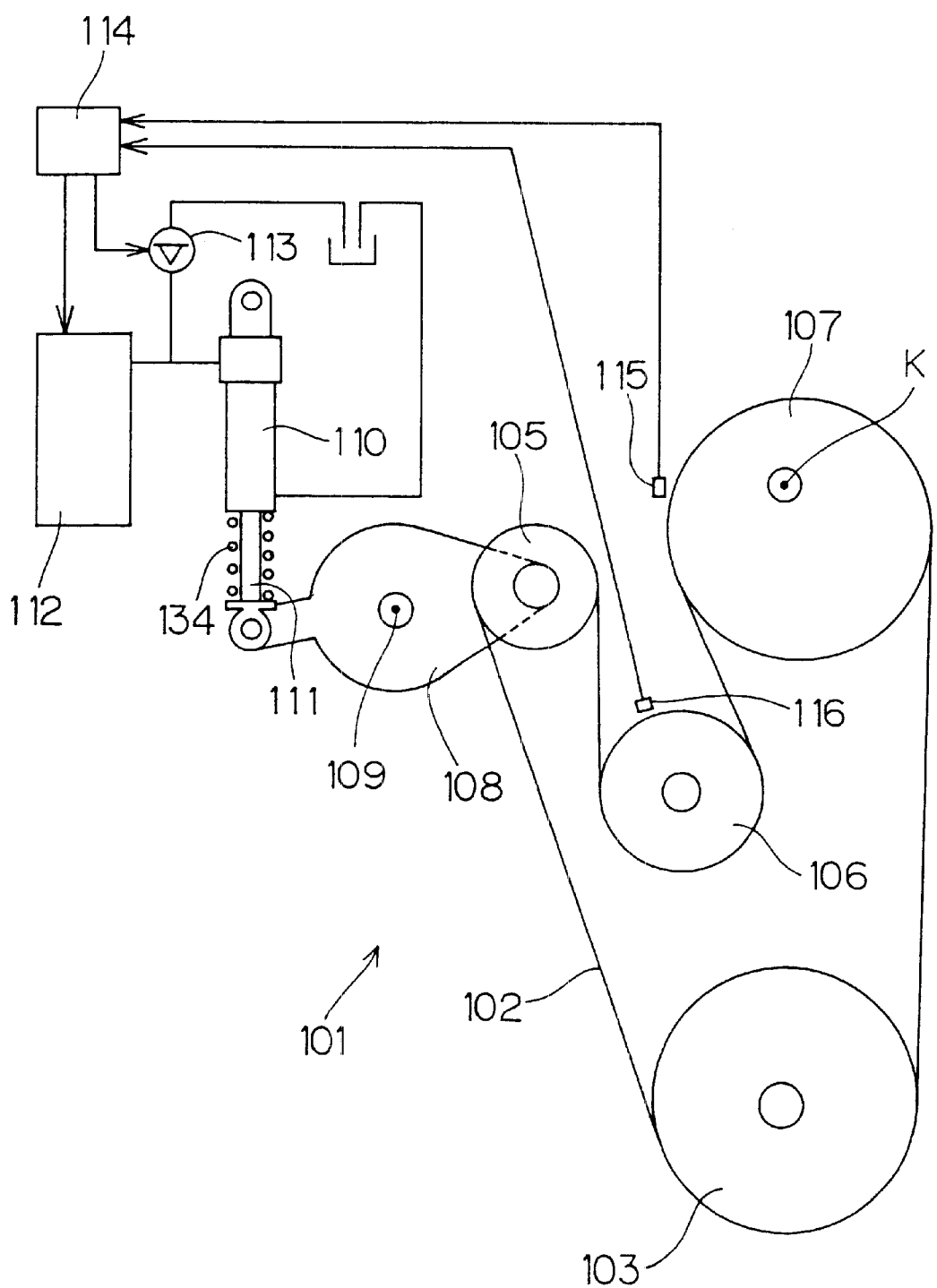
FIG. 2 is a schematic view of the construction of the system shown in FIG. 1, which illustrates a state after speed variation.

Referring to FIG. 1, in a system 101, an endless belt 102 is successively wound around a driving pulley 103 connecting with a crankshaft of an engine serving as a driving source of a vehicle, a tensioner pulley 105 in a tensioner 104 for adjusting a change gear ratio, an idler pulley 106 whose position is fixed, and a variable radius pulley 107 connecting with a rotating shaft of an auxiliary machine.

The tensioner pulley 105 is arranged in such a manner as to draw a slack portion of the belt 102 between the driving pulley 103 and the idler pulley 106. The tensioner 104 comprises a supporting member 108 composed of a swing arm supported on a fixed portion of an engine case or the like so as to be swingable. An axis of rotation 109 to be the center of swing of the, supporting member 108 is provided at the center of the supporting member 108, and both ends of the supporting member 108 are arranged such that they are opposite to each other with the axis of rotation 109 interposed therebetween. The tensioner pulley 105 is supported so as to be rotatable on one end of the supporting member 108, and an end of a rod 111 of a hydraulic cylinder 110 serving as a hydraulic actuator for swinging and displacing the supporting member 108 is connected to the other end thereof so as to be rotatable. A helical compression spring 134 serving as an elastic member for urging the rod 111 in, the direction of extension is arranged between a cylinder end surface of the hydraulic cylinder 110 and the end of the rod 111. The helical compression spring 134 elastically draws the slack portion of the belt 102 through the supporting member 108 and the tensioner pulley 105 to give tension to the belt 102.

Working oil is supplied at a required time to the hydraulic cylinder 110 from a hydraulic pump 112 composed of a motor pump carried in the vehicle. The working oil is returned from the hydraulic cylinder 110 toward the low-pressure side at a required time. In FIG. 1, only a principal part of the construction of an oil path relating to the hydraulic cylinder 110 and the hydraulic pump 112 is schematically illustrated. However, the details will be described later using FIGS. 3 and 4. Reference numeral 113 denotes a solenoid valve for alternatively selecting, depending on whether or not the working oil from the hydraulic pump 112 is supplied to the hydraulic cylinder 110, a state of a check valve allowing only the circulation in one direction of the oil and a state allowing the circulation in both directions of the oil. The tensioner pulley 105 is provided so as to be displaceable in the respective directions in which the tension to the belt 102 is increased and is decreased as the supporting member 108 is swung and displaced, and is displaced to a portion between a first position shown in FIG. 1 and a second position shown in FIG. 2 by the hydraulic cylinder 110.

The variable radius pulley 107 has the maximum effective radius of the belt 102 in correspondence with the first position, and has the minimum effective radius in correspondence with the second position. Specifically, the variable radius pulley 107 is represented by a power transmission ring (indicated by 206 in FIG. 5) included therein, and the power transmission ring is eccentric from an axis of rotation K to be the center of the variable radius pulley 107.

On the other hand, the operation of the tensioner pulley 105 is controlled by a controller 114. The controller 114 receives an output signal of a first speed sensor 115 serving as quantity-of-state detection means for detecting the rotational speed of the variable radius pulley 107 and an output, signal of a second speed sensor 116 serving as quantity-ofstate detection means for detecting the rotational speed of the idler pulley 106.

The rotational speed of the variable radius pulley 107 is equal to the rotational speed of the rotating shaft of the auxiliary machine, and the rotational speed of the idler pulley 106 corresponds to the traveling speed of the belt (which is proportional to the rotational speed of the engine).

As to control carried out by the controller 114, the output signal from the second speed sensor 116 is inputted to detect the rotational speed of the engine. For example, in a state where the number of revolutions of the engine is lower than a predetermined level, the tensioner pulley 105 is displaced to the second position shown in FIG. 2, to displace the power transmission ring toward the eccentric side, so that the number of revolutions of the auxiliary machine is made relatively higher than the number of revolutions of the engine. On the other hand, in a state where the number of revolutions of the engine is not less than the predetermined level, the tensioner pulley 105 is displaced to,the first position shown in FIG. 1 to displace the power transmission ring toward the concentric side, so that the number of revolutions of the auxiliary machine can be made relatively lower than the number of revolutions of the engine. An output signal from the controller 114 is outputted to the hydraulic pump 112 composed of a motor pump (actually, a motor for driving the hydraulic pump 112) and the solenoid valve 113. Consequently, the position where the tensioner pulley 105 operates is changed, thereby achieving speed variation. The controller 114 detects the rotational speed of the variable radius pulley 107 by inputting the output signal from the first speed sensor 115, and adjusts the amount of displacement of the tensioner pulley 105 by the hydraulic cylinder 110 such that the ratio of the rotational speed to the rotational speed of the engine (i.e., corresponding to the traveling speed of the belt 102) is a predetermined ratio.

Hydraulic Circuit

Figure 3:
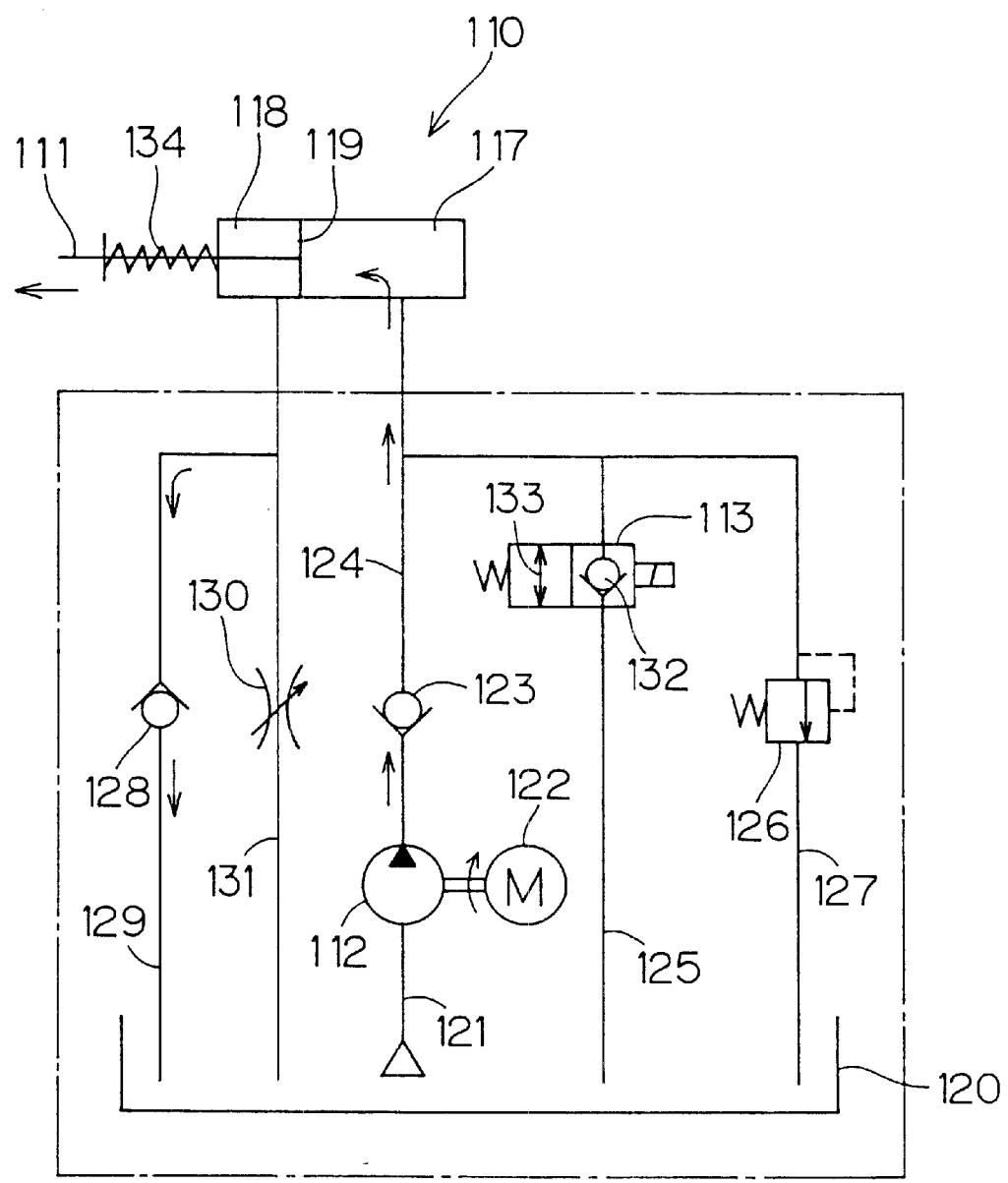
FIG. 3 is a schematic view of a hydraulic circuit for operating a hydraulic cylinder in the system shown in FIG. 1, which corresponds to the state after speed variation.
Figure 4:
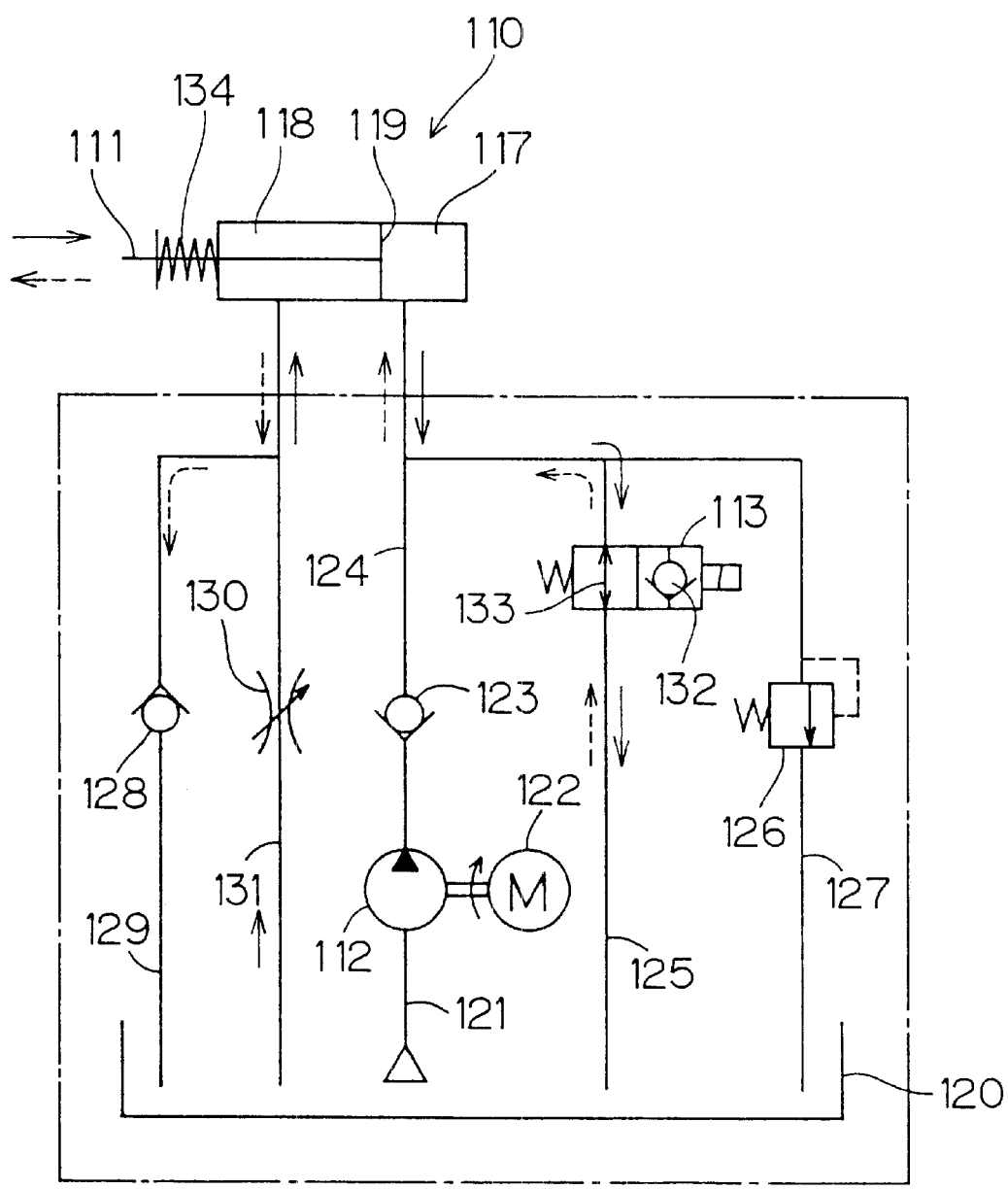
FIG. 4 is a schematic view of a hydraulic circuit for operating a hydraulic cylinder in the system shown in FIG. 1, which corresponds to the state before speed variation.

Referring now to FIGS. 3 and 4, a hydraulic circuit including the hydraulic cylinder 110 and the hydraulic pump 112 will be described. The hydraulic cylinder 110 has a first oil chamber 117 and a second oil chamber 118 which are respectively expanded and contracted when a rod 111 extends with a piston 119 interposed therebetween.

In a supply-side oil path 121 causing a low-pressure hydraulic tank 120 and the first oil chamber 117 to communicate with each other, the hydraulic pump 112 driven by a motor 122 and a check valve 123 allowing only the supply of the working oil toward the first oil chamber 117 are arranged in this order from the hydraulic tank 120.

A portion 124, on the first oil chamber 117 side of the check valve 123, of the supply-side oil path 121 communicates with the hydraulic tank 120 through a first communicating oil path 125 having a solenoid valve 113 arranged therein and a relief oil path 127 having a relief valve 126 arranged therein, respectively.

The solenoid valve 113 forces the working oil to be supplied from the hydraulic pump 112 to the first oil chamber 117 in a state where the oil is prevented from flowing toward the hydraulic tank 120 in the first communicating oil path 125 by a check valve 132 contained therein, as shown in FIG. 3. Further, the solenoid valve 113 allows the circulation in both directions of the working oil between the first oil chamber 117 and the hydraulic tank 120 in a state where the first communicating oil path 125 is opened in both directions by a communicating path 133 contained therein, as shown in FIG. 4. The relief valve 126 is for releasing, when the pressure on the first oil chamber 117 is excessively high, the pressure toward the low-pressure hydraulic tank 120.

The low-pressure hydraulic tank 120 and the second oil chamber 118 communicate with each other through a return-side oil path 129 having a check valve 128 and a second communicating oil path 131 having a variable chock 130 arranged therein, which are arranged in parallel, respectively. The check valve 128 provided in the return-side oil path 129 allows only the flow of the oil toward the hydraulic tank 129. The second communicating oil path 131 having the variable chock 130 arranged therein allows the circulation of the working oil in both directions between the hydraulic tank 120 and the second oil chamber 118 with predetermined restriction resistance by the variable chock 130. The variable chock 130 may be replaced with a fixed chock.

In the foregoing construction of the oil path, the solenoid valve 113 closes the first communicating oil path 125, to supply the working oil to the first oil chamber 117 by the hydraulic pump 112, and return the working oil from the second oil chamber 118 to the hydraulic tank 120 through the return-side oil path 129, as shown in FIG. 3. Consequently, the rod 111 extends, and the extending state is maintained. Therefore, the tension on the belt is increased, so that the power transmission ring in the variable radius pulley 107 is displaced toward the eccentric side. On the other hand, as shown in FIG. 4, the motor 122 is stopped, to stop the hydraulic pump 112, and the solenoid valve 113 allows the circulation of the working oil in both directions in the first communicating oil path 125. Consequently, the rod 111 in the hydraulic cylinder 110 contracts by the tension on the belt. Therefore, the tension on the belt is decreased, so that the power transmission ring in the variable radius pulley 107 is displaced toward the concentric side. In this state, the tensioner 104 is caused to function similarly to the conventional auto-tensioner, to damp vibration generated in the belt 102. Specifically, when the tensioner pulley 105 is slightly displaced as the belt 102 vibrates, the supporting member 108 is swung and displaced, so that the rod 111 in the hydraulic cylinder 110 extends and contracts.

When the rod 111 is displaced toward the extension side (the power transmission ring is displaced toward the eccentric side), the flow of the working oil into the first oil chamber 117 is allowed without resistance through the first communicating oil path 125, and the flow of the working oil out of the second oil chamber 118 is allowed without resistance through the return-side oil path 129, as shown by arrows indicated in a broken line in FIG. 4, with respect to the displacement. A helical compression spring 134 serving as an elastic member is contracted. Further, when the rod 111 is displaced toward the contraction side (the power transmission ring is displaced toward the concentric side), the flow of the working oil out of the first oil chamber 117 is allowed without resistance through the first communicating oil path 125, and the flow of the working oil into the first oil chamber 117 is allowed with resistance produced by the variable chock 130 in the second communicating oil path 131, as shown by arrows indicated in solid line in FIG. 4. Consequently, the hydraulic circuit including the variable chock 130 and a helical compression spring 134 function as a dynamic damper in cooperation with each other with respect to the tensioner pulley 105 operating upon following the vibration of the belt 102, so that the vibration of the belt 102 is damped.

The elastic member is not limited to those provided in the hydraulic cylinder 110. It is also possible to use a spring member for elastically urging the supporting member 108, for example, a helical torsion coil spring, a helical tension spring, and a helical compression spring.

Variable Radius Pulley

Figure 5:
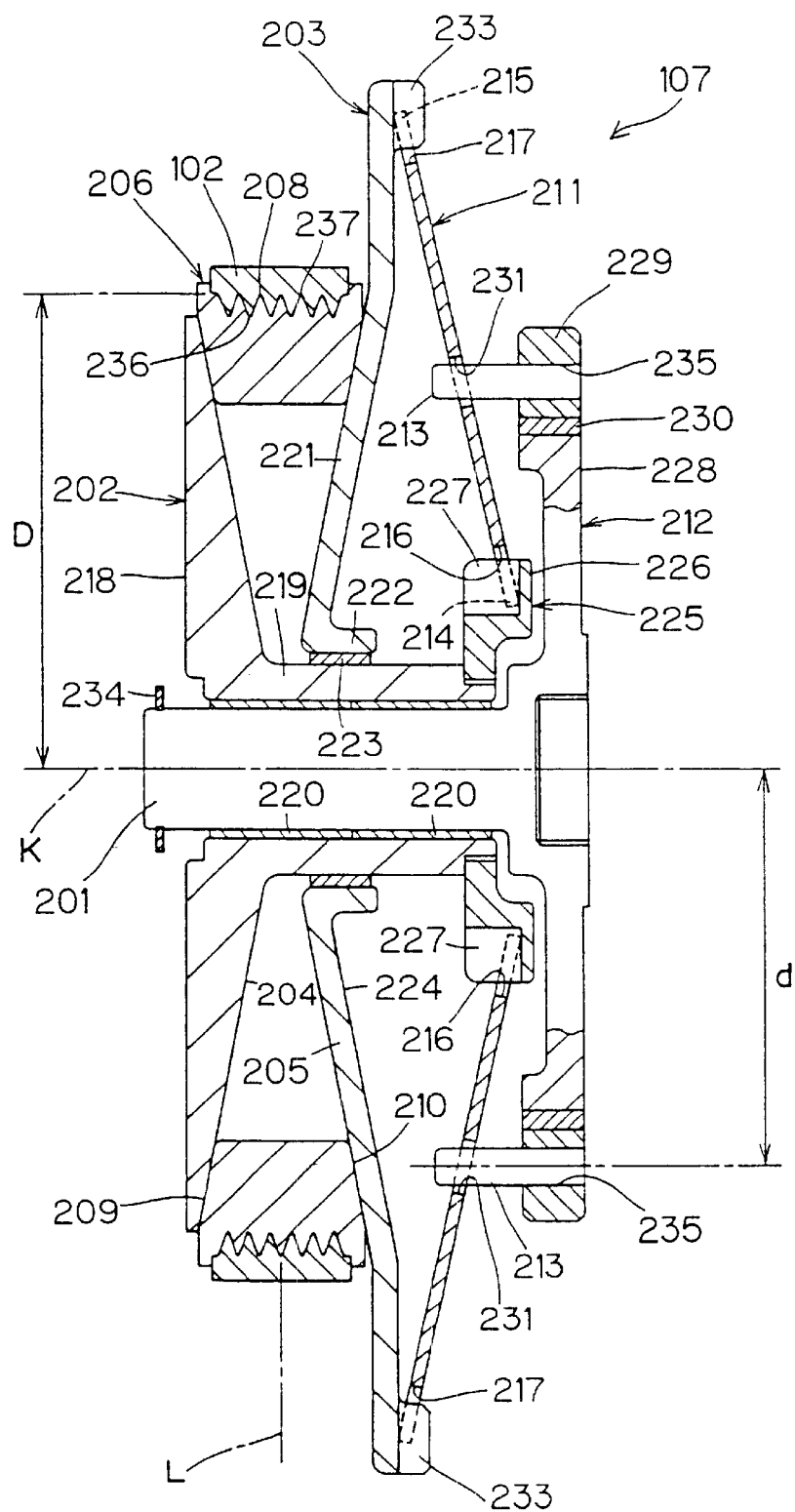
FIG. 5 is a longitudinal sectional view of a variable radius pulley in the system shown in FIG. 1, which illustrates a state where a power transmission ring is in a position which is concentric with a rotating shaft.

FIG. 5 is a cross-sectional view of the variable radius pulley 107. Referring to FIG. 5, the variable radius pulley 107 comprises first and second annular pulley main bodies 202 and 203 which are axially movable around a rotating shaft 201, and power transmission surfaces 204 and 205 are respectively formed in opposite surfaces of the pulley main bodies 202 and 203. The power transmission surfaces 204 and 205 are brought into tapered shapes which are inclined in opposite directions. The power transmission ring 206 which is approximately trapezoidal in cross section is interposed so as to be capable of being eccentric (see FIG. 7) from the axes of, both the pulley main bodies 202 and 203 (corresponding to an axis of rotation K of the rotating shaft 201) between the power transmission surfaces 204 and 205.

A transmission surface 208 to the belt 102 is formed on an outer peripheral surface of the power transmission ring 206, and the belt 102 is wound around the transmission surface 208. A plurality of ribs 236, which are parallel to each other, extending in the direction in which the belt 102 is wound and a plurality of peripheral grooves 237 which are respectively engaged with the ribs 236 are formed on the transmission surface 208. The rib 236 is in a shape close to a V shape in cross section, for example. Both side surfaces of the power transmission ring 206 respectively constitute tapered power transmission surfaces 209 and 210 for transmitting torque in contact with the power transmission surfaces 204 and 205.

It is preferable that the belt 102 is made of rubber. Further, it is preferable that the power transmission ring 206 is made of a resin material obtained by mixing carbon fiber, aromatic polyamide fiber, and graphite with resin being superior in durability and having a high coefficient of friction, for example, phenol resin. The resin makes a gentle attack on a counterpart member irrespective of the fact that it is high in intensity and is superior in wear resistance, and has a stable coefficient of friction irrespective of temperature. It is preferable in terms of improving the wear resistance and further stabilizing the coefficient of friction that the contents of the carbon fiber, the aromatic polyamide fiber, and the graphite in the resin material are respectively in the ranges of 5 to 30% by weight, 5 to 15% by weight, and 10 to 15% by weight.

The variable radius pulley 107 comprises a diaphragm spring 211 serving as urging means for urging the first and second pulley main bodies 202 and 203 in directions to bring them nearer to each other, and the diaphragm spring 211 is connected to a disc flange-shaped connecting section 212 which rotates in synchronism with the rotating shaft 201 so as to be integrally rotatable through a plurality of axle-shaped sections 213.

A radially inner portion 214 and a radially outer portion 215 of the diaphragm spring 211 are respectively engaged with the first and second pulley main bodies 202 and 203 so as to be integrally rotatable. Consequently, both the pulley main bodies 202 and 203 and the diaphragm spring 211 rotate integrally with the rotating shaft 201. In the variable radius pulley 107 serving as a driven pulley, torque is transmitted to the rotating shaft 201 from the belt 102 through the power transmission ring 206, both the pulley main bodies 202 and 203, and the diaphragm spring 211.

Figure 6:
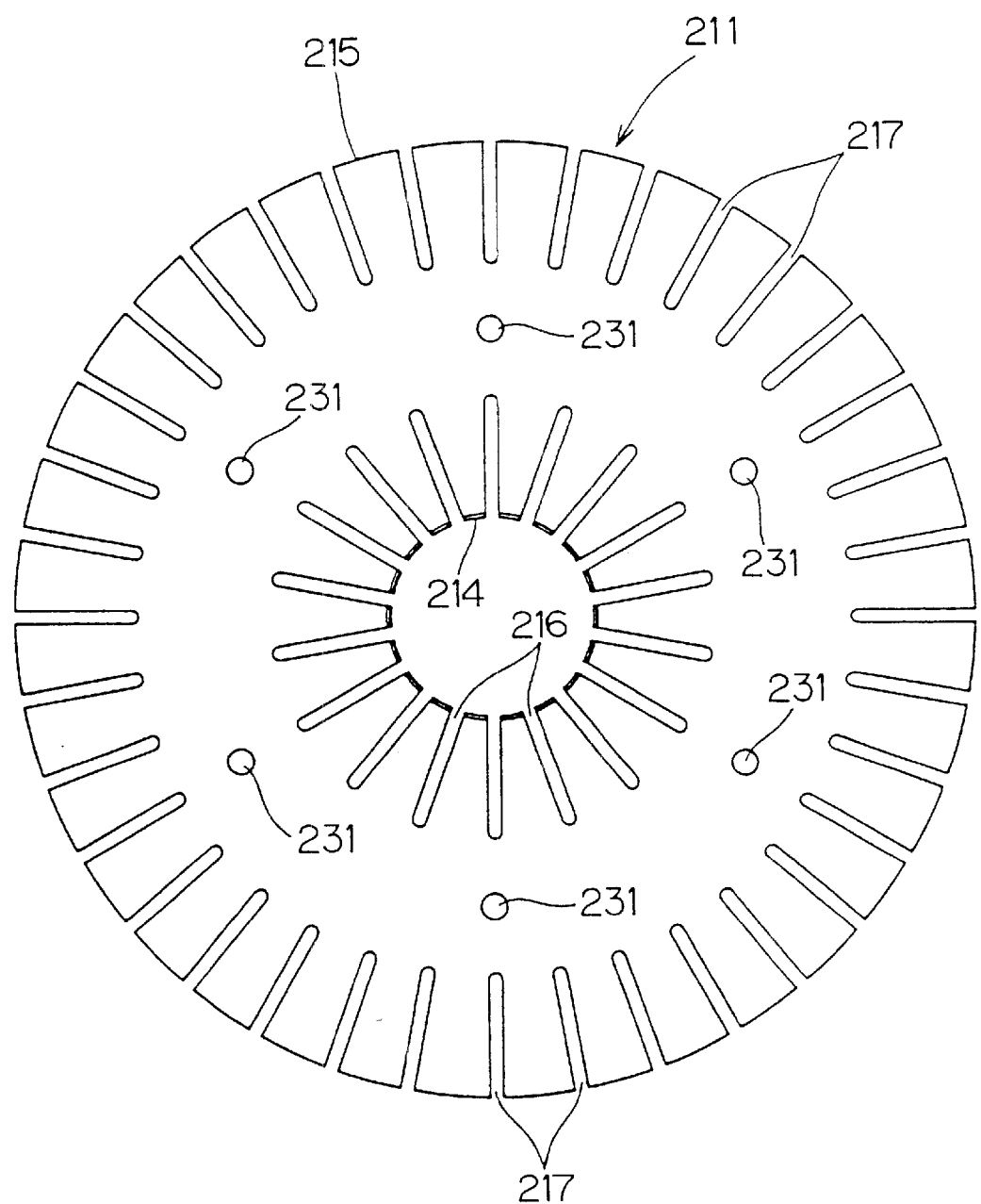
FIG. 6 is a front view of a diaphragm spring in the variable radius pulley shown in FIG. 5.

Referring to FIGS. 5 and 6, radial connecting grooves 216 and 217 equally spaced in the circumferential direction, are respectively formed in the radially inner portion 214 and the radially outer portion 215 of the diaphragm spring 211. Further, supporting holes 231 through which the axle-shaped sections 213 are respectively passed are formed equally spaced in the circumferential direction in an intermediate portion in the radial direction of the diaphragm spring 211.

The first pulley main body 202 comprises a conical disc 218 and a cylindrical boss 219 formed in the inner periphery of the disc 218. The disc 218 has the power transmission surface 204 formed thereon. The boss 219 is supported so as to be axially slidable through a bush 220 serving as a slide bearing on the peripheral surface of the rotating shaft 201. Reference numeral 234 denotes a stopper for preventing the first pulley main body 202 from slipping off the rotating shaft 201, and is composed of a snap ring fitted in a peripheral groove at an end of the rotating shaft 201.

The second pulley main body 203 comprises a conical disc 221 and a cylindrical boss 222 formed in the inner periphery of the disc 221. The disc 221 has the power transmission surface 205 formed thereon. The boss 222 in the second pulley main body 203 surrounds the boss 219 in the first pulley main body 202, and is supported so as to be axially slidable through a bush 223 serving as a slide bearing by the boss 219 in the first pulley main body 202.

A plurality of plate-shaped connecting projections 233 respectively fitted in a plurality of connecting grooves 217 in the radially outer portion 215 of the diaphragm spring 211 are radially formed equally spaced in the circumferential direction at an outer peripheral edge of a rear surface 224 of the power transmission surface 205 of the second pulley main body 203. The rear surface 224 of the second pulley main body 203 is pressed by the radially outer portion 215 of the diaphragm spring 211, so that the second pulley main body 203 is urged in a direction to bring it nearer to the first pulley main body 202.

The boss 219 in the first pulley main body 202 extends toward the rear surface 224 of the power transmission surface 205 of the second pulley main body 203 upon penetrating the boss 222 in the second pulley main body 203. The boss 219 constitutes a portion extending toward the rear surface of the second pulley main body 203. At an end of the boss 219 serving as the portion extending toward the rear surface, an annular connecting member 225 is provided for connecting the end and the radially inner portion 214 of the diaphragm spring 211 to each other so as to be integrally rotatable.

The inner periphery of the connecting member 225 is coupled to an end of the boss 219 by a screw and fixed thereto so as to be integrally rotatable. Torque transmitted through the connecting member 225 functions in the direction in which the screw is tightened, not to loosen the screw.

The connecting member 225 has a disc-shaped pressing plate 226 for axially pressing the radially inner portion 214 of the diaphragm spring 211 and a plurality of connecting projections 227 radially formed equally spaced in the circumferential direction in the pressing plate 226 formed therein. The pressing plate 226 is pressed by the radially inner portion 214 of the diaphragm spring 211, and the first pulley main body 202 is urged in the direction nearer to the second pulley main body 203 through the connecting member 225. The plurality of connecting projections 227 are respectively fitted in the plurality of connecting grooves 216 of the radially inner portion 214 of the diaphragm spring 211. The connecting section 212 comprises a disc-shaped flange 228 formed integrally with the rotating shaft 201 and an annular member 229 arranged, surrounding the flange 228. Between an outer peripheral surface of the flange 228 and an inner peripheral surface of the annular member 229, an annular elastic member 230 such as rubber joined to both the surfaces by baking, for example, is interposed. The elastic member 230 elastically connects the annular member 229 and the flange 228 to each other, to make torque transmission possible, and elastically supports the annular member 229 in the direction of rotation.

A plurality of through holes 235 are formed equally spaced in the circumferential direction in the annular member 229 upon axially penetrating the annular member 229, and the axle-shaped sections 213 are respectively inserted into and fixed to the through holes 235. The axle-shaped sections 213 are respectively fitted in the supporting holes 231 of the diaphragm spring 211, to connect the diaphragm spring 211 and the connecting section 212 to each other so as to be integrally rotatable.

The diaphragm spring 211 enters an axisymmetrically curved state where concentrated loads in opposite directions are received by the radially inner portion 214 and the radially outer portion 215. However, at this time, the axial displacement of the diaphragm spring 211 at the position of the supporting hole 231 is regulated by each of the axle-shaped sections 213. By setting a supporting radius d by each of the axle-shaped sections 213 to a predetermined value, therefore, it is possible to displace the radially inner portion 214 and the radially outer portion 215 in opposite directions by an equal amount of stroke.

Figure 7:
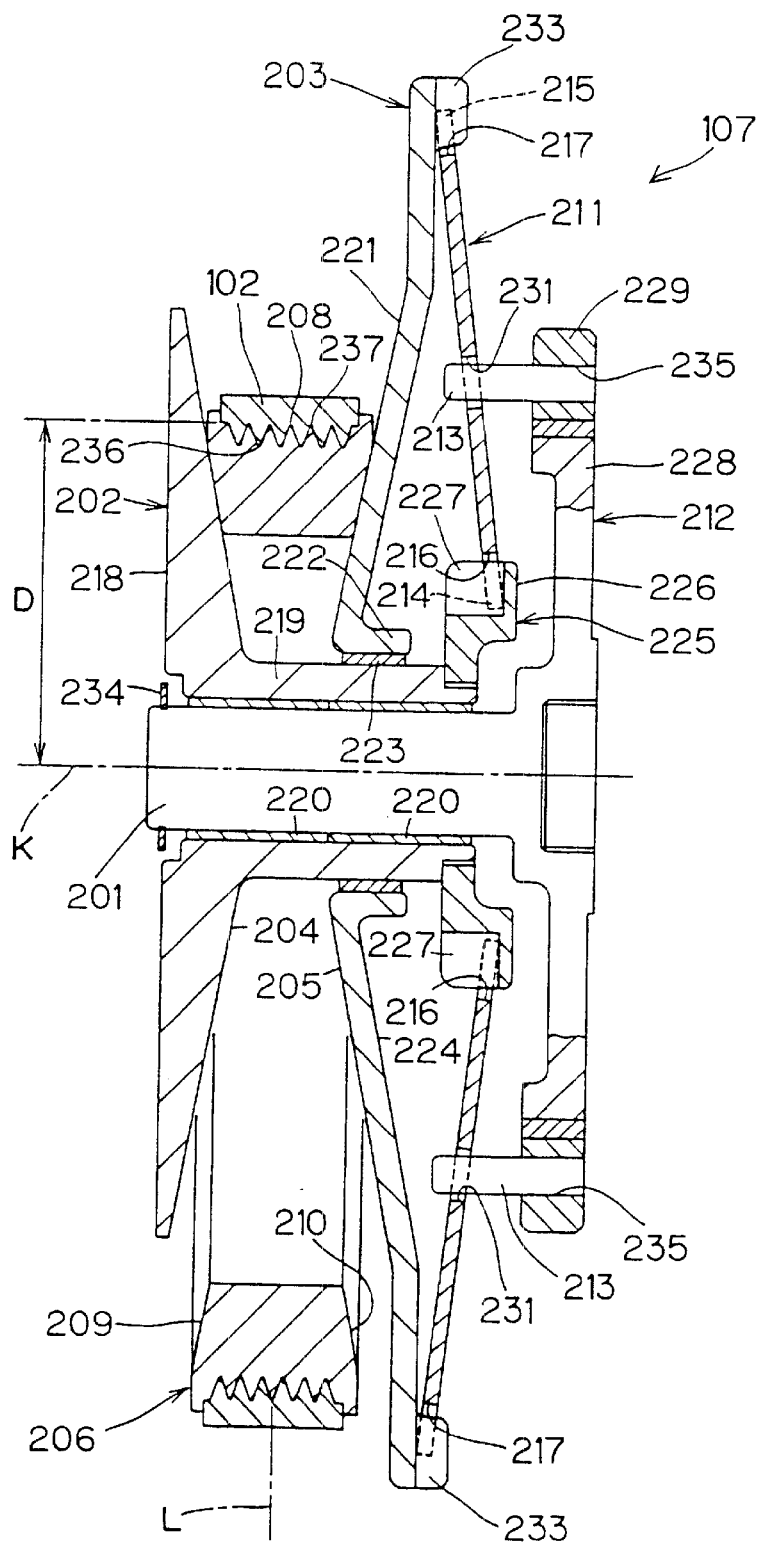
FIG. 7 is a longitudinal sectional view of the variable radius pulley shown in FIG. 5, which illustrates a state where a power transmission ring is eccentric.

The above-mentioned tensioner 104 adjusts the tension on the belt 102, to make the power transmission ring 206 eccentric, as shown in FIG. 7, while separating both the pulley main bodies 202 and 203 from each other against an urging force produced by the diaphragm spring 211, thereby making it possible to change the effective radius D of the wound belt 102.

The annular elastic member 230 is mounted through a torque transmission path. If the variable radius pulley 107 is applied to a driving pulley, therefore, variation in the direction of rotation of a driving system transmitted from the rotating shaft 201 to the belt 102 can be absorbed by the elastic member 230. On the other hand, when it is applied to a driven pulley as in the first embodiment, variation in the direction of rotation of the driving system transmitted from the belt 102 to the rotating shaft 201 can be absorbed by the elastic member 230. In either case, it is possible to prevent discontinuous rotation from being transmitted to equipment on the driven side which is subjected to belt transmission (i.e., an auxiliary machine of the engine). Moreover, it is possible to prevent vibration and noises from being produced in the equipment on the driven side as well as to improve the durability of the equipment on the driven side.

Particularly, torque is transmitted through the diaphragm spring 211 which is engaged with both the pulley main bodies 202 and 203 so as to be integrally rotatable. In other words, the diaphragm spring 211 is mounted through the torque transmission path. Therefore, the diaphragm spring 211 can prevent the transmitted torque from varying in cooperation with the elastic member 230. Consequently, the effect of preventing unnecessary variation in the direction of rotation from being transmitted.

In a case where the variable radius pulley 107 is applied to the driven pulley as in the first embodiment, when the tension on the belt varies as driving torque varies, the power transmission ring 206 is slightly displaced toward the eccentric side and the concentric side in response to the variation in the tension. Further, points of contact between the power transmission ring 206 and the pulley main bodies 202 and 203 vary in the circumferential direction, thereby making it possible to absorb the variation in the tension.

If the variable radius pulley 107 is applied to the driving pulley, the power transmission ring 206, both the pulley main bodies 202 and 203, the diaphragm spring 211, and the annular member 229 are taken as weight members, and the elastic member 230 is taken as a spring member, thereby making it possible to constitute a dynamic damper for preventing torsional vibration of a driving system for driving the rotating shaft 201. As a result, it is possible to prevent the torsional vibration of the driving system for driving the rotating shaft 201. Moreover, in the dynamic damper, both the pulley main bodies 202 and 203 which are components indispensable for the variable radius pulley can be utilized as weight members. Therefore, the torsional vibration of the driving system can be prevented without increasing the size of the system in simple construction.

Although in the first embodiment, the flange 228 of the connecting section 212 is formed integrally with the rotating shaft 201, the flange 228,may be formed separately from the rotating shaft 201, connected by spline coupling or the like to the rotating shaft 201 so as to be integrally rotatable, and prevented from axially moving by a snap ring or the like. In the first embodiment, the power transmission ring 206 is displaced to the position where a resultant force produced by the elastic member 134 and the hydraulic cylinder 110 serving as a hydraulic actuator in the tensioner 104 to make the power transmission ring 206 eccentric through the belt 102 and an urging force produced by the diaphragm spring 211 serving as an urging member in the variable radius pulley 107 to urge the power transmission ring 206 toward the concentric side (actually, the sum of the urging force and a frictional resistance force because the frictional resistance force exists between the power transmission ring and the power transmission surface of the pulley main body) are balanced with each other. That is, when the hydraulic cylinder 110 operates so that the former resultant force is above the latter urging force, the power transmission ring 206 is made eccentric. When the hydraulic cylinder 110 does not operate, the power transmission ring 206 is returned to the concentric position.

The above-mentioned first embodiment has the following advantages.

That is:

1) The hydraulic cylinder 110 is operated to displace the power transmission ring 206 toward the concentric side or the eccentric side through the variation in the tension on the belt 102 by changing the position where the tensioner pulley 105 operates. Consequently, the effective radius of the belt 102 in the variable radius pulley 107 is changed, thereby making it possible to achieve speed variation.

Particularly, the force produced by the elastic member 134 in the tensioner 104 to make the power transmission ring 206 eccentric through the belt 102 is smaller than the force produced by the diaphragm spring 211 serving as the urging member in the variable radius pulley 107 to urge the power transmission ring 206 toward the concentric side, so that the following effect is obtained. That is, when the hydraulic cylinder 110 does not operate, the tensioner 104 only gives tension to the belt 102 by a force produced by the elastic member 134 as in a case where it is used for a constant speed belt transmission type auxiliary driving system meeting a conventional specification with no variable radius pulley as in the present application. The power transmission ring 206 keeps a state where it is concentric with the axis of rotation K of the rotating shaft 201.

On the other hand, when the hydraulic cylinder 110 operates so that the resultant force produced by the elastic member 134 and the hydraulic cylinder 110 in the tensioner 104, to make the power transmission ring 206 eccentric through the belt 102 is larger than the urging force produced by the diaphragm spring 211 serving as the urging member of the variable radius pulley 107 to urge the power transmission ring 206 toward the concentric side, the power transmission ring 206 starts to be made eccentric from the axis of rotation K of the rotating shaft 201. An eccentric position corresponding to a force added by the hydraulic cylinder 110 is defined, so that a desired transmission (change gear) ratio in power transmission is obtained. In this case, tension is also given to the belt 102 by not only the tensioner 104 but also the urging member 211 in the variable radius pulley 107. Accordingly, the tension is stably and suitably given. That is, speed variation is achieved using a tension balance through the belt 102, thereby making stable and smooth speed variation possible.

The life of the belt 102 can be increased by using the power transmission ring 206. Further, it is possible to use, as the power transmission ring 206 which can be constructed by a material separate from the material of the belt 102, resin being superior in durability and having a high coefficient of friction. Therefore, it is possible to improve the durability and the power transmission efficiency.

2) As in the present embodiment, the belt type continuously variable speed system is applied to the driving ,of an auxiliary machine of an automobile. Therefore, it is possible to prevent the auxiliary machine from being rotated at unnecessarily high speed, improve the durability of the auxiliary machine, and achieve energy saving.

3) The tensioner 104 for adjusting a change gear ratio according to the present embodiment can be conventionally arranged as a substitute for an auto-tensioner arranged on the slack side of the belt 102. Accordingly, the system can be miniaturized. Particularly in the present embodiment, the tensioner 104 for adjusting a change gear ratio is provided with the helical compression spring 134 serving as an elastic member for pressing and urging the belt 102. Accordingly, it can function as a normal auto-tensioner, as described in the foregoing item 1). A hydraulic circuit including the hydraulic cylinder 110 included in the tensioner 104 is provided with the variable chock 130 for producing viscosity resistance. Therefore, the variable chock 130 and the helical compression spring 134 can function as a dynamic damper in cooperation with each other.

4) The belt 102 made of rubber has the ribs 236 formed therein in the winding direction which is the direction in which it receives tension. Therefore, the wall thickness of the belt 102 can be made uniform in the direction in which the belt 102 receives tension. Moreover, by providing the ribs 236, the belt 102 can be increased in the modulus of section and is increased in life while being small in size. Therefore, it is possible to obtain a belt type continuously variable speed system being small in size and having a long life.

5) A pressing force against the belt 102 in the tensioner pulley 105 which is required to make the power transmission ring 206 eccentric can be obtained by the helical compression spring 134 serving as an elastic member and the hydraulic cylinder 110. Accordingly, a force to be charged by the hydraulic cylinder 110 may be smaller, as compared with that in a case where it is obtained only by the hydraulic cylinder 110. Consequently, it is possible to miniaturize the hydraulic cylinder 110 and the hydraulic pump 112 which should supply hydraulic pressure thereto.

6) Both the pulley main bodies 202 and 203 are displaced by an equal amount of displacement in opposite directions by the function of the diaphragm spring 211. Accordingly, the position of the center of travel of the belt 102 can be always kept constant. The speed variation eliminates the possibilities that an unnecessary force is applied to the belt 102 and the belt 102 drops out of a pulley.

7) Since both the pulley main bodies 202 and 203 can be directly urged by the diaphragm spring 211, both the pulley main bodies 202 and 203 can be smoothly operated, thereby making smooth speed variation possible. The radially inner portion 214 and the radially outer portion 215 of the diaphragm spring 211 produce equal amounts of displacement in opposite directions, thereby making it possible to keep the center of travel of the belt 102 constant by symmetrically moving both the pulley main bodies 202 and 203 in the axial direction. Further, the diaphragm spring 211 performs the function of connecting both the pulley main bodies 202 and 203 so as to be integrally rotatable and the function of urging the power transmission ring 206 toward the concentric side through both the pulley main bodies 202 and 203. Therefore, it is possible to make the construction of the system simpler, as compared with that in a case where both the functions are achieved by separate components.

8) Since the hydraulic pump 112 for supplying hydraulic pressure to the hydraulic cylinder 110 is composed of a motor pump, the position where the tensioner pulley 104 operates can be changed by turning the motor pump on and off, thereby making it possible to achieve energy saving. Further, in a case where the system is carried in an automobile, it is also possible to use a hydraulic pump which has already been carried in the automobile (for example, an oil pump of a power steering apparatus) as the hydraulic pump in the system. In this case, it is possible to achieve miniaturization and space saving.

Second Embodiment

Figure 8:
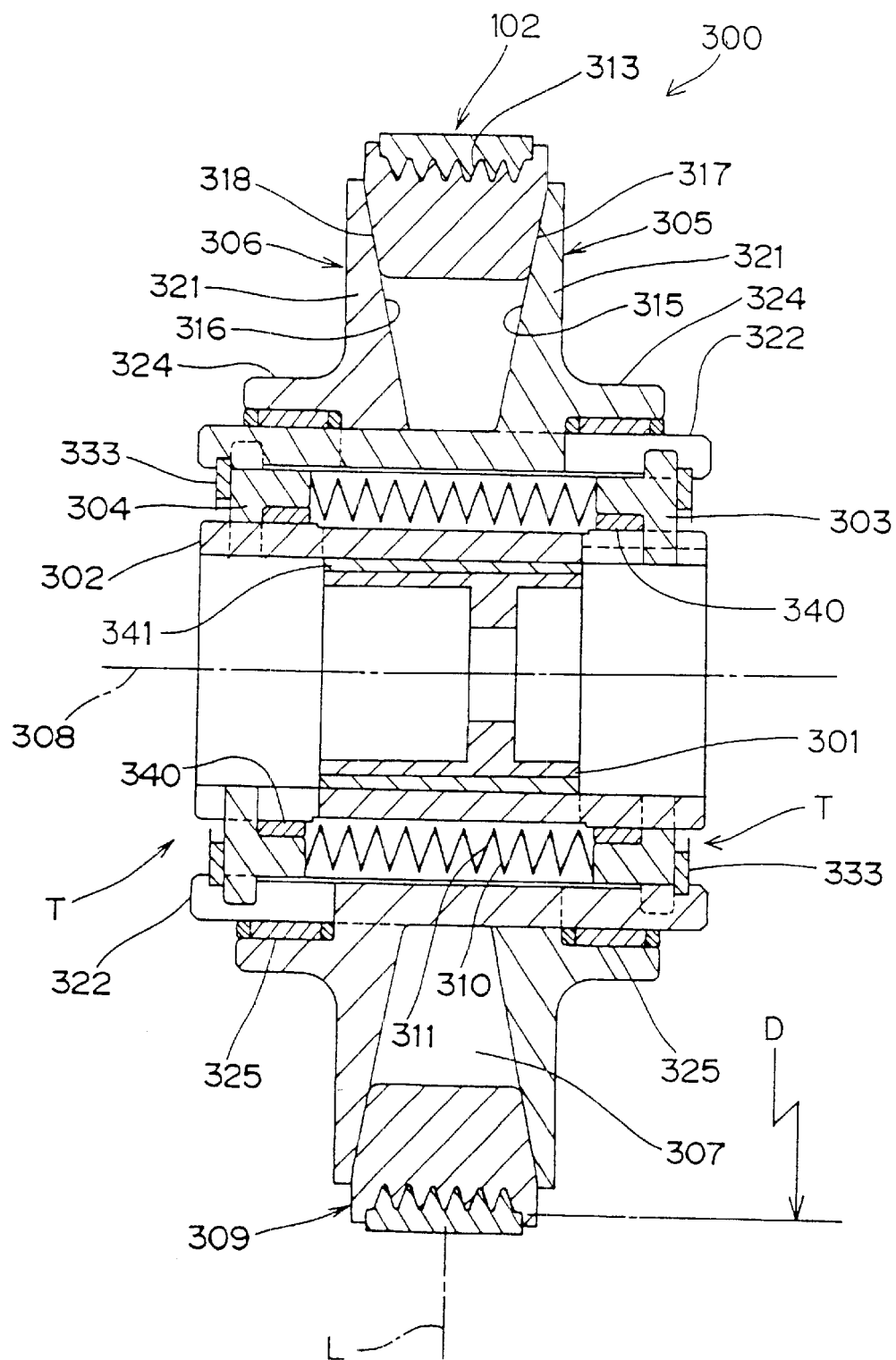
FIG. 8 is a longitudinal sectional view of a variable radius pulley in a belt type continuously variable speed system according to a second embodiment of the present invention, which illustrates a state where a power transmission ring is in a concentric position.
Figure 9:
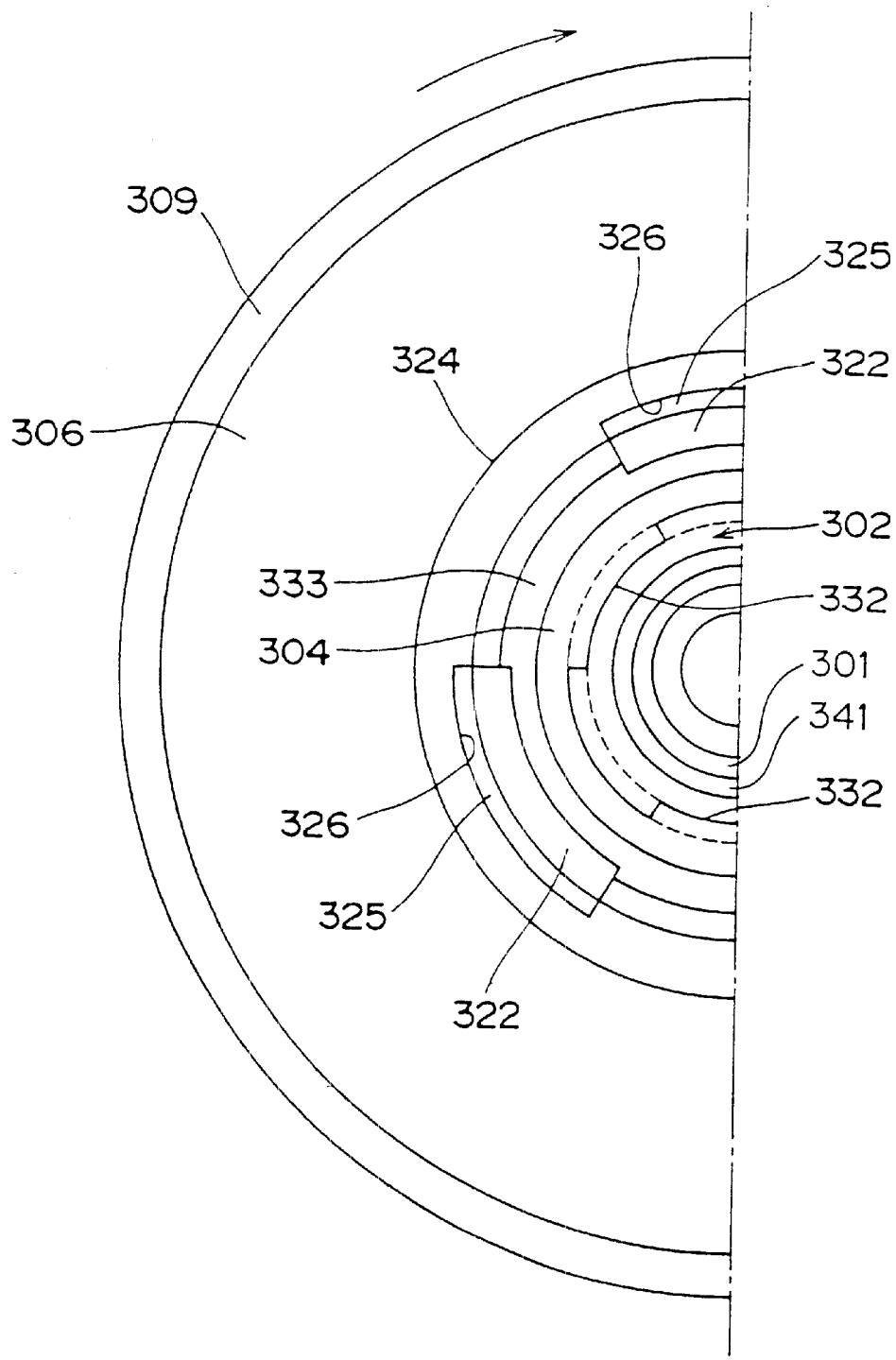
FIG. 9 is a half side view of the variable radius pulley shown in FIG. 8.

FIGS. 8 to 16 illustrate a variable radius pulley 300 used for a belt type continuously variable speed system according to a second embodiment of the present invention. Referring to FIG. 8, main differences between the second embodiment and the embodiment shown in FIG. 5 (that is, the first embodiment) will be summarized as described in the following items a) to d).

a) Although in the first embodiment, the diaphragm spring 211 is used as the urging means for urging both the pulley main bodies, Belleville springs 310 are used as urging means in the second embodiment. Consequently, the relationship between a resultant force produced by an elastic member 134 and a hydraulic cylinder 110 in a tensioner 104 to make a power transmission ring 309 eccentric through a belt 102 and an urging force produced by the Belleville springs 310 serving as the urging member in the variable radius pulley 300 to urge the power transmission ring 309 toward the concentric side is actively changed by the hydraulic cylinder 110, thereby achieving speed variation.

b) Although in the first embodiment, the torque is transmitted through the diaphragm spring 211 serving as the urging means, torque is not transmitted through the plurality of Belleville springs 310 serving as the urging means in the second embodiment.

c) In the second embodiment, torque cam mechanisms T are provided such that both pulley main bodies are displaced by an equal amount of displacement in opposite directions along the axis of a rotating shaft. The torque cam mechanisms. T are composed of a pair of conversion mechanisms for converting rotational angular displacement and axial displacement from a rotating shaft 301 respectively produced by first and second pulley main bodies 305 and 306 which are connected to each other such that torque can be transmitted to the rotating shaft 301.

d) In the second embodiment, an elastic member 341 for absorbing the torque variation in the variable radius pulley 300 is interposed between the rotating shaft 301 and an intermediate member 302 surrounding the rotating shaft 301.

The foregoing will be described in detail. Referring to FIG. 8, the variable radius pulley 300 comprises the cylindrical intermediate member 302 which is connected such that it can transmit torque through the annular elastic member 341 made of baking rubber or the like around the cylindrical rotating shaft 301 which is connected to the axis of a rotating shaft of an auxiliary machine so as to be integrally rotatable. The first and second pulley main bodies 305 and 306 are respectively connected to the intermediate member 302 through the pair of connecting members 303 and 304 so as to be synchronously rotatable.

The power transmission ring 309 which can be eccentric from an axis 308 of the rotating shaft 301 and having a transmission surface 313 to the belt 102 formed on its outer peripheral surface is fitted in a V groove 307 defined between both the pulley main bodies 305 and 306. Further, the variable radius pulley 300 comprises a plurality of pairs of annular Belleville springs 310 as urging means for urging both the pulley main bodies 305 and 306 in the directions to be nearer to each other. The Belleville springs 310 respectively urge both the pulley main bodies 305 and 306 through the connecting members 303 and 304.

The above-mentioned V groove 307 is formed between power transmission surfaces 315 and 316 which are composed of opposite surfaces of both the pulley main bodies 305 and 306. Peripheral side surfaces 317 and 318 opposite to each other of the power transmission ring 309 transmit power respectively in contact with the power transmission surfaces 315 and 316.

Figure 10:
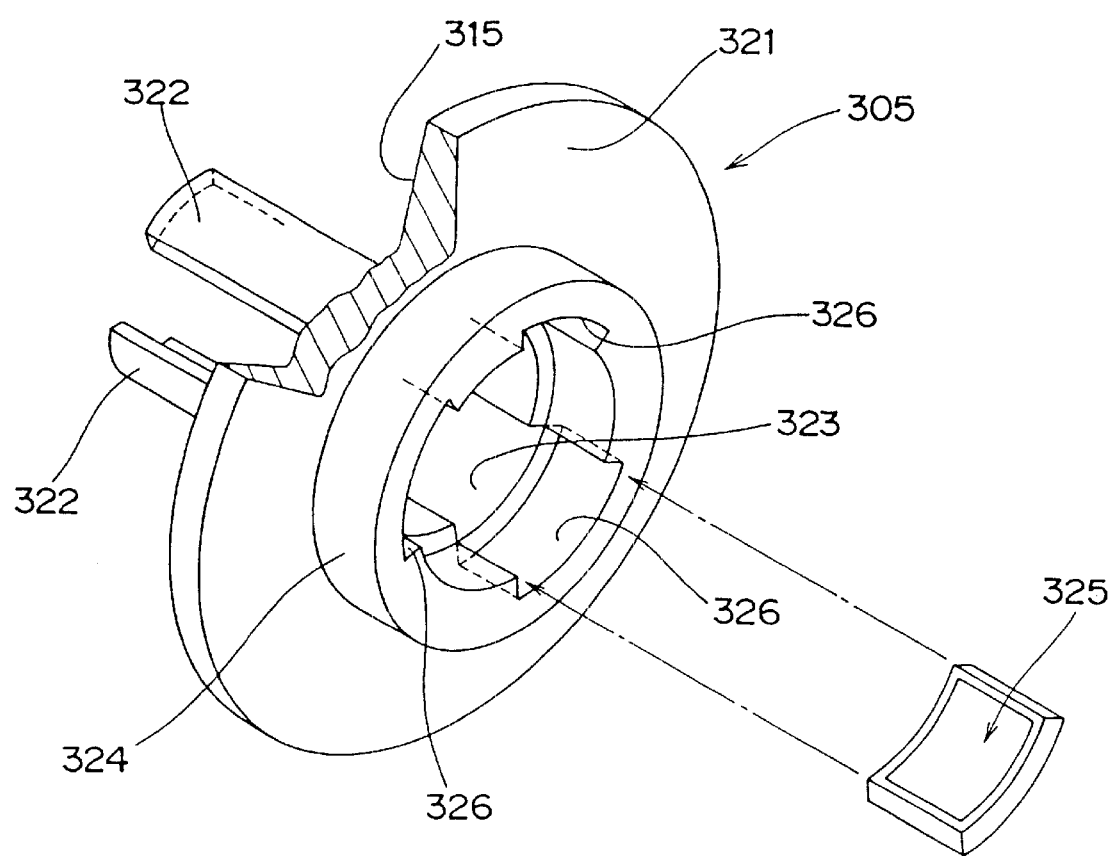
FIG. 10 is an exploded perspective view of a pulley main body in the variable radius pulley shown in FIG. 8 and a guide member.

Referring to FIGS. 8 and 10, the pulley main body 305 has an annular main body section 321 having the power transmission surface 315 composed of a tapered surface for defining the V groove 307. A plurality of circular arc-shaped fitting projections 322 extending in one axial direction (toward the other pulley main body 306) are formed equally spaced in the circumferential direction from the inner periphery of the main body section 321. Circular arc-shaped fitting grooves 323 are formed equally spaced in the circumferential direction in correspondence with the adjacent fitting projections 322 on the inner peripheral surface of the main body section 321. Further, the main body section 321 has a cylindrical section 324 formed on its surface opposite to the power transmission surface 315. Both the pulley main bodies 305 and 306 are in shapes which are bilaterally symmetrical. The pulley main body 306 also has the main body section 321, the fitting projections 322, and the cylindrical section 324, similarly to the pulley main body 305.

Figure 12:
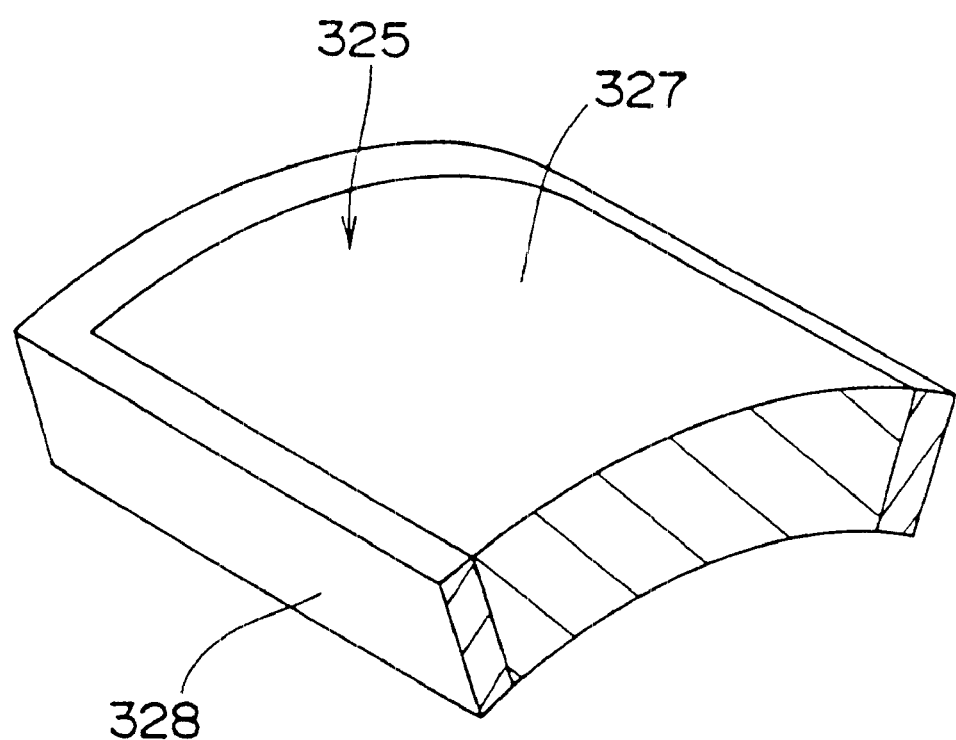
FIG. 12 is a partially cutaway view in perspective of the guide member shown in FIG. 11.

Referring to FIGS. 8, 9, 10 and 11, shown are a plurality of guide members 325 for guiding axial displacement of both the pulley main bodies 305 and 306 on the inner periphery of the cylindrical section 324. The guide members 325 are composed of circular arc-shaped members covering the outer peripheries of the fitting projections 322 of the corresponding pulley main bodies 305 and 306, and are held upon being respectively fitted in a plurality of circular arc-shaped holding grooves 326 which are formed equally spaced in the circumferential direction on an inner peripheral surface of the cylindrical section 324. As shown in FIG. 12, the guide member 325 comprises a guide main body 327 composed of a circular arc-shaped plate having a small coefficient of friction and a sealing member 328 made of rubber, for example, surrounding an edge of the guide main body 327.

Figure 13:
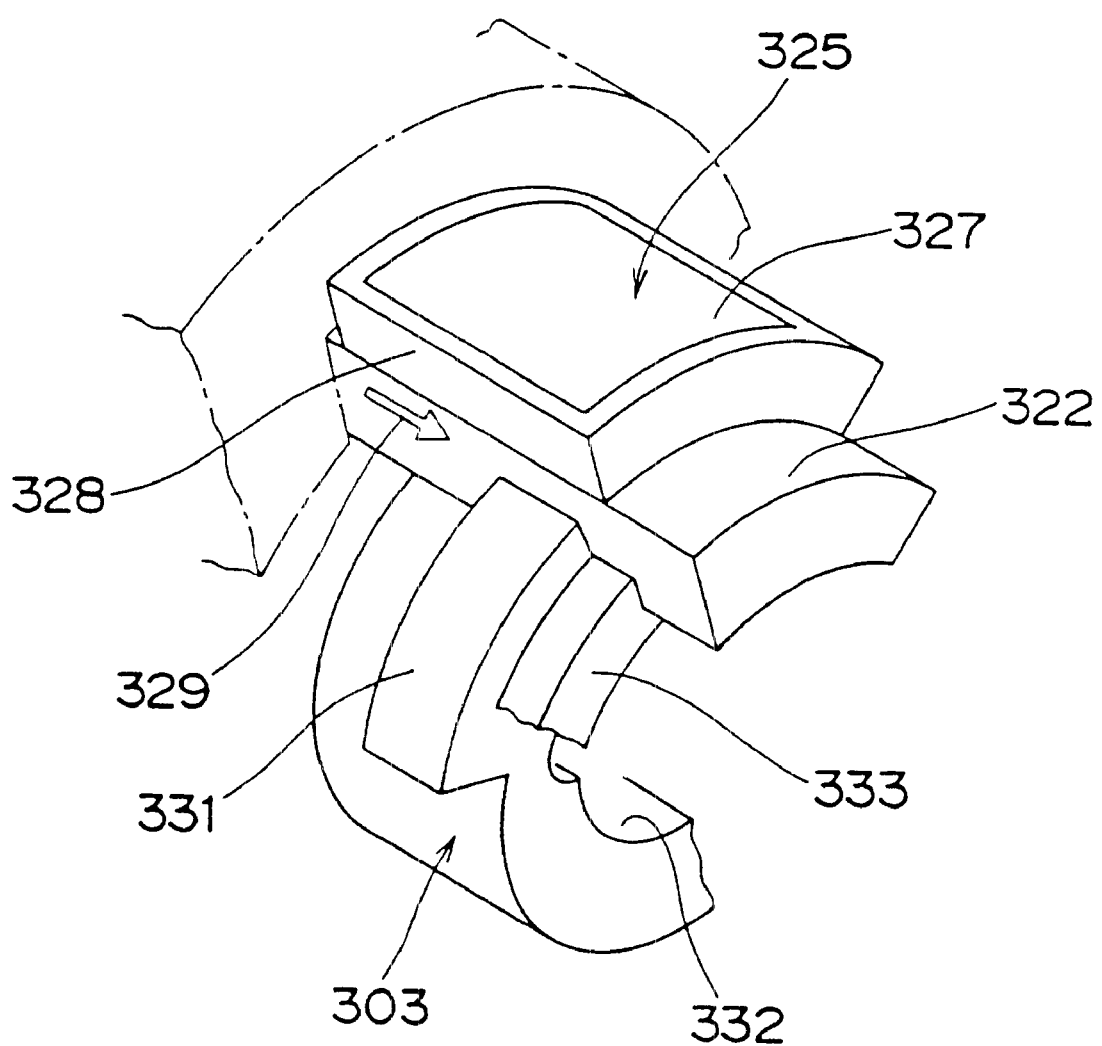
FIG. 13 is a schematic perspective view showing a state where a guide member and a connecting member are combined with a fitting projection of a pulley main body in the variable radius pulley shown in FIG. 8.

It is also considered that a slide bearing such as a cylindrical bush is provided as a guide member for guiding relative axial displacement between both the pulley main bodies 305 and 306. In such a case, however, lubricating oil or grease with which the bush is filled may leak. In addition, the bush is also provided in a portion where there is no counterpart member to be slid, so that a space is useless, and intensity is insufficient. In the present embodiment, therefore, the circular arc-shaped guide members 325 respectively circumscribing the fitting projections 322 are provided, as shown in FIG. 13. That is, the sealing members 328 are respectively abutted against edges of the fitting projections 322 such that lubricating oil or grease with which the bush is filled does not leak outward upon being transmitted through edges of the fitting projections 322, as indicated by an arrow 329 in FIG. 13. Therefore, it is possible to prevent the lubricating oil or the like from leaking.

Figure 14:
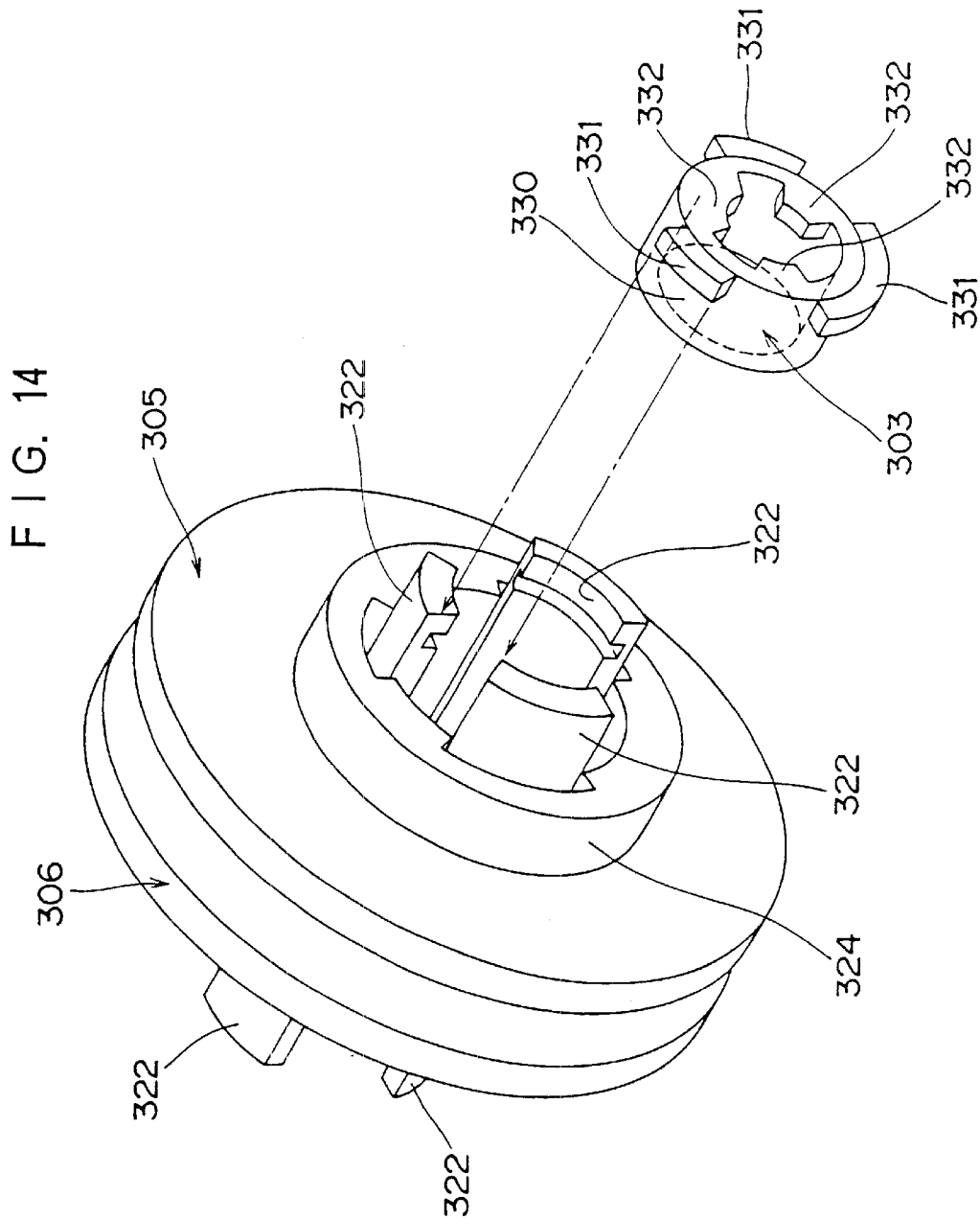
FIG. 14 is an exploded perspective view showing a state where a connecting member is combined with both pulley main bodies which are combined with each other in the variable radius pulley shown in FIG. 8.

As shown in FIG. 14, both the pulley main bodies 305 and 306 respectively have the fitting projections 322 passed through counterpart fitting grooves 323. Consequently, both the pulley main bodies 305 and 306 are coupled to each other by spline such that they can integrally rotate while allowing relative movement in the axial direction. The fitting projections 322 of the pulley main bodies 305 and 306 respectively constitute portions penetrating the respective other pulley main bodies 306 and 305. In FIG. 8, the left pulley main body 306 is integrally rotatable upon being coupled to the right connecting member 303 by spline. Further, the right pulley main body 305 is integrally rotatable upon being coupled to the left connecting member 304 by spline. That is, referring to FIG. 14, each of the connecting members 303 and 304 has a plurality of fitting projections 331 formed equally spaced in the circumferential direction on the outer periphery at one end of its cylindrical section 330, and the fitting projections 331 are respectively engaged with the fitting projections 322 of the corresponding pulley main body 305 or 306, to achieve spline coupling. Each of the connecting members 303 and 304 is prevented from dropping out in the axial direction by a stopper 333 composed of a snap ring which is locked on inner peripheral surfaces of the fitting projections 322 of the corresponding pulley main body 305 or 306. The stopper 333 is fitted in a groove formed in the inner peripheral surfaces of the fitting projections 322 of the pulley main body 305 or 306.

Figure 15:
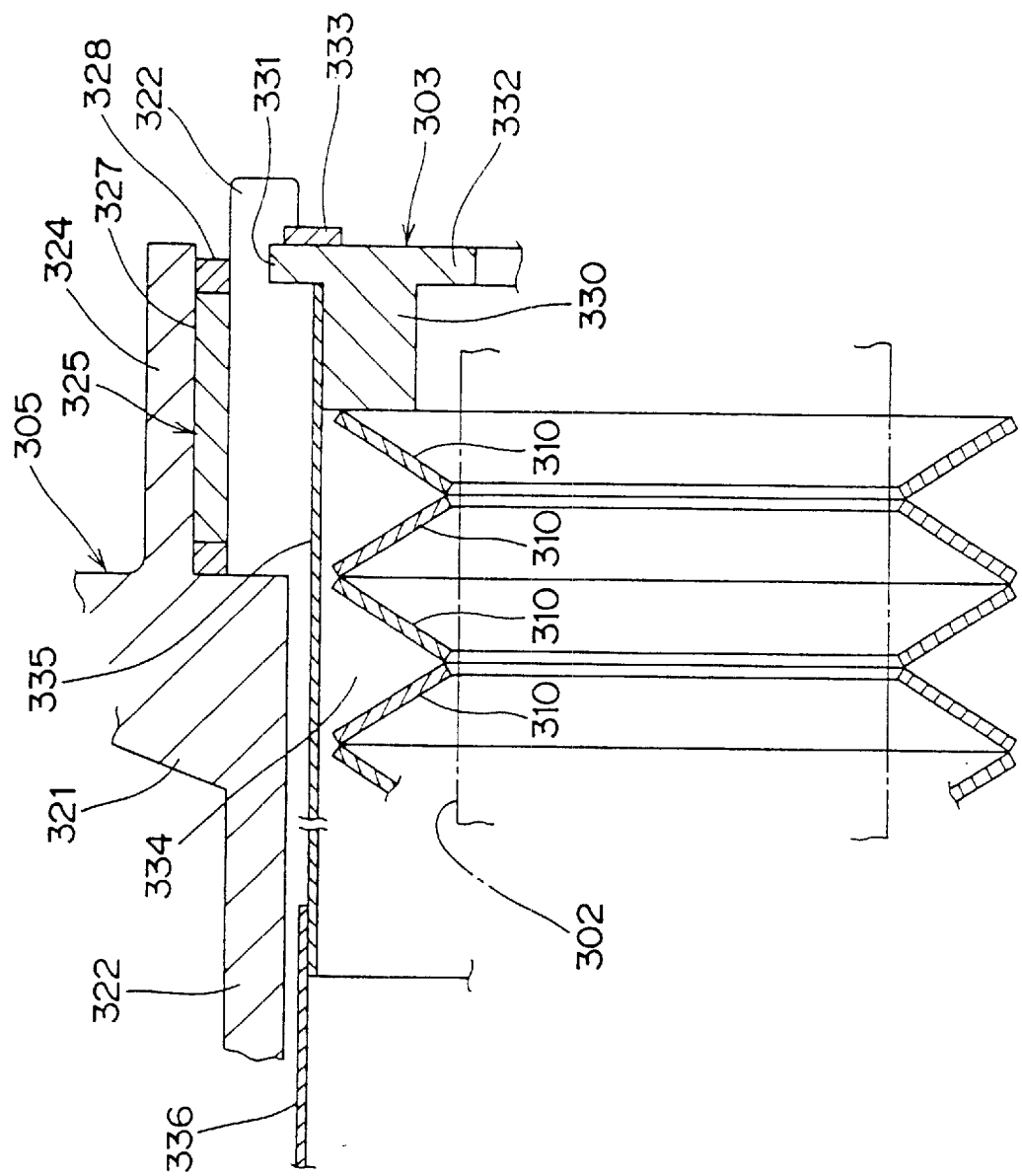
FIG. 15 is an enlarged sectional view of a portion in the vicinity of the inner periphery of the variable radius pulley shown in FIG. 8.
Figure 16:
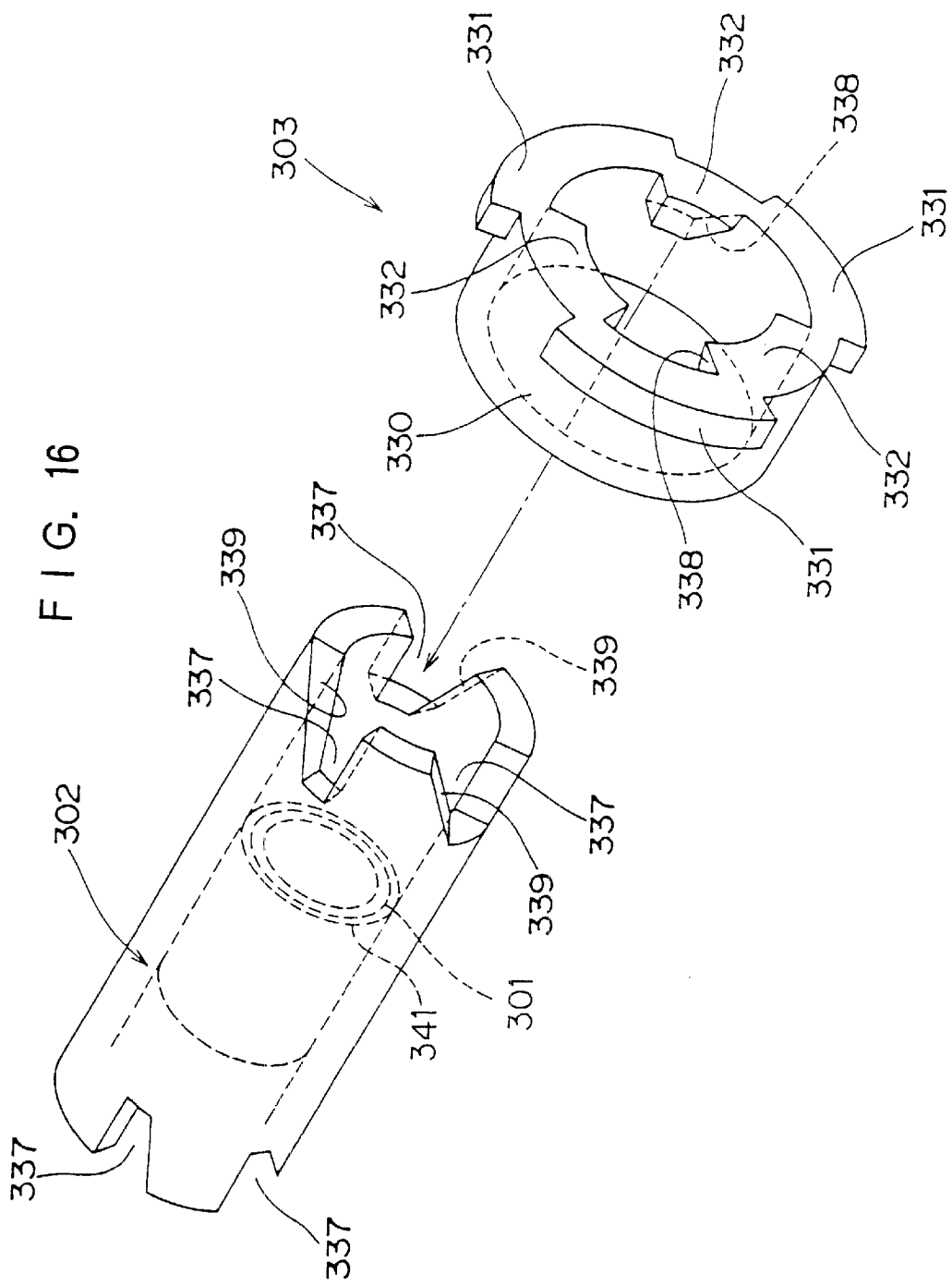
FIG. 16 is an exploded perspective view of a connecting member and a rotating shaft in the variable radius pulley shown in FIG. 8.

On the other hand, referring to FIG. 15, the Belleville springs 310 are contained in a containing space 334 defined by both the connecting members 303 and 304 between an inner peripheral surface of each of the pulley main bodies 305 and 306 and an outer peripheral surface of the intermediate member 302. The annular Belleville springs 310 are arranged so as to be concentric with the rotating shaft 301. The outer periphery of the containing space 334 is defined by cylinders 335 and 336 having small wall thickness serving as a pair of sealing members which are fitted and fixed to an outer peripheral surface of each of the connecting members 303 and 304. The cylinders 335 and 336 having small wall thickness are fitted to each other such that they are overlapped with each other so as to be slidable. The amount of overlapping is made variable as the connecting members 303 and 304 axially move from each other. The cylinders 335 and 336 having small wall thickness are made of a thin plate made of stainless, for example.

The containing space 334 is covered with the cylinders 335 and 336 having small wall thickness. Therefore, it is possible to reliably prevent lubricating oil or the like with which the containing space 334 is filled from leaking outward. In addition, it is possible to more reliably prevent lubricating oil or the like from leaking out by the function of the above-mentioned sealing member 328.

The Belleville springs 310 are arranged in opposite directions, to respectively urge both the pulley main bodies 305 and 306 in the directions away from each other through both the connecting members 303 and 304. That is, each of the connecting members 303 and 304 is always pressed against the corresponding stopper 333 by urging forces produced by the Belleville springs 310. Therefore, each of the connecting members 303 and 304 axially moves integrally with the corresponding pulley main body 306 or 305 while axially expanding and contracting the Belleville springs 310. Therefore, thee amount of the change in the width of the V groove 307 between both pulley main bodies 305 and 306 and all the amounts of stroke of the plurality of Belleville springs 310 are equal to each other.

Referring to FIG. 8, each of the connecting members 303 and 304 is supported so as to be rotatable on the outer peripheral surface of the intermediate member 302 through a slide bearing 340 such as a metal bush. Further, each of the connecting members 303 and 304 is coupled by a cam to the intermediate member 302. That is, referring to FIG. 16, a plurality of fitting projections 332 are formed equally spaced in the circumferential direction on the inner peripheral surface of each of the connecting members 303 and 304, and the fitting projections 332 are respectively fitted in a plurality of fitting grooves 337 formed equally spaced in the circumferential direction at both ends in the axial direction of the cylindrical intermediate member 302.

The fitting projection 332 and the fitting groove 337 are brought into contact with each other by inclined cam surfaces 338 and 339 which are engaged with each other. The directions of inclination of the cam surfaces 338 in both the connecting members 303 and 304 are set in opposite directions of rotation (similarly, the directions of the cam surfaces 339 in the fitting grooves 337 at both ends of the intermediate member 302 are set in opposite directions). When both the connecting members 303 and 304 are shifted in phase from the intermediate member 302, therefore, both the connecting members 303 and 304 are axially displaced by an equal distance in opposite directions. As a result, the pulley main bodies 305 and 306 move nearer to each other by an equal distance and move apart from each other by an equal distance.

The fitting projections 322 and the fitting groove 323 constitute first connection means for connecting the pair of pulley main bodies 306 and 305 so as to be integrally rotatable while allowing relative axial movement. The pairs of cam surfaces 338 and 339 connecting each of the connecting members 303 and 304 and the intermediate member 302 constitute the torque cam mechanism T. Each of the connecting members 303 and 304 and the corresponding torque cam mechanism T constitute second connection means for connecting the corresponding pulley main body 306 or 305 to the rotating shaft 301 such that it can transmit power.

At the time of transmitting torque, when both the pulley main bodies 305 and 306 which rotate integrally with each other produce rotational angular displacement from the rotating shaft 301, the rotational angular displacement is converted into such axial displacement that both the pulley main bodies 305 and 306 move nearer to or apart from each other by an equal distanced by the torque cam mechanisms T. Consequently, the center of the width of the belt 102 is always kept constant.

In the variable radius pulley 300 which is applied to a driven pulley, for example, load torque becomes a force to shift the pulley main bodies 305 and 306 in phase in the direction of rotation from the rotating shaft 301. The force to shift the pulley main bodies 305 and 306 in phase is converted by the torque cam mechanisms T, to be a force to move both the pulley main bodies 305 and 306 nearer to each other. The force is further converted into a force to displace a portion to be held of the power transmission ring 309 in the state shown in FIG. 16, for example, outward along the radius of the variable radius pulley 300 through the power transmission surfaces 315 and 316 which are composed of tapered surfaces and a force to increase the effective radius D of the belt 102.

When the torque slightly varies, the power transmission ring 309 corresponding to a stretched part of the belt 2 attempts to be inserted inward along the radius of the variable radius pulley 300 upon widening a, space between both the pulley main bodies 305 and 306 with the variation. However, the attempt can be prevented by urging forces produced by the Belleville springs 310 and a force to displace the power transmission ring 309 outward in the radial direction. Even if a force to decrease the effective radius by variation in the load torque is thus exerted, a force against the force can be produced by the torque cam mechanisms T, thereby making it possible to prevent the change in the effective radius D of the variable radius pulley which is caused by the variation in the load torque.

A screw mechanism may be employed as the torque cam mechanism. As the urging means, helical compression springs being concentric with the rotating shaft 301 can be also used in place of the Belleville springs 310.

In the second embodiment, the same advantages as the advantages 1) to 5) and 8) described in the first embodiment are obtained. In addition, the following advantages exist. That is:

9) Both the pulley main bodies 305 and 306 are displaced by an equal amount of displacement in opposite directions by the function of the torque cam mechanisms T, so that the center of travel of the belt 102 can be always kept constant. Consequently, there are no possibilities that an unnecessary force is applied to the belt 102 by speed variation, and the belt 102 drops out of the pulley.

10) The load torque to the variable radius pulley 300 can be converted into a force to bring both the pulley main bodies 305 and 306 nearer to each other by the torque cam mechanisms T serving as a change gear mechanism. Accordingly, a suitable force to bring both the pulley main bodies 305 and 306 nearer to each other can be obtained depending on the load torque. As a result, the urging forces produced by the Belleville springs 310 serving as the urging means can be decreased, thereby making it possible to reduce friction loss.

11) Variation in the torque transmitted between the rotating shaft 301 and the belt 102 can be prevented by the elastic member 341 mounted through the torque transmission path, thereby making it possible to reduce vibration and noises of an equipment on the driven side and improve the durability thereof.

When the variable radius pulley 300 in the second embodiment is used as a driving pulley, it is possible to construct a dynamic damper using the elastic member 341 as a spring member and using members elastically supported in the direction of rotation by the elastic member 341 (i.e., the intermediate member 302, both the connecting members 303 and 304, and both the pulley main bodies 305 and 306) as weight members. Consequently, it is possible to effectively prevent torsional vibration of a driving system for driving the rotating shaft 301.

In the second embodiment, for example, an elastic member for preventing the torque vibration or preventing the torsional vibration may be arranged in any position of the torque transmission path, provided that it transmits torque. Further, the dynamic damper can be also adapted to an oscillation frequency to be damped by mounting a dummy weight as the weight member used for the dynamic damper in the range in which the dynamic damper is not increased in size.

Third Embodiment

Figure 17:
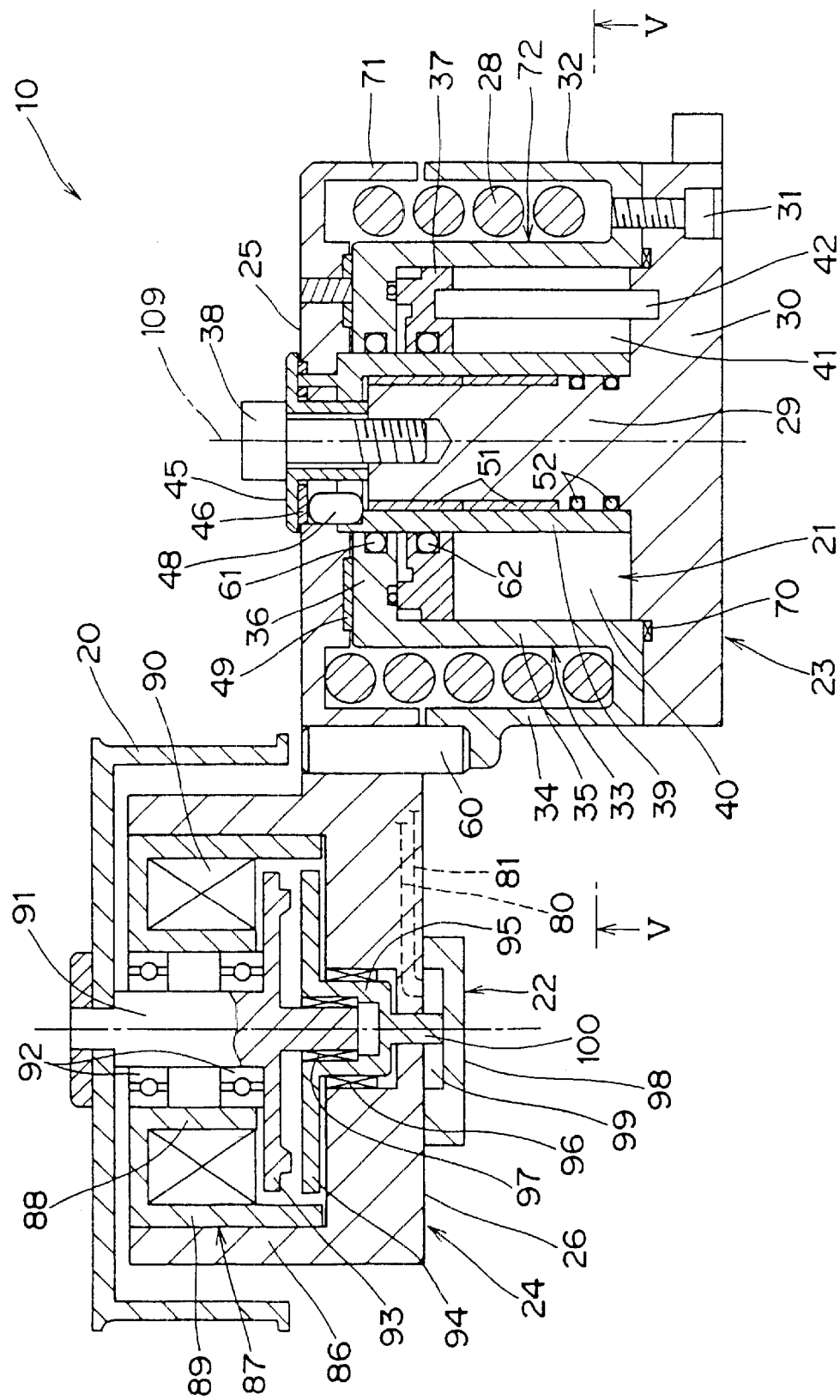
FIG. 17 is a cross-sectional view of a tensioner in a belt type continuously variable speed system according to a third embodiment of the present invention.

FIGS. 17, 18A and 18B illustrate a tensioner 10 used for a belt type continuously variable speed system according to a third embodiment of the present invention. FIGS. 18A and 18B correspond to a cross section along a line V—V shown in FIG. 17. FIGS. 18A and 18B shows how a belt 102 is wound so as to be slightly different from FIG. 1 for simplification. However, FIGS. 18A and 18B are actually the same as FIG. 1.

Referring to the drawings, the difference in construction between the third embodiment and the embodiment shown in FIG. 1 (i.e., the first embodiment) in that the tensioner 10 contains a hydraulic pump 22 serving as a hydraulic source which is connected to a tensioner pulley 20 through a clutch 85 and a vane motor 21 serving as a hydraulic actuator for changing the position where the tensioner pulley 20 operates upon receipt of the supply of working oil from the hydraulic pump 22.

The operation of the tensioner pulley 20 is controlled by a controller 12. An output signal from a first speed sensor 115 relating to the rotational speed of a variable radius pulley 300 (not shown in FIGS. 18A and 18B) and an output Id signal from a second speed sensor 116 relating to the rotational speed of an idler pulley 106 (not shown in FIGS. 18A and 18B) are inputted, as in the first embodiment, to the controller 12.

The clutch 85 is composed of an electromagnetic clutch, for example, and is switched to a state where both the tensioner pulley 20 and the hydraulic pump 22 are driven and connected and a state where the driving connection is cut by receiving a signal from the controller 12.

As control carried out by the controller 12, such control is carried out that the number of revolutions of an auxiliary machine is relatively higher than the number of revolutions of an engine in a state where the number of revolutions of the engine is lower than a predetermined level, and the number of revolutions of the auxiliary machine is relatively lower than the number of revolutions of the engine in a state where the number of revolutions of the engine is not less than the predetermined level. Further, the controller 12 detects the traveling speed of the belt 102 by input of the output signal from the second speed sensor 116, and adjusts the amount of displacement of the tensioner pulley 20 by the vane motor 21 such that the ratio of the traveling speed to the number of revolutions of the engine is a predetermined ratio.

Referring to FIG. 17 which is a schematic sectional view of the tensioner 10, the tensioner 10 comprises a fixed member 23 fixed to the body or the like of a driving source of a vehicle and a swing member 24 having its base end 25 supported on the fixed member 23 so as to be swingable around an axis of rotation 109. The tensioner pulley 20 is supported so as to be rotatable on an end 26 of the swing member 24 through a rotating shaft 91 and a rolling bearing 92. The tensioner pulley 20 is engaged with the belt 102.

An urging member 28 composed of a helical torsion coil spring arranged so as to be concentric with the axis of rotation 109 is engaged with the fixed member 23 and the swing member 24. The urging member 28 rotates and urges the swing member 24 in the direction in which the tensioner pulley 20 elastically presses the belt 102 (in a clockwise direction in FIGS. 18A and 18B). Reference numeral 60 denotes a stopper pin for regulating the angle of swing of the swing member 24 in a predetermined range. The fixed member 23 comprises a lower member 30 having a boss 29 and a double cylindrical upper member 32 integrally fixed to the lower member 30 by a screw 31. The upper member 32 comprises an inner cylinder 33 opened downward in the drawing and an outer cylinder 34 opened upward in the drawing. The urging member 28 composed of the above-mentioned helical torsion coil spring is contained in the outer cylinder 34. On the other hand, a cylindrical section 71 being concentric with an axis of rotation K is formed at the base end 25 of the swing member 24, and the cylindrical section 71 contains a part of the urging member 28.

The inner cylinder 33 comprises a cylindrical section 35 and an annular first end surface plate 36 formed integrally with an upper end of the cylindrical section 35. A second end surface plate 37 is arranged adjacent to an inner surface of the first end surface plate 36. The second end surface plate 37 and the inner cylinder 33 of the lower member 30 and the upper member 32 in the fixed member 23 constitute a casing 72 of the vane motor 21.

On the other hand, a sleeve 39 fixed to the base end 25 of the swing member 24 so as to be integrally rotatable by a screw 38 is fitted so as to be swingable in the boss 29 of the lower member 30 in the fixed member 23. A pair of cylindrical slide members 51 arranged in the axial direction is interposed between an inner peripheral surface of the sleeve 39 and an outer peripheral surface of the boss 29. Paired O-rings 52 for sealing a portion between the inner peripheral surface of the sleeve 39 and the outer peripheral surface of the boss 29 are arranged a distance away from each other in the axial direction below the slide members 51. The sleeve 39 constitutes, a rotor of the vane motor 21, and a plurality of vanes 40 composed of rectangular plates extending in the radial direction are integrally formed equally spaced in the circumferential direction on an outer peripheral surface of the sleeve 39 constituting the rotor (see FIGS. 18A and 18B).

Referring to FIGS. 18A and 18B, a casing 72 is partitioned into a plurality of chambers by partitioning members 41, which are in a fan shape in cross section, arranged equally spaced in the circumferential direction. A fixed shaft 42 (see FIG. 17) penetrating the partitioning member 41 fixes the second end surface plate 36 and the partitioning member 41 to the lower member 30 in the fixed member 23. The vane 40 is contained in each of the plurality of chambers, and each of the chambers is partitioned into a pair of oil chambers 54 and 55 by the vane 40.

Each of the oil chambers 54 and 55 is connected to the hydraulic pump 22 through a discharge-side oil path 80 and a return-side oil path 81. A check valve 82 allowing only the flow of working oil to the vane motor 21 is arranged in the discharge-side oil path 80. A portion, on the vane motor 21 side of the check valve 82, of the discharge-side oil path 80 is connected to the return-side oil path 81 through a communicating path 83 having a chock 84.

When the position where the tensioner pulley 20 operates is changed, the working oil is supplied to the high-pressure oil chamber 54 through the discharge-side oil path 80 from the hydraulic pump 22, and the working oil is discharged to the hydraulic pump 22 through the return-side oil path 81 from the low-pressure oil chamber 55, as shown in FIG. 18B. Therefore, each of the vanes 40 rotates together with the sleeve 39 serving as a rotor. Accordingly, a driving force is provided to swing and displace the swing member 24 and the tensioner pulley 20 in the direction in which belt tension is increased (in a clockwise direction in FIGS. 18A and 18B).

Referring to FIG. 17 again, the screw 38 is inserted into the; boss 29 of the lower member 30 in the fixed member 23 through a flanged collar 45. Consequently, the flanged collar 45 is fixed so as not to be rotatable in a state where it is interposed between the head of the screw 38 and an upper end surface of the boss 29, to be a supporting shaft for supporting the swing of the swing member 24. Reference numerals 46 and 49 denote slide members. Reference numeral 48 denotes a pin for connecting the sleeve 39 and the swing member 24 to each other so as to be integrally rotatable.

O-rings 61 and 62 are respectively interposed between inner peripheral surfaces of the first and second end surface plates 36 and 37 and an outer peripheral surface of the sleeve 39. Accordingly, respective portions between the sleeve 39 serving as a rotor and the end surface plates 36 and 37 of the casing 72 are sealed. On the other hand, a mating surface of the lower member 30 and the upper member 32 in the fixed member 23 is sealed by a sealing member 70.

A hub 86 is provided at an end of the swing member 24, and a double cylindrical yoke 87 is fitted in and fixed to the hub 86. A field coil 90 is fixed between an inner cylinder 88 and an outer cylinder 89 of the yoke 87. The inner cylinder 88 of the yoke 87 supports the rotating shaft 91, which rotates integrally with the tensioner pulley 20 so as to be rotatable through the rolling bearing 92.

An input-side friction plate 93 composed of a rotating disc is integrally formed in an intermediate portion of the rotating shaft 91. An output-side friction plate 94 composed of a rotating disc is opposed to the input-side frictional plate 93 with a predetermined clearance provided therebetween. The output-side friction plate 94 has a boss 95 at its center. The boss 95 is supported so as to be rotatable and axially movable through a bearing 96 in a supporting hole of the swing member 24. An end of the rotating shaft 91 is inserted into the inner periphery of the boss 95, and is supported so as to be rotatable and relatively movable in the axial direction through a bearing 97. A rotor 99 of the hydraulic pump 22 is fixed so as to be integrally rotatable to a shaft 100 projected in the boss 95 of the output-side friction plate 94. A pump housing 98 containing the rotor 99 is fixed in a fluid-tight manner to the bottom of the end of the swing member 24. A trochoid pump, for example, can be indicated as the type of the hydraulic pump 22.

The clutch 85 is constituted by the yoke 87, the field coil 90, and the friction plates 93 and 94. In the clutch 85,: when the field coil 90 is excited upon passing an exciting current, the output-side friction plate 94 is sucked in by the input-side friction plate 93 by the function of a magnetic field produced by the excitation. The clutch 85 enters a connected state by connecting both the friction plates 93 and 94, and the hydraulic pump 22 is driven and connected to the tensioner pulley 20.

Consequently, the hydraulic pump 22 is driven, so that high-pressure working oil is supplied toward the vane motor 21 through the discharge-side oil path 80 having the check valve 82 from the hydraulic pump 22, while low-pressure working oil is returned to the hydraulic pump 22 through the return-side oil path 81 from the vane motor 21, as shown in FIG. 18B. Consequently, a resultant force produced by the elastic member 28 and the hydraulic pump 22 serving as a hydraulic actuator in the tensioner 10 to make the power transmission ring 206 eccentric is larger than an urging force produced by the diaphragm spring 211 serving as an urging member of the variable radius pulley 300 to urge the power transmission ring 206 toward the concentric side. Consequently, the vane motor 21 swings and displaces the swing member 24 in a clockwise direction, as shown in FIG. 18B, to change the position where the tensioner pulley 20 is operated, thereby changing the tension on the belt 102. As a result, the effective radius of the variable radius pulley 300 is so changed as to be decreased.

On the other hand, when the clutch 85 is disengaged, to stop the hydraulic pump 22, the supply of the working oil to the vane motor 21 is cut off so that the vane motor 21 is stopped. At this time, the urging force produced by the diaphragm spring 211 serving as the urging member to urge the power transmission ring 206 toward the concentric position is larger than a force produced by the elastic member 28 to make the power transmission ring 206 eccentric. Therefore, the swing member 24 is returned to its original state by the belt 102, as shown in FIG. 18A. Consequently, the tension on the belt 102 is returned to its original state before being changed.

When the clutch 85 is disengaged so that the hydraulic motor 22 and the vane motor 21 are stopped, the check valve 82 is closed so that the high-pressure working oil stays in the discharge-side oil path 80, as shown in FIG. 18A. However, the high-pressure working oil which stays is gradually returned to the hydraulic pump 22 through the communicating path 83 having the chock 84 and the return-side oil path 81, as indicated by a broken line in FIG. 18A.

If the working oil in the vane motor 21 is returned toward the hydraulic pump 22 when the clutch 85 is disengaged, the swing member 24 vibrates with the return. As a result, vibration may be generated in the belt 102. Contrary to this, in the present embodiment, hydraulic pressure is gradually decreased, as described above, when the clutch 85 is disengaged, thereby making it possible to prevent the vibration of the belt 102 from being generated.

In the third embodiment, there are the same advantages as the advantages 1) to 5) in the first embodiment. In addition, the following advantages exist. That is:

12) The tension on the belt 102 can be changed only by disengaging the clutch 85, so that the construction of the system can be simplified without using a complicated oil path structure and control valve mechanism which have been conventionally required.

13) The contained hydraulic pump 22 is stopped when it is not required, so that energy saving can be achieved, and the life of the pump can be lengthened.

14) Moreover, the system is stable without generating unnecessary vibration in the belt 102 even when the clutch is disengaged.

Although in the third embodiment, an electromagnetic clutch is used as the clutch 85, the clutch is not limited to the same. For example, a centrifugal clutch can be used. Further, a clutch obtaining an operating force, using negative pressure of the engine can be also used.

Fourth Embodiment

FIGS. 19A, 19B, 20, 21 and 22 illustrate a fourth embodiment of the present invention.

Referring to FIGS. 19A and 19B, in a system 400, an endless belt 102 driven by a variable radius pulley 107 (having the same structure as that shown in FIG. 5) serving as a driving pulley connecting with an output shaft of a driving source of a vehicle as in FIG. 1 is successively wound around a tensioner pulley 403, an idler pulley 402 whose position is fixed, and the variable radius pulley 107 which are included in a tensioner 401. The belt 102 is also wound around driven pulleys provided in rotating shafts of one to a plurality of auxiliary machines, which is not illustrated. Examples of the auxiliary machine include a supercharger, an air pump, an alternator, a compressor for an air conditioner, a hydraulic pump for a power steering, and a water pump.

The tensioner 401 for adjusting a change gear ratio comprises a fixed member 404 fixed to the body or the like of the driving source of the vehicle and a swing member 406 serving as a movable member which is swingable and displaceable around an axis of rotation 405 with respect to the fixed member 404. The tensioner pulley 403 is supported on an end of the swing member 406 so as to be rotatable. A stepping motor 408 serving as a driving source for driving the swing member 406 through a drive transmission mechanism 407 is supported on the fixed member 404. The drive transmission mechanism 407 comprises a worm 409 mounted on the same axis of a rotating shaft 418 of the stepping motor 408 so as to be integrally rotatable and a worm wheel 410 engaged with the worm 409 and supported thereon so as to be rotatable around the axis of rotation 405.

Reference numeral 419 denotes a controller receiving a signal S relating to the rotational speed of the driving source of the vehicle for controlling the operation of the stepping motor 408 on the basis of the signal S. Specifically, when the rotational speed of the driving source of the vehicle is lower than a predetermined value, the swing member 406 is rotated in a clockwise direction (a first direction in which the tensioner pulley 403 gives tension to the belt 102), as shown in FIG. 19A, thereby decreasing the effective radius of the variable radius pulley 107 serving as a driving pulley to make the rotational speed of the auxiliary machine relatively higher. On the other hand, when the rotational speed of the driving source of the vehicle is higher than the predetermined value, the swing member 406 is rotated in a counterclockwise direction (a direction; opposite to the first direction), as shown in FIG. 19B, to draw the belt 102, thereby making the effective radius of the variable radius pulley 107 relatively larger.

Figure 20:
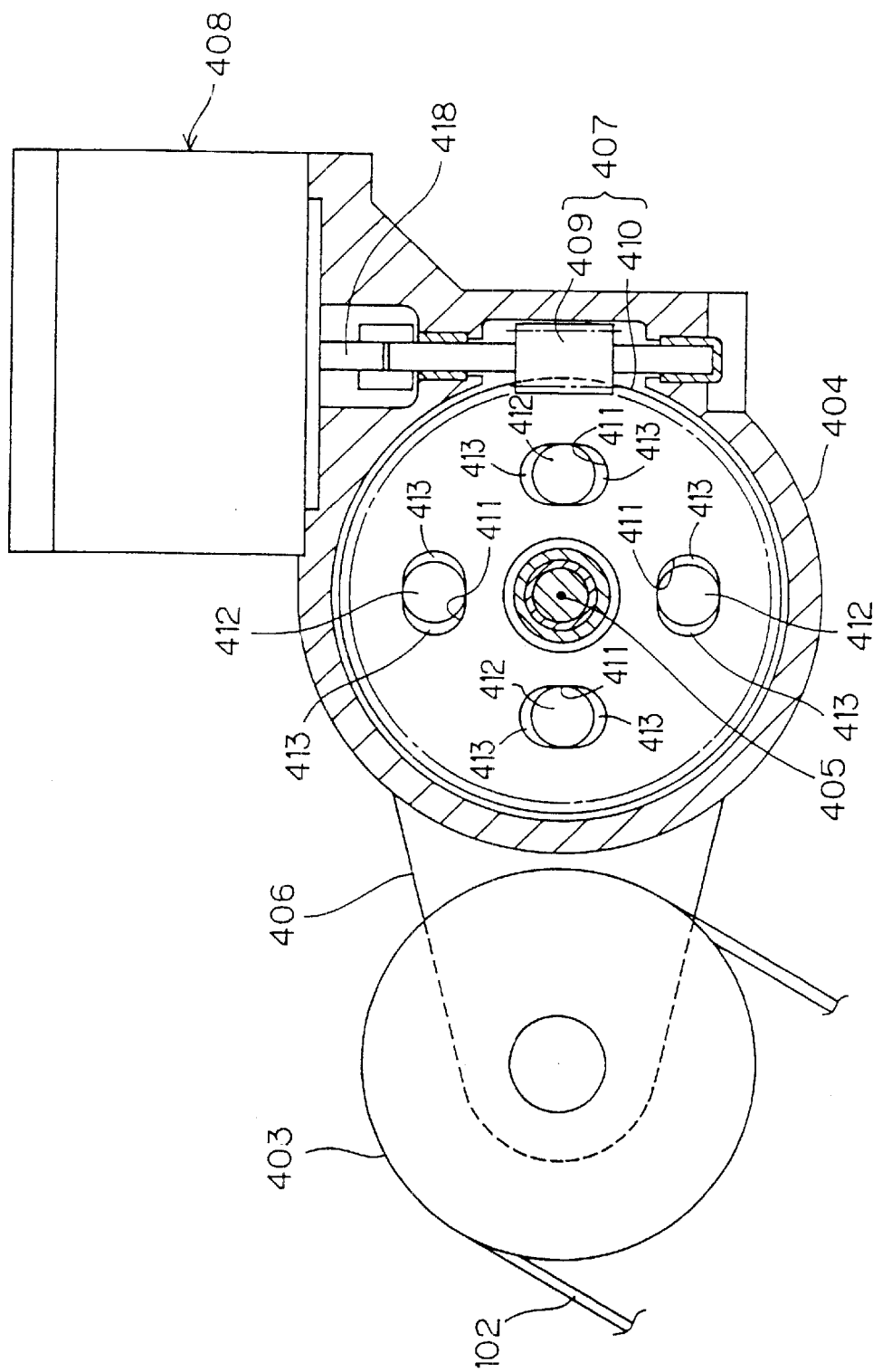
FIG. 20 is a partial sectional front view of a tensioner included in the system shown in FIGS. 19A and 19B.

Referring to FIG. 20, the worm wheel 410 has a plurality of connecting holes 411 formed upon penetrating equally spaced in the circumferential direction, centered around the axis of rotation 405 On the other hand, a rotating member 433, described later, connected to the swing member 406 so as to be integrally rotatable has a plurality of cylindrical connecting projections 412 idly fitted, respectively, in the plurality of connecting holes 411 integrally formed therein equally spaced in the circumferential direction, centered around the axis of rotation 405. Consequently, the rotating member 433 which rotates integrally with the swing member 406 and the worm wheel 410 are driven and connected to each other with a predetermined idle area 413 provided in the direction of rotation therebetween. That is, the worm wheel 410 and the swing member 406 are driven and connected to each other with the idle area 413 provided therebetween.

The tensioner 401 comprises an elastic member 414 (see FIG. 21) composed of a helical torsion coil spring for urging the swing member 406 in the direction in which the tensioner pulley 403 gives tension to the belt 102 and a friction member 436 (see FIG. 21) serving as a damping force producing member for giving frictional resistance to the swing of the swing member 406, which is not illustrated in FIGS. 19A, 19B and 20.

In the fourth embodiment, the relationship between a force produced by the elastic member 414 in the tensioner 401 and the stepping motor 408 serving as an actuator to make a power transmission ring 206 eccentric through the belt 102 and a force produced by a diaphragm spring 211 serving as an urging member of the variable radius pulley 107 to urge the power transmission ring 206 toward the concentric position is actively changed by the stepping motor 408, thereby achieving speed variation.

In a state shown in FIG. 20 corresponding to FIG. 19A, the idle areas 413 are formed on both sides of the connecting projection 412, and the swing member 406 and the tensioner pulley 403 are disconnected to the worm wheel 410. On the other hand, in a state shown in FIG. 22 corresponding to FIG. 19B, the worm wheel 410 rotates in a clockwise direction, so that the connecting projection 411 of the rotating member 433 is engaged with a lagging end in the opposite direction of rotation of the connecting projection 412, to rotate the rotating member 433, the swing member 406, and the tensioner pulley 403 in a clockwise direction in a state where there is no idle therebetween.

Figure 21:
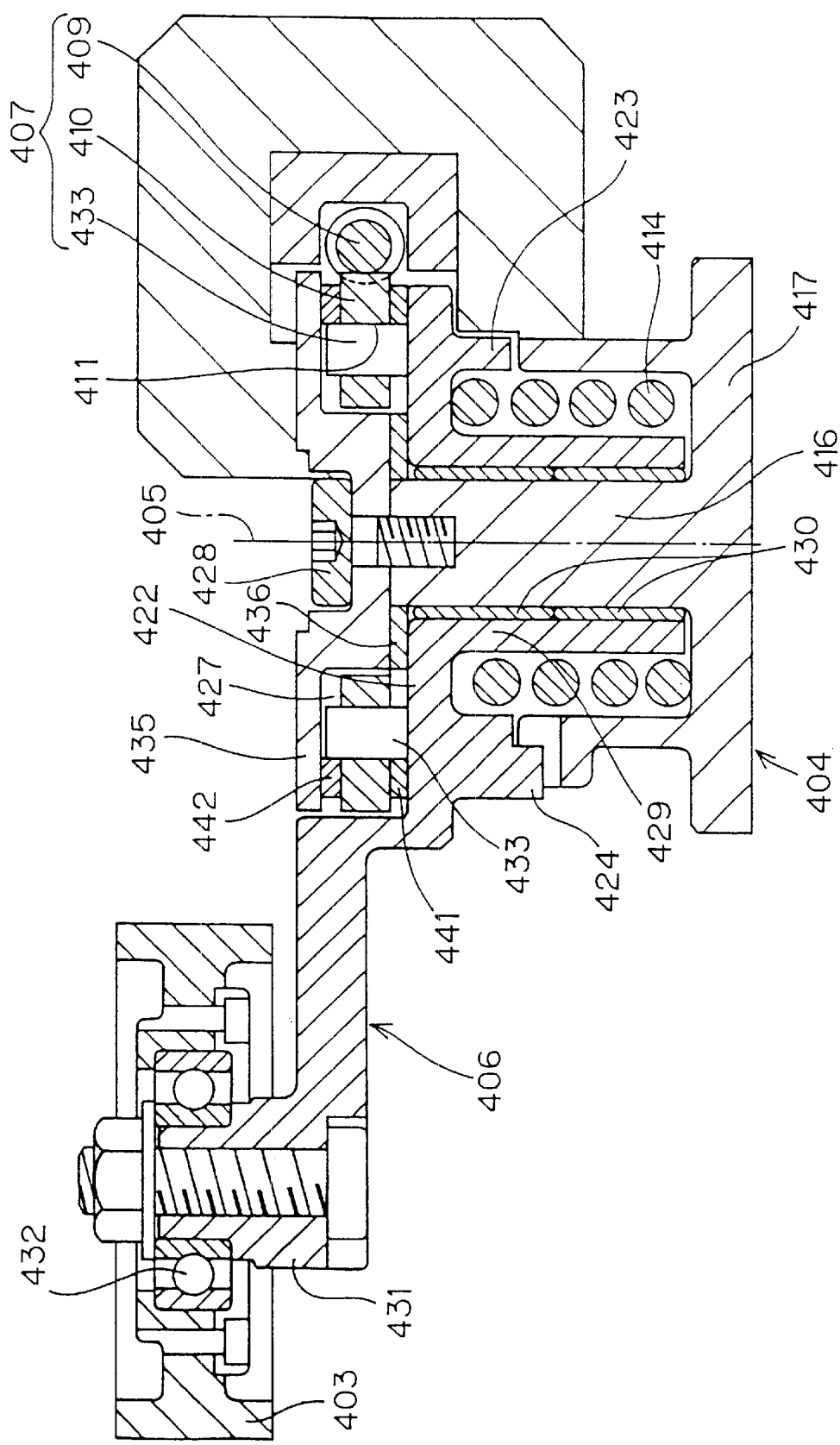
FIG. 21 is a longitudinal sectional view of the tensioner shown in FIG. 20.
Figure 22:
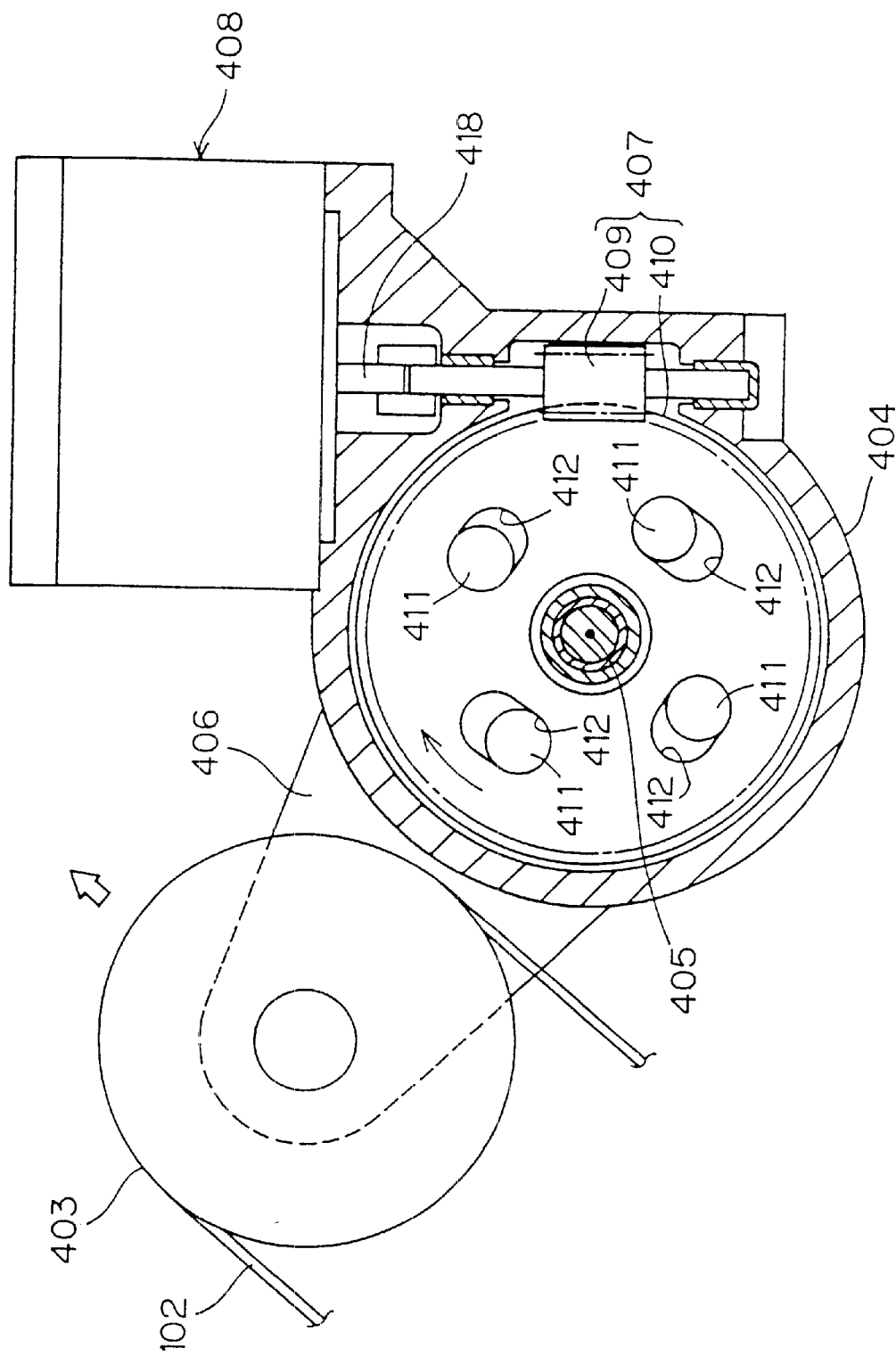
FIG. 22 is a partial sectional front view of the tensioner shown in FIG. 20, which illustrates a state where the tensioner draws a belt.

Referring to FIG. 21, the tensioner pulley 403 is supported on an end 431 of the swing member 406 so as to be rotatable through a rolling bearing 432. The fixed member 404 comprises a lower member 417 having a boss 416. The elastic member 414 composed of the helical torsion coil spring arranged so as to be concentric with the axis of rotation 405 and having its one end and the other end respectively engaged with the fixed member 404 and the swing member 406 is contained in the lower member 417.

On the other hand, a cylindrical section 423 being concentric with the axis of rotation 405 is formed at a base end 422 of the swing member 406, and the cylindrical section 423 contains a part of the elastic member 414. The elastic member 414 rotates and urges the swing member 406 in the direction in which the tensioner pulley 403 elastically presses the belt 102 (in a clockwise direction. in FIG. 21). Reference numeral 424 denotes a stopper pin for regulating the angle of swing of the swing member 406 in a predetermined range.

The worm 409 and the worm wheel 410 which serve as the drive transmission mechanism 407 and the rotating member 433 are contained in a containing space 427 defined by a flanged collar 435 and the base end 422.

On the other hand, a sleeve 429 arranged on the side of the inner diameter of the base end 422 of the swing member 406 is fitted in the boss 416 of the lower member 417 in the fixed member 404 so as to be swingable. A pair of cylindrical swing members 430 arranged in the axial direction is interposed between an inner peripheral surface of the sleeve 429 and an outer peripheral surface of the boss 416.

A thrust bush 441, the worm wheel 410, a thrust bush 442, and the flanged collar 435 are successively fitted in the base end 422 in ascending order from the bottom in the drawing. The rotating member 433 is connected to the base end 422 so as to be integrally rotatable. The annular worm wheel 410 is supported so as to be rotatable by the thrust bushes 441 and 442. As described above, the rotating member 433 is idly fitted in the connecting hole 411 of the worm wheel 410.

A screw 428 is inserted into the boss 416 of the lower member 417 in the fixed member 404 upon penetrating the flanged collar 435. Consequently, the flanged collar 435 is fixed so as not to be rotatable in a state where it is interposed between the head of the screw 428 and an upper end surface of the boss 416, to support the swing of the swing member 406.

The friction member 436 is interposed between a lower surface of a flange of the flanged collar 435 and the base end 422 of the swing member 406. The friction member 436 functions as a damping force producing member for giving frictional resistance to the swing of the swing member 406.

According to the present embodiment, the tensioner pulley 403 is swung and displaced in a clockwise direction by the stepping motor 408, to draw the belt 102, thereby making it possible to make the power transmission ring 206 eccentric, as shown in FIG. 19B, while separating both pulley main bodies 202 and 203 from each other against an urging force produced by the diaphragm spring 211 in the variable radius pulley 107, to change the effective radius of the wound belt 102. On the other hand, when the tensioner 401 swings and displaces the tensioner pulley 403 in a counterclockwise direction, to release the drawing of the belt 102, the power transmission ring 206 is returned to the concentric position, as shown in FIG. 19A, by the urging force produced by the diaphragm spring 211.

In this state, in the tensioner 401, the idle areas 413 are produced with respect to the rotation in both directions of the swing member 406 between the connecting projection 412 of the swing member 406 and the connecting hole 411 of the worm wheel 410. In this state, the tensioner pulley 403 is displaced to the position where the urging force produced by the diaphragm spring 211 serving as an elastic member on the side of the variable radius pulley 107 to urge the tensioner pulley 403 in a counterclockwise direction through the power transmission ring 206 and the belt 102 and the force produced by the elastic member 414 contained in the tensioner 401 to urge the tensioner pulley 403 in a clockwise direction through the swing. member 406 are balanced with each other. That is, the elastic member 414 in the tensioner 401 elastically supports the swing member 406 and the tensioner pulley 403, thereby making it possible to perform the same function as that of a normal auto-tensioner and to restrain vibration of the belt and variation in the tension on the belt.

Particularly, the elastic member 414 and the friction member 436 function as a dynamic damper in cooperation with each other, thereby making it possible to effectively restrain the vibration of the belt and the variation in the tension on the belt and to reliably prevent the slip and the production of chatter or the like of the belt.

Since a worm gear mechanism is used as the drive transmission mechanism 407 in the type in which the tensioner pulley 403 swings, the stepping motor 408 serving as a driving source is not easily affected by reversed input from the tensioner pulley 403. As a result, the position of the tensioner pulley 403 can be held more reliably.

Since the stepping motor 408 can hold the position for rotation by being stopped, positioning is easy, and a mechanism for holding the position for rotation need not be separately provided. Therefore, the fabrication cost can be made lower, as compared with that in a case where a servomotor or the like is used.

Fifth Embodiment

Figure 23:
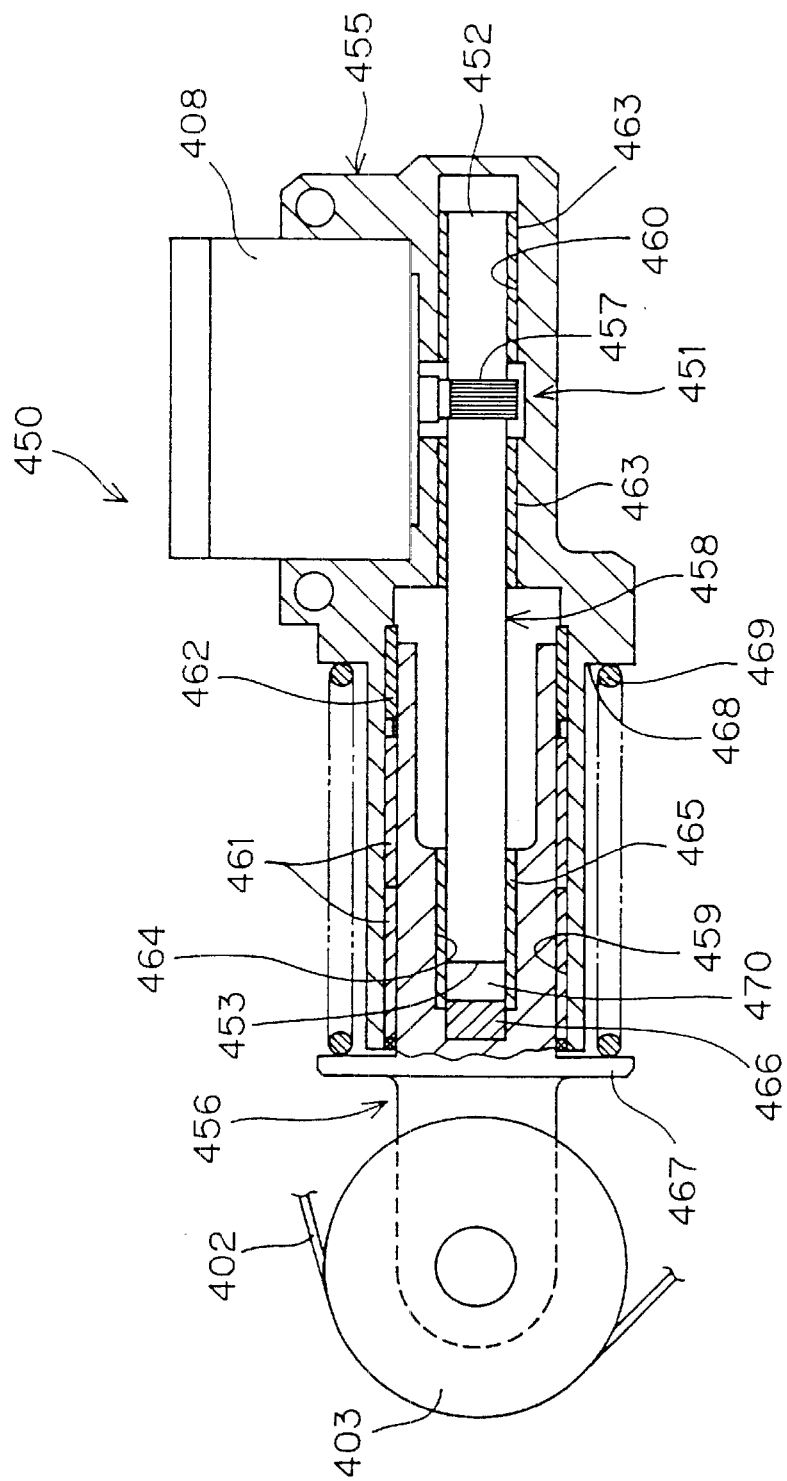
FIG. 23 is a partial sectional front view of a tensioner in a belt type continuously variable speed system according to a fifth embodiment of the present invention.
Figure 24:
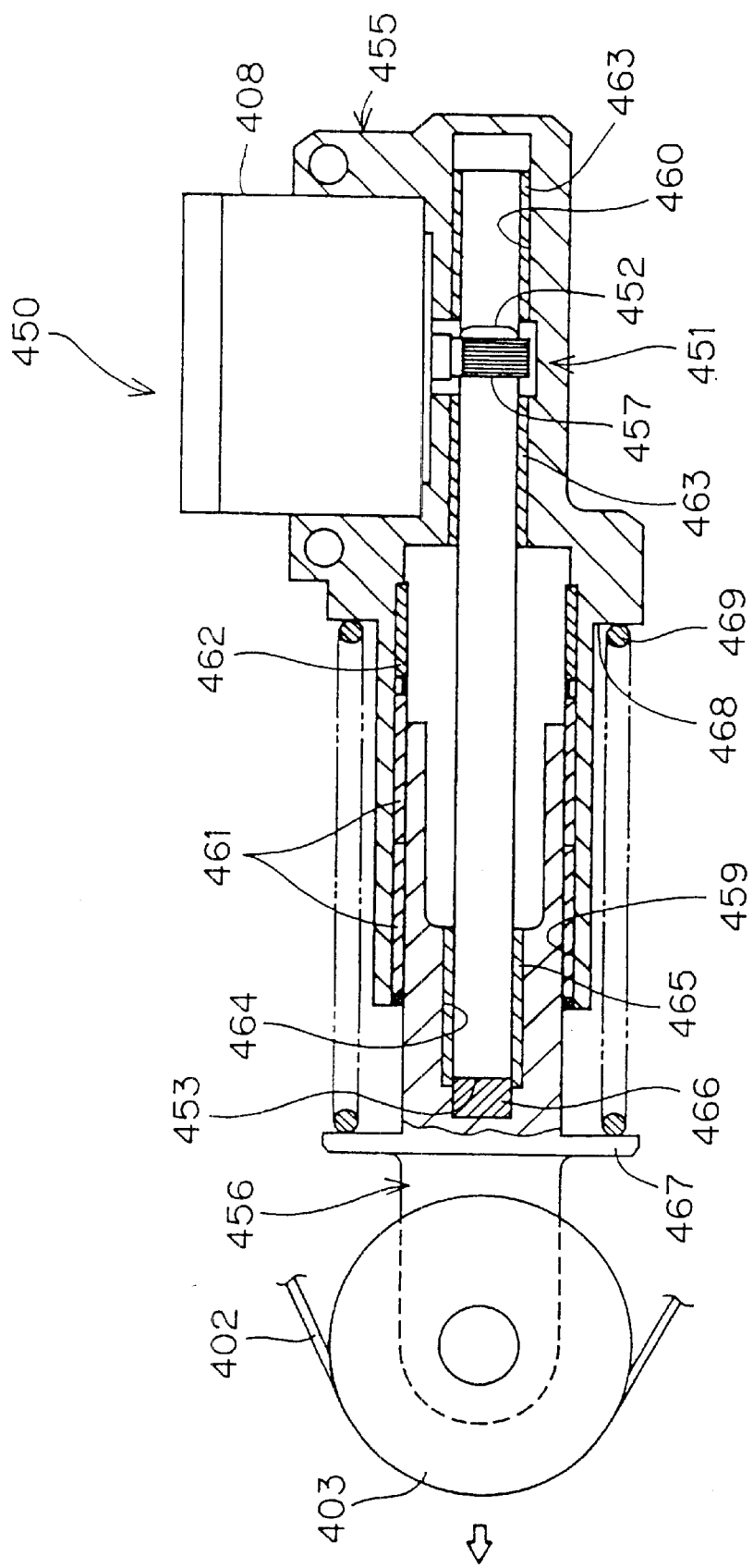
FIG. 24 is a partial sectional front view of the tensioner shown in FIG. 23, which illustrates a state where the tensioner draws a belt.

FIGS. 23 and 24 illustrate a tensioner in a system according to a fifth embodiment of the present invention. The fifth embodiment mainly differs from the fourth embodiment (shown in FIG. 20) in the following. That is, although the variable member is composed of the swing member which swings from the fixed member in the embodiment shown in FIG. 20, it is composed of a linear motion member which linearly moves from a fixed member in the fifth embodiment. Although the drive transmission mechanism for transmitting a driving force produced by the stepping motor 408 serving as a driving source to the variable member is composed of the worm gear mechanism in the embodiment shown in FIG. 20, it is composed of a rack and pinion mechanism in the present embodiment.

More specifically, a tensioner 450 comprises a fixed member 455 and a linear motion member 456 provided in the fixed member 455 so as to be linearly movable, and a tensioner pulley 403 is supported on an end of the linear motion member 456 so as to be rotatable. A stepping motor 408 serving as a driving source for driving the linear motion member 456 through a drive transmission mechanism 451 is supported on the fixed member 455. The drive transmission mechanism 451 comprises a pinion 457 mounted on a rotating shaft 418 of the stepping motor 408 so as to be integrally rotatable and a rack bar 458 having rack teeth engaged with the pinion 457 and capable of pressing the linear motion member 456 upon extending in the direction in which the linear motion member 456 moves.

The fixed member 455 has a cylinder 459 containing a part of the linear motion member 456 and supporting the part so as to be movable back and forth, and has a supporting hole 460 containing the rack bar 458 in an innermost part of the cylinder 459 and supporting the rack bar 458 so as to be movable back and forth.

A pair of bushes 461 for supporting the linear motion member 456 so as to be movable back and forth is fixed to an inner peripheral surface of the cylinder 459. A cylindrical friction member 462 serving as damping force producing means for giving frictional resistance to the movement of the linear motion member 456 in sliding contact with an outer peripheral surface of the linear motion member 456 is fixed to an inner peripheral surface of the innermost part of the cylinder 459. A pair of buses 463 for supporting one end of the rack bar 458 so as to be slidable is fixed to an inner peripheral surface of the supporting hole 460 of the fixed member 455. On the other hand, the other end 453 of the rack bar 458 is introduced into a supporting hole 464 formed in the linear motion member 456, and is supported so as to be slidable by a bush 465 fixed to an inner peripheral surface of the supporting hole 464. Reference numeral 466 denotes a cushioning member made of resin, for example, for cushioning shock at the time of contact with the other end 453 of the rack bar 458.

A flange 467 is formed on the outer periphery of an intermediate portion of the linear motion member 456, and an elastic member 469 composed of a helical compression spring for urging the linear motion member 456 in the direction in which the tensioner pulley 403 gives tension to the belt (leftward in the drawing) is interposed between the flange 467 and an annular step 468 formed in the fixed member 455.

In the fifth embodiment, the relationship between a force produced by the elastic member 469 in the tensioner 450 and the stepping motor 408 serving as an actuator to make a power transmission ring 206 eccentric through a belt 102 and a force produced by a diaphragm spring 211 serving as an urging member of a variable radius pulley 107 to urge the power transmission ring 206 toward the concentric position is actively changed by the stepping motor 408, thereby achieving speed variation.

FIG. 23 showing a state where the linear motion member 456 retreats toward the fixed member 455 corresponds to a state where the power transmission ring 206 is concentric as shown in FIG. 19A. In this state, a predetermined idle area 470 is formed between the other end 453 of the rack bar 458 and the cushioning member 466, as shown in FIG. 23.

FIG. 24 showing a state where the linear motion member 456 advances so as to draw the belt 102 corresponds to a state where the power transmission ring 206 is eccentric as shown in FIG. 19B. In this state, the other end 453 of the rack bar 458 and the cushioning member 466 are brought into contact with each other, and the rack bar 458 and the linear motion member 456 integrally move leftward in the drawing.

In the fifth embodiment, when the power transmission ring 206 is concentric, the idle area 470 is provided in the tensioner 450, as shown in FIG. 23. Therefore, the tensioner pulley 403 and the linear motion member 456 are elastically supported by the elastic member 469. As a result, the tensioner 450 can perform the function of a normal autotensioner. It is possible to restrain vibration and tension variation of the belt 102.

The elastic member 469 and the friction member 462 function as a dynamic damper in cooperation with each other. Therefore, it is possible to effectively restrain vibration of the belt 102 and variation of tension on the belt 102 and to reliably prevent the slip and the production of chatter or the like of the belt 102.

In a type in which the tensioner pulley 403 linearly moves, the rack and pinion mechanism is used as the drive transmission mechanism 451. Therefore, the degree of freedom at which the driving source and the pulley can be spaced apart from each other is larger, as compared with that in the above-mentioned swing type. Accordingly, the degree of freedom, of the mounting position increases depending on the layout.

Moreover, the speed efficiency can be further increased, as compared with that in the above-mentioned worm gear mechanism. Therefore, a driving source having relatively small output can be used.

The stepping motor 408 can hold the position for rotation by being stopped. Accordingly, positioning is easy, and a mechanism for holding the position for rotation need not be separately provided. Therefore, the fabrication cost can be made lower, as compared with that in a case where a servomotor or the like is used.

Sixth Embodiment

Figure 25:
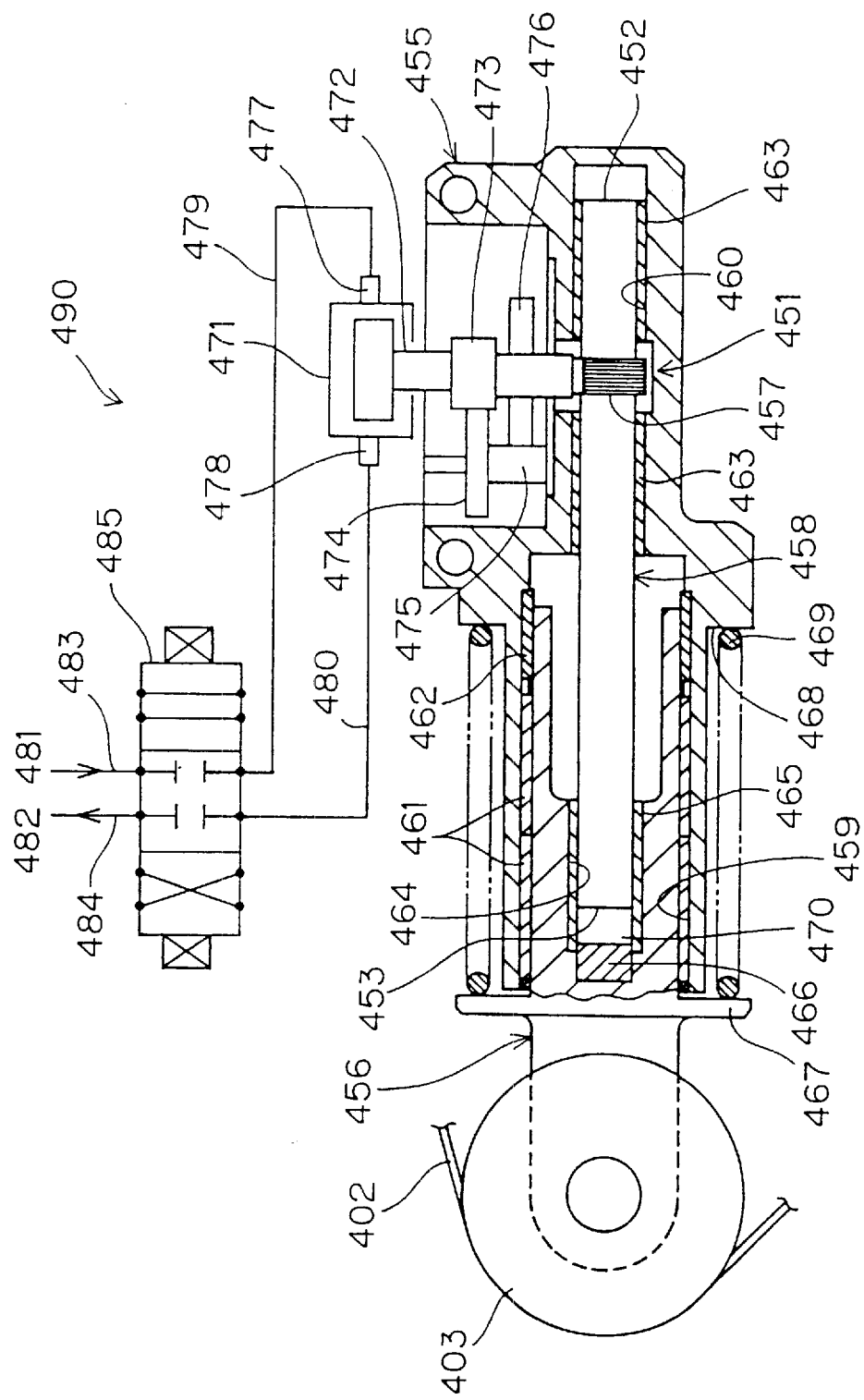
FIG. 25 is a partial sectional front view of a tensioner in a belt type continuously variable speed system according to a sixth embodiment of the present invention.

FIG. 25 illustrates a tensioner in a system according to a sixth embodiment of the present invention. The sixth embodiment differs from the fifth embodiment (shown in FIG. 23) in that a hydraulic motor is used in place of a stepping motor as a driving source.

Specifically, in a tensioner 490, a gear motor constructed by meshing paired gears, for example, can be used as a hydraulic motor 471. A pinion 457 in a drive transmission mechanism 451 (a rack and pinion mechanism) is driven from an output shaft 472 of the hydraulic motor 471 through a first pinion 473, a first spur gear 474, a second pinion 475, and a second spur gear 476.

The first pinion 473 is fixed to the output shaft 472 of the hydraulic motor 471 so as to be integrally rotatable. The first spur gear 474 and the second pinion 475 are connected to each other so as to be integrally rotatable, and are supported so as to be rotatable by a fixed member 455. The pinion 457 engaged with a rack bar 458 and the second spur gear 476 are connected to each other so as to be integrally rotatable, and are supported on the first pinion 473 so as to be relatively rotatable by the fixed member 455.

Paired oil paths 479 and 480 respectively connected to a suction port 477 and a discharge port 478 of the hydraulic motor 471 are connected to each other through a pair of oil paths 483 and 484 and a direction control valve 485 respectively connected to a supply source 481 and a low-pressure side 482 of engine oil carried in a vehicle, for example.

The direction control valve 485 connects the supply source 481 to the suction port 477 of the hydraulic motor 471, and is switched to a first state where the discharge port 478 is connected to the low-pressure side 482, a second state where connection reverse to the connection in the first state is carried out, and a third state where connection to the suction port 477 and the discharge port 478 is cut (corresponding to the state shown in FIG. 25). The other construction is the same as that in the embodiment shown in FIG. 23, and the same reference numerals are assigned and hence, the description thereof is not repeated.

In the sixth embodiment, the relationship between a force produced by an elastic member 469 in the tensioner 490 and the hydraulic motor 471 serving as an actuator to make a power transmission ring 206 eccentric and a force produced by a diaphragm spring 211 serving as an urging member in a variable radius pulley 107 to urge the power transmission ring 206 toward the concentric position is actively changed by the hydraulic motor 471, thereby achieving speed variation.

In the sixth embodiment, the same function and effect as those in the fifth embodiment (shown in FIG. 23) are produced.

In addition thereto, even if a low-pressure hydraulic source is used, high torque can be obtained by the hydraulic motor 471. Therefore, the present embodiment is suitable for a case where the system is incorporated into a vehicle to use a low-pressure power source such as engine oil.

In a case where used as a driving source is one of a linear reciprocating motion type such as a hydraulic cylinder, when a low-pressure driving source is used, the cylinder diameter must be increased. In order to decrease the cylinder diameter, a high-pressure power source is separately required.

When the hydraulic motor 471 serving as a rotary type driving source is used as in the present embodiment, space saving can be achieved.

Seventh Embodiment

FIGS. 26A, 26B, 27 and 28 illustrate a seventh embodiment of the present invention.

A system 500 according to the seventh embodiment comprises a tensioner 503, and a hydraulic cylinder 506 serving as a driving member for driving a tensioner pulley 504 in the tensioner 503 through a wire 505 serving as a transmission member. The tensioner pulley 504 is supported on a fixed member 507 so as to be rotatable by a movable member 508 which is displaceable. Reference numeral 509 denotes an elastic member composed of a helical compression spring, for example, for urging the tensioner pulley 504 in the direction in which tension is given to a belt 102.

A hydraulic cylinder 506 is fixed to a fixed part of a vehicle, for example, the position where there is a sufficient space in an engine room. An end of the wire 505 is fixed to an end of a rod 501 of the hydraulic cylinder 506. Working oil is supplied from a hydraulic pump 553 serving as a hydraulic source carried in the vehicle to the hydraulic cylinder 506. A solenoid valve 554 for supplying and discharging the working oil to and from the hydraulic cylinder 506 is controlled by a controller 555 to which a signal S relating to the rotational speed of a driving source (which may be a detection signal from a speed sensor for detecting the rotational speed of an idler pulley 405, for example) is inputted. The other principal construction is the same as that in the fourth embodiment (shown in FIGS. 19A and 19B).

That is, the relationship between a force produced by an elastic member 509 and the hydraulic cylinder 506 serving as an actuator in the tensioner 503 to make a power transmission ring 206 eccentric and a force produced by a diaphragm spring 211 serving as an urging member of a variable radius pulley 107 to urge the power transmission ring 206 toward the concentric position is actively changed by the hydraulic cylinder 506, thereby achieving speed variation.

Figure 26:
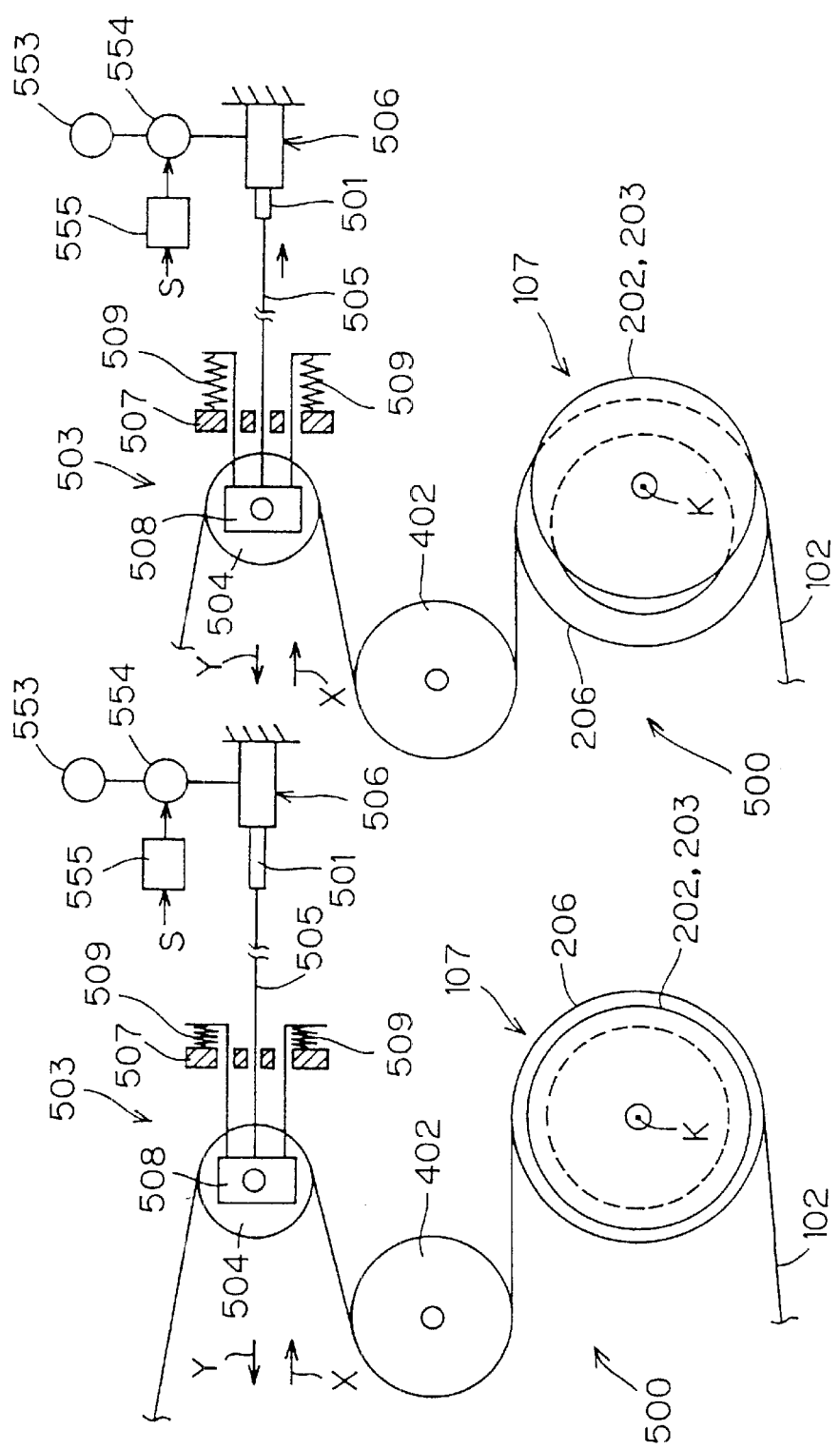
FIGS. 26A and 26B are schematic views of the construction of a belt type continuously variable speed system according to a seventh embodiment of the present invention, where

Specifically, when the rotational speed of the driving source is lower than a predetermined value, the rod 501 of the hydraulic cylinder 506 is extended as shown in FIG. 26A, and the effective radius of the variable radius pulley 107 is made large, to make the rotational speed of an auxiliary machine relatively higher. On the other hand, when the rotational speed of the driving source is higher than the predetermined value, the rod 501 of the hydraulic cylinder 506 is contracted, to draw the belt 102 as shown in FIG. 26B, thereby making the effective radius of the variable radius pulley 107 relatively smaller.

Figure 27:
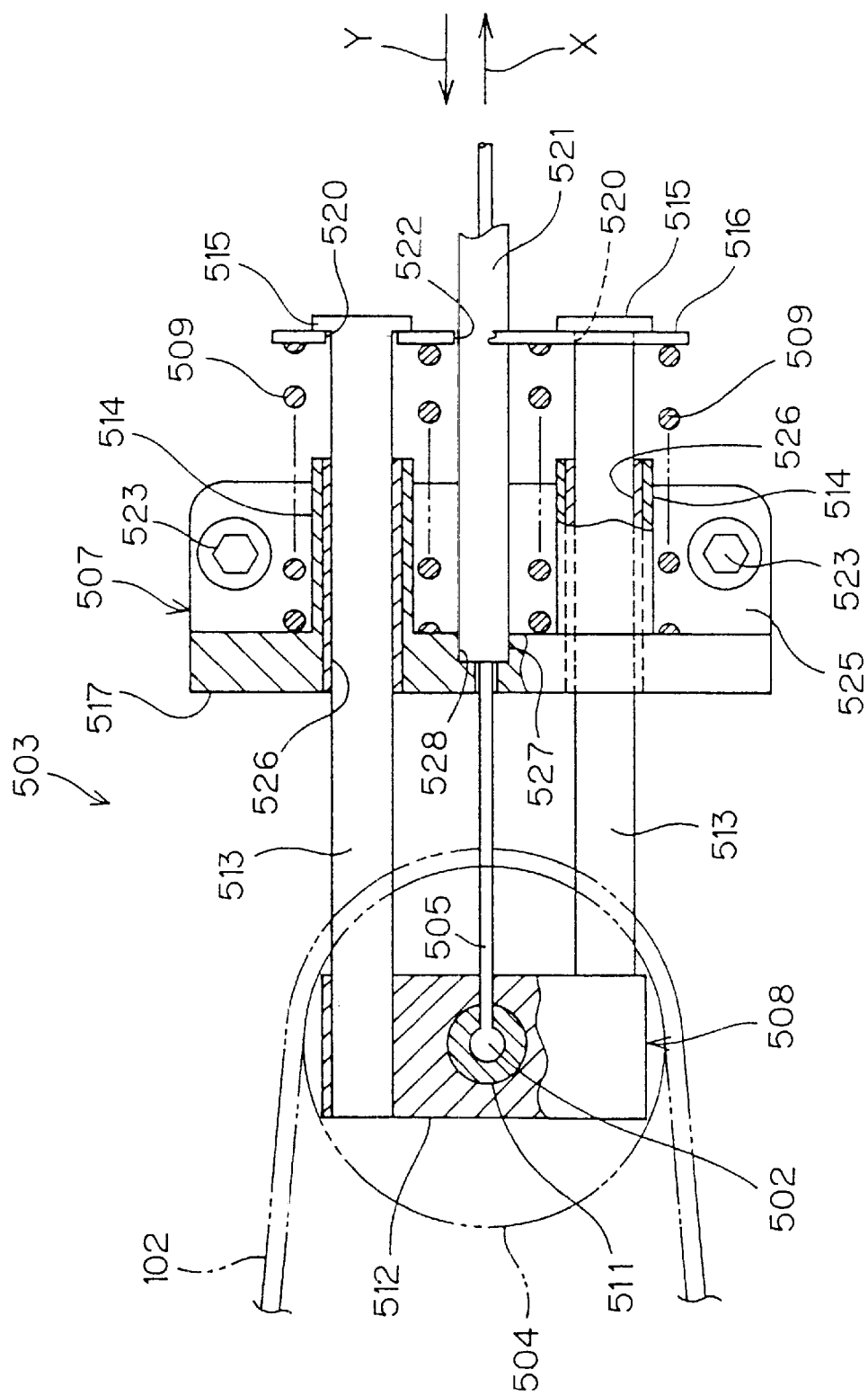
FIG. 27 is a partial sectional front view of a tensioner included in the system shown in FIGS. 26A and 26B.
Figure 28:
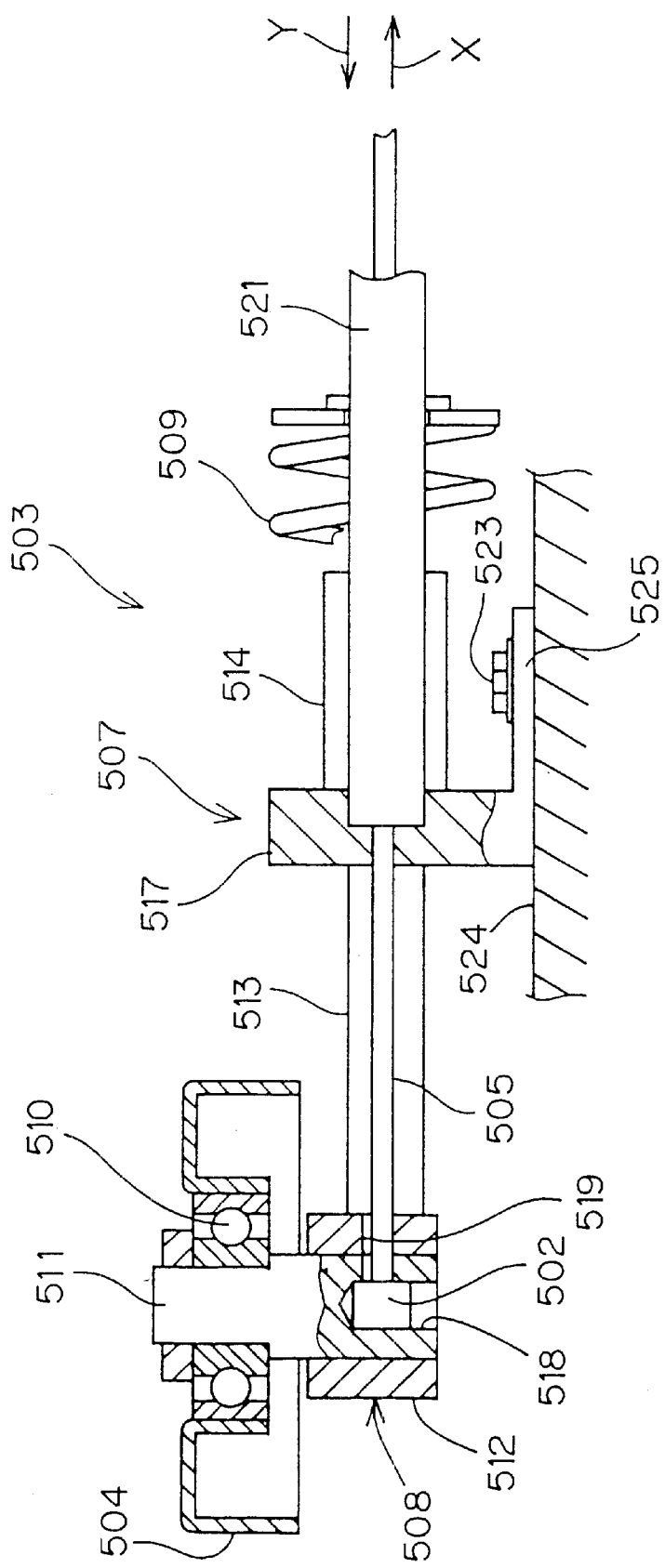
FIG. 28 is a longitudinal sectional view of a principal part of the tensioner shown in FIG. 27.

Referring to FIGS. 27 and 28, the tensioner 503 comprises the fixed member 507 and the movable member 508 supported on the fixed member 507 so as to be linearly movable back and forth. The movable member 508 supports the tensioner pulley 504 around which the belt 102 is wound, to constitute a supporting portion for supporting the tensioner pulley 504 so as to be displaceable in a first direction X in which tension is given to the belt 102 and a second direction Y opposite thereto. The tensioner 503 comprises the pair of elastic members 509 composed of a helical compression spring or the like for urging the tensioner pulley 504 in the first direction X through the variable member 508.

The variable member 508 comprises a supporting shaft 511 having its one end supporting the tensioner pulley 504 so as to be rotatable through a rolling bearing 510 such as a ball bearing, a supporting member 512 to which the other end of the supporting shaft 511 is fixed upon penetrating, and a pair of supporting bars 513 having their one ends fixed to the supporting member 512 upon penetrating.

The supporting bars 513 extend in a first direction X, and are respectively inserted through bushes 526 serving as a slide bearing internally fitted in supporting cylinders 514, described later, in the fixed member 507 so that linear reciprocating motion in the first and second directions X and Y is guided. A flange-shaped stopper 515 is provided at the other end of each of the supporting bars 513, and the above-mentioned elastic members 509 are interposed between a base plate member 516 integrally engaged with both the stoppers 515 and a bracket 517, described later, of the fixed member 507. Consequently, the pair of elastic members 509 elastically urges the movable member 508 and the tensioner pulley 504 integrally in the first direction X through the pair of supporting bars 513.

The other end surface of the supporting shaft 511 has a holding hole 518 containing and holding a large-diameter end member 502 fixed to one end of the wire 505 formed therein. The supporting shaft 511 and the supporting member 512 have a through hole 519, through which the wire 505 is passed, communicating with the holding hole 518 from the side.

The base plate member 516 has a pair of through holes 520 through which the supporting bars 513 are respectively passed, and a through hole 522 through which a cable 521 containing the wire 505 so as to be movable back and forth is passed in an idly fitted state at the center of a portion between the pair of through holes 520.

The fixed member 507 comprises a base 525 fixed to a fixed object 524 by a screw 523 and the bracket 517 rising vertically from an edge on the tensioner pulley 504 side of the base 525. The bracket 517 has a pair of supporting cylinders 514 in which a pair of bushes 526 through which the pair of supporting bars 513 of the movable member 508 is passed is fitted and formed therein so as to extend in the first direction X.

The wire 505 is contained in the cable 521, and one end 527 of the cable 521 is fitted in a cable end fixed hole 528 of the bracket 517 and fixed thereto. When the other end of the wire 505 is pulled by the hydraulic cylinder 506, the length of exposure of the wire 505 from the one end of the cable 521 is decreased. Therefore, the tensioner pulley 504, together with the movable member 508, is pulled in the first direction X, so that the belt 102 is drawn.

In the seventh embodiment, in the belt type continuously variable speed system 500 including the tensioner 504, the hydraulic cylinder 506 serving as a driving member is arranged in a position spaced apart from the tensioner 503 where there is a sufficient space, and the hydraulic cylinder 506 remotely operates the tensioner pulley 504 through the wire 505 serving as a transmission member. Therefore, construction in the vicinity of the tensioner 503 can be simplified. As a result, the tensioner 503 can be freely laid out even in a narrow space. Although in the seventh embodiment, the wire is used as a transmission member, a link mechanism can be also used.

Eighth Embodiment

Figure 29:
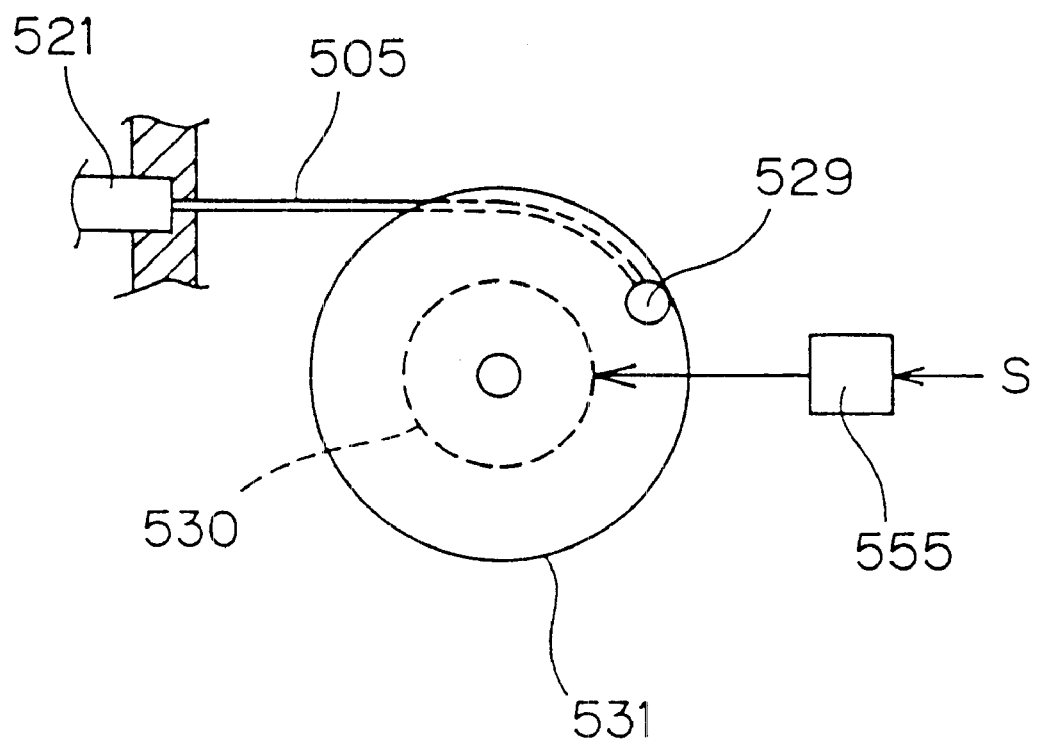
FIG. 29 is a schematic view of a principal part of a tensioner in a belt type continuously variable speed system according to an eighth embodiment of the present invention.

An eighth embodiment shown in FIG. 29 illustrates a modified example of the seventh embodiment shown in FIGS. 26A and 26B. Although the hydraulic actuator is used as a driving member in the seventh embodiment, an electric motor 530 such as a stepping motor capable of controlling rotational angular displacement by a signal from a controller 555, as shown in FIG. 29, is used in the eighth embodiment. In this case, there may be provided a drum 531 around which a wire 505 is wound in a state where the other end member 529 of the wire 505 is locked at a predetermined position on the circumference, to rotate and drive the drum 531 by the electric motor 530.

Ninth Embodiment

Figure 30:
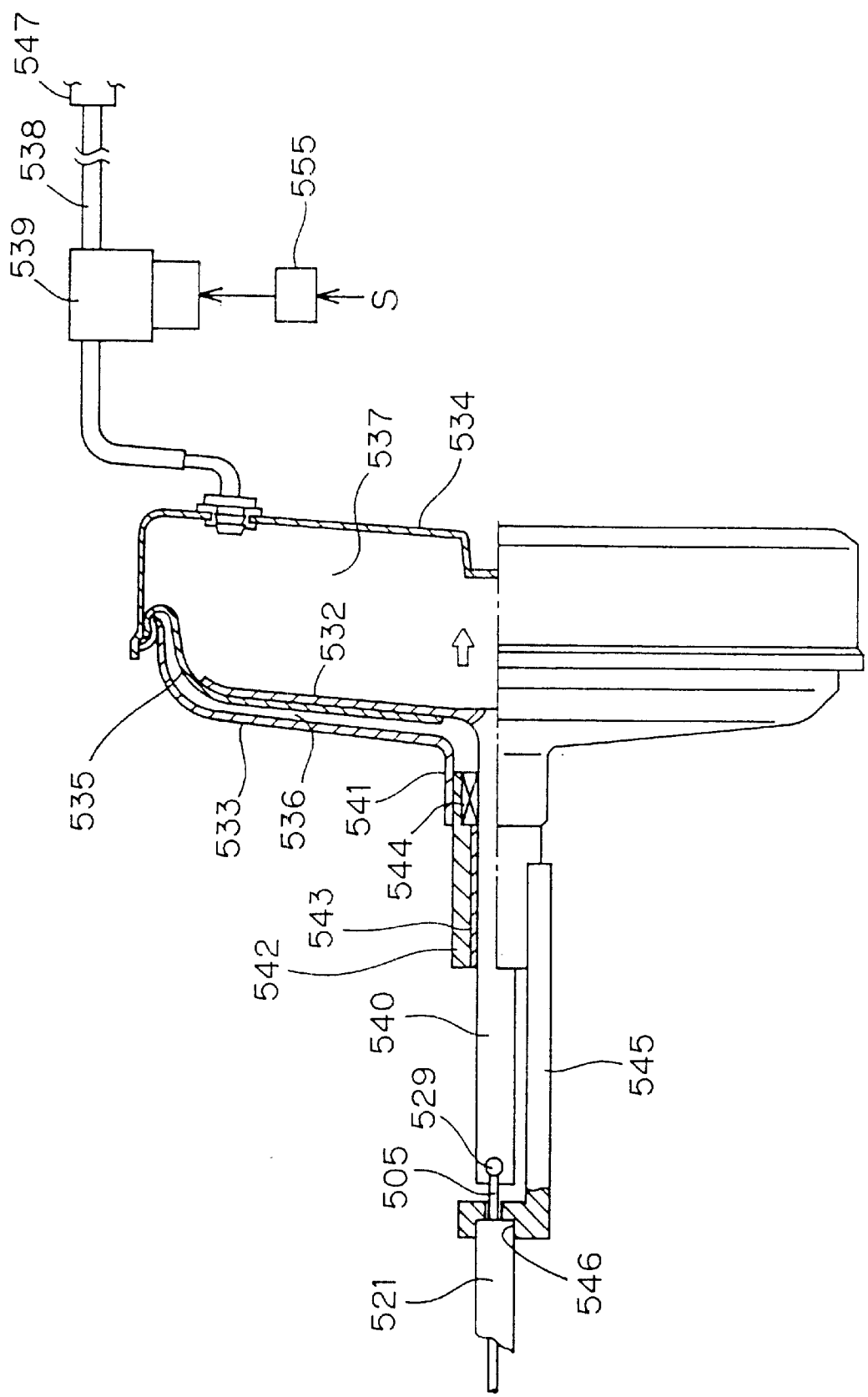
FIG. 30 is a partial sectional side view of a principal part of a tensioner in a belt type continuously variable speed system according to a ninth embodiment of the present invention.

A ninth embodiment shown in FIG. 30 illustrates a modified example of the seventh embodiment shown in FIGS. 26A and 26B. Although the hydraulic actuator is used as a driving member in the seventh embodiment, used as a driving member is one having a pressure receiving member 532 operated by depression at the engine intake manifold, as shown in FIG. 30. Specifically, a space defined inside by combining first and second casings 533 and 534 is partitioned into a first chamber 536 and a second chamber 537 by the pressure receiving member 532 and a membrane 535 having flexibility, and the second chamber 537 communicates with an inlet manifold 547 of an engine through a line 538. A solenoid valve 539 for opening or closing the line 538 is arranged in the line 538. The solenoid valve 539 is controlled by a controller 555 The pressure receiving member 532 has a rod 540 integrally formed therein on the side of the first chamber 536. The rod 540 penetrates a boss 541 of the first casing 533, and an end member 529 of a wire 505 is fixed to an end of the rod 540. Reference numeral 542 denotes a sleeve member fixed to the boss 541. A bush 543 serving as a slide bearing for supporting the rod 540 so as to be slidable and a sealing member 544 are arranged between the sleeve member 542 and the rod 540. Reference numeral 545 denotes a stay fixed to the sleeve member 542. The stay 545 has a fixed hole 546 for fixing an end of a cable 521 of the wire 505.

The membrane 535 has an annular shape, and the inner periphery thereof is fixed to a surface on the first chamber 536 side of the pressure receiving member 532 in an air-tight manner and is folded halfway in the radial direction, while the outer periphery thereof is fixed to a coupling portion between both the casings 533 and 534 in an air-tight manner. The membrane 535 allows the displacement of the pressure-receiving member 532 while partitioning the space into the first chamber 533 and the second chamber 537.

When the solenoid valve 539 is opened, so that the depression at the engine intake manifold is introduced into the second chamber 537, the pressure receiving plate 532 is displaced rightward in the drawing (indicated by a hollow arrow in the drawing). Accordingly, the wire 505 is pulled out of the cable 521 through the rod 540.

In the ninth embodiment, the depression at the engine intake manifold is used as a driving source, thereby eliminating the necessity of a hydraulic pump or the like. Therefore, the fabrication cost can be made low, and power for driving the hydraulic pump can be reduced, which is preferable in terms of energy saving.

Tenth Embodiment

Referring now to FIGS. 31 to 37, description is made of a belt type continuously variable speed system according to a tenth embodiment of the present invention.

Figure 31:
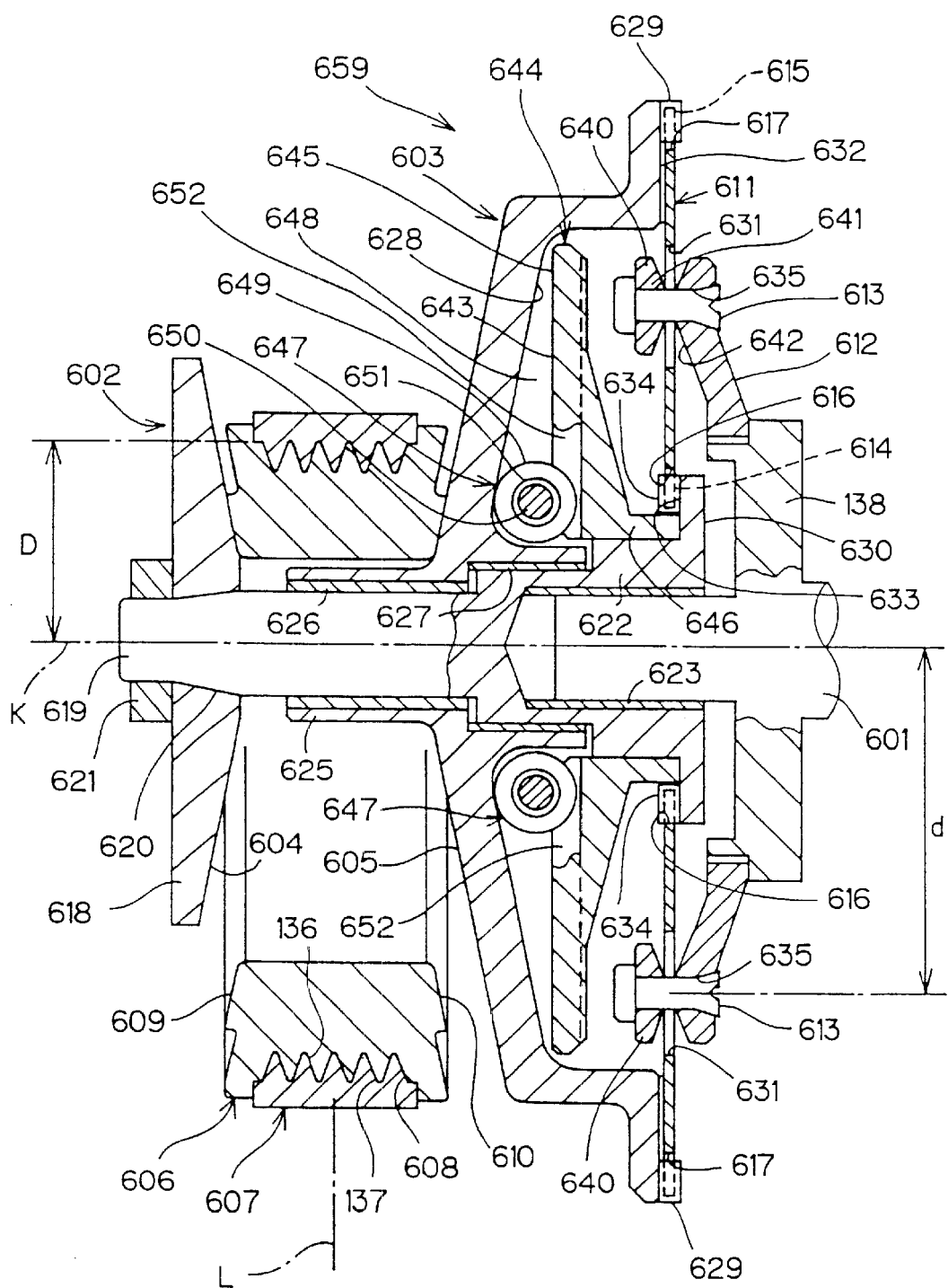
FIG. 31 is a cross-sectional view of a variable radius pulley included in a belt type continuously variable speed system according to a tenth embodiment of the present invention, which illustrates a state where a power transmission ring is eccentric.

FIG. 31 is a cross-sectional view of a variable radius pulley used for a system 600 providing an auxiliary machine driving device. FIGS. 32A and 32B are schematic views showing the construction of a principal part of the system 600.

A variable radius pulley 659 has a power transmission ring 606 which is displaceable from a state where it is eccentric, as shown in FIG. 32A, from an axis of rotation K to be its axis to a state where it is concentric, as shown in FIG. 32B, and can change the effective radius of a belt 102 wound around the power transmission ring 606.

The power transmission ring 606 is interposed between first and second pulley main bodies 602 and 603.

Although the variable radius pulley 659 can be applied to at least one of a driving pulley and a driven pulley, description is made in conformity with an example applied to the driven pulley in the present embodiment. In the system 600, the endless belt 102 is wound around the power transmission ring 606 in the variable radius pulley 659 through a tensioner pulley 656, being displaceable, in a tensioner 655 and a fixed type idler pulley 658. The tensioner 655 comprises an elastic member 657 for urging the power transmission ring 606 in the direction in which the tensioner pulley 656 draws the belt 102. The elastic member 657 attempts to make the power transmission ring 606 eccentric through the belt 102.

On the other hand, the variable radius pulley 659 comprises an urging member for urging the power transmission ring 606 toward the concentric position through the pulley main bodies 602 and 603, described in detail later. The urging member comprises an elastic member (corresponding to a diaphragm spring 611 in FIG. 31) for producing loose-side tension G on the belt 102 through the power transmission ring 606 depending on axial relative displacement between both the pulley main bodies 602 and 603 and an inertia member (corresponding to an inertia member 647 in FIG. 31) for producing loose-side tension H on the belt 102 through the power transmission ring 606 depending on the rotational speed of the variable radius pulley 659.

The power transmission ring 606 and the elastic member 657 in the tensioner 655 are displaced to the position where a resultant force (G+H) of the tension G and the tension H which are respectively produced by the elastic member and the inertia member in the variable radius pulley 659 and tension F on the belt 102 produced by the elastic member 657 in the tensioner 655 are balanced with each other.

The inertia member is displaced in the centrifugal direction depending on the rotational speed, and urges the power transmission ring 606 toward the concentric position through the pulley main bodies 602 and 603. The inertia member functions as a centrifugal type change gear ratio automatic adjusting mechanism for adjusting a change gear ratio depending on the rotational speed.

Specifically, in a state where the traveling speed of the belt 102 is relatively low, the tension H produced by the inertia member is small. In a state where the elastic member 657 in the tensioner 655 is displaced toward the contraction side, and the power transmission ring 606 is displaced toward the eccentric side, as shown in FIG. 32A, therefore, the tension F and the tension (G+H) are balanced with each other. Consequently, the effective radius of the belt 102 is small with respect to the variable radius pulley 659, and the rotational speed of a rotating shaft which is provided with the variable radius pulley 659 is relatively higher than the rotational speed of the driving pulley.

Contrary to this, in a state where the traveling speed of the belt 102 is high, the tension H produced by the inertia member is large. In a state where the elastic member 657 in the tensioner 655 is displaced toward the extension side, and the power transmission ring 606 is displaced toward the concentric side, as shown in FIG. 32B, therefore, the tension F and the tension (G+H) are balanced with each other. Consequently, the effective radius of the belt 102 is large with respect to the variable radius pulley 659, and the rotational speed of the rotating shaft which is provided with the variable radius pulley 659 is relatively lower than the rotational speed of the driving pulley.

FIG. 33 is a graph showing the relationship between the rotational speed of the driving pulley and the rotational speed of the variable radius pulley. In FIG. 33, in an area ① where the rotational speed of the driving pulley is not more than a rotational speed V1, the power transmission ring 606 is eccentric by the maximum amount of eccentricity, and the rotational speed of the. variable radius pulley 659 increases at a predetermined rate of increase. In an area ② from the rotational speed V1 to a rotational speed V2, the amount of eccentricity of the power transmission ring 606 is gradually decreased, to increase the effective radius of the variable radius pulley 659, so that the rate of increase of the rotational speed of the variable radius pulley 659 is lower than that in the area ①. When the rotational speed reaches the rotational speed V2, the power transmission ring 606 enters a concentric state, so that the effective radius of the variable radius pulley 659 becomes the maximum effective radius. In an area ③ where the rotational speed is not less than the rotational speed V2, the rotational speed of the variable radius pulley 659 increases at a slightly lower rate of increase than that in the area ①.

Figure 34:
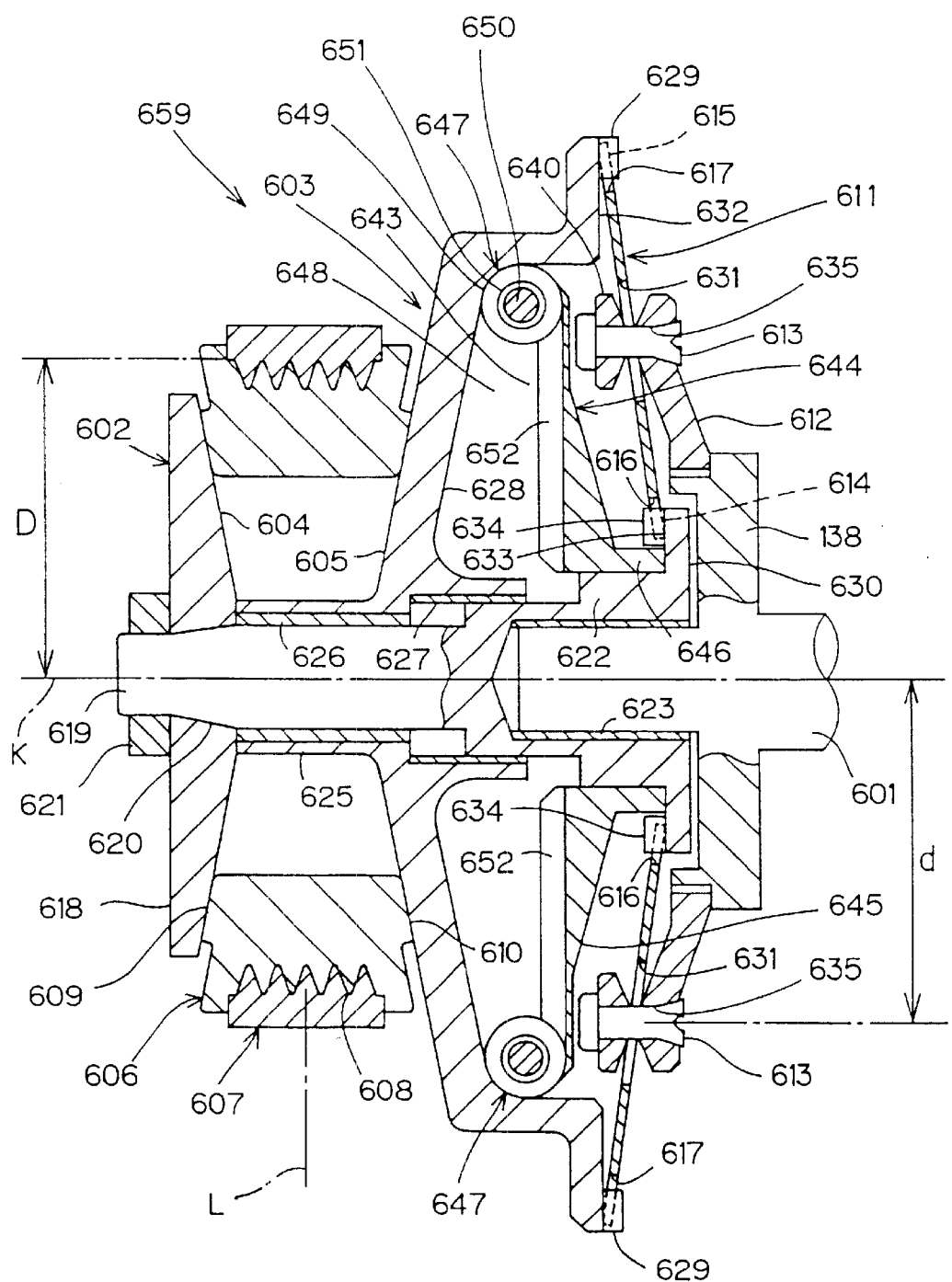
FIG. 34 is a cross-sectional view showing a state where a power transmission ring is in a concentric position in the variable radius pulley shown in FIG. 31.

Referring to FIGS. 31 and 34, the variable radius pulley 659 comprises a rotating shaft 601 which is connected to a rotating shaft of an auxiliary machine of an automobile, for example, so as to be integrally rotatable, and the first and second pulley main bodies 602 and 603 are movable along the axis of the rotating shaft 601 and are in an annular shape. Conical tapered power transmission surfaces 604 and 605 are respectively formed on opposite surfaces of the pulley main bodies 602 and 603. The paired power transmission surfaces 604 and 605 are in tapered shapes which are inclined in opposite directions. The power transmission ring 606 is interposed between the power transmission surfaces 604 and 605 such that it can be eccentric from an axis of rotation K to be the axes of both the pulley main bodies 602 and 603. The power transmission ring 606 is approximately trapezoidal in cross section. FIG. 31 illustrates a state where the power transmission ring 606 is eccentric by the maximum amount of eccentricity, and FIG. 34 illustrates a state where the power transmission ring 606 is in the concentric position. The effective radius D of the belt 102 is changed depending on the displacement of the power transmission ring 606. L denotes the position at the center of the width of the, belt 102 (hereinafter referred to as a belt center L).

A transmission surface 608 to the belt 102 is formed on an outer peripheral surface of the power transmission ring 606, and the belt 102 is wound around the transmission surface 608. A peripheral groove 137 Which is engaged with a rib 136 of the belt 102 is formed on the transmission surface 608.

Both side surfaces of the power transmission ring 606 are respectively brought into contact with the corresponding power transmission surfaces 604 and 605, to constitute power transmission surfaces 609 and 610 for transmitting torque.

The variable radius pulley comprises the diaphragm spring 611 serving as urging means for urging the first and second pulley main bodies 602 and 603 in the directions nearer to each other and serving as first connection means for connecting both the pulley main bodies 602 and 603 so as to be integrally rotatable. The diaphragm spring 611 is connected to a connecting section 612 composed of a conical-shaped annular plate rotating in synchronism with the rotating shaft 601 so as to be integrally rotatable through a plurality of connecting shafts 613. The connecting section 612 and the plurality of connecting shafts 613 constitute second connection means. The inner periphery of the connecting section 612 is coupled by spline to the outer periphery of a flange 138 formed integrally with the rotating shaft 601 so as to be integrally rotatable, and the axial movement thereof is stopped by a snap ring (not shown).

A radially inner portion 614 and a radially outer portion 615 of the diaphragm spring 611 are respectively engaged with the first and second pulley main bodies 602 and 603 so as to be integrally rotatable. Consequently, both the pulley main bodies 602 and 603 and the diaphragm spring 611 rotate integrally with the rotating shaft 601. For example, when the variable radius pulley is applied to the driven pulley as in the present embodiment, torque is transmitted to the rotating shaft in the auxiliary machine from the belt 102 through the power transmission ring 606, both the pulley main bodies 602 and 603, the diaphragm spring 611, and the rotating shaft 601.

Referring to FIGS. 31 to 35, radial connecting grooves 616 and 617 arranged equally spaced in the circumferential direction are respectively formed in the radially inner portion 614 and the radially outer portion 615 of the diaphragm spring 611. In an intermediate portion in the radial direction of the diaphragm spring 611, connecting holes 631, through which the above-mentioned connecting shafts 613 are respectively passed, for connecting the diaphragm spring 611 and the connecting section 612 to each other such that torque can be transmitted are formed equally spaced in the circumferential direction.

Referring to FIG. 31, the first pulley main body 602 comprises a disc 618 having the power transmission surface 604 formed therein and a shaft 619 fixed to the inner periphery of the disc 618 so as to be integrally rotatable and arranged so as to be concentric with the rotating shaft 601. A taper 620 is formed at one end of the shaft 619, and the disc 618 is fixed to the taper 620 by a fitting nut 621.

A cylindrical boss 622 being concentric with the rotating shaft 601 and having a larger diameter than that of the shaft 619 is integrally formed at the other end of the shaft 619. The boss 622 is supported on a peripheral surface of the rotating shaft 601 so as to be axially slidable through a bush 623 serving as a slide bearing.

The second pulley main body 603 comprises a conical disc 624 having the power transmission surface 605 formed therein and a cylindrical boss 625 formed in the inner periphery of the disc 624. The boss 625 in the second pulley main body 603 surrounds respective parts of the shaft 619 and a part of the boss 622 in the first pulley main body 602, and is supported so as to be axially slidable through bushes 626 and 627 serving as slide bearings, respectively, by the shaft 619 and the boss 622 in the first pulley main body 602.

A rear surface 628 of the power transmission surface 605 in the second pulley main body 603 is composed of a conical tapered surface having a bus parallel to the power transmission surface 605. An annular flange 632 which is in an L shape in cross section is integrally extended at an outer peripheral edge of the second pulley main body 603. A plurality of plate-shaped connecting projections 629 respectively fitted in the plurality of connecting grooves 617 in the radially outer portion 615 of the diaphragm spring 611 are radially formed equally spaced in the circumferential direction on a surface on the diaphragm spring 611 side of the annular flange 632. The annular flange 632 in the second pulley main body 603 is pressed by the radially outer portion 615 of the diaphragm spring 611, and the second pulley main body 603 is urged in the direction to be nearer to the first pulley main body 602 (leftward in FIG. 31).

The shaft 619 and the boss 622 in the first pulley main body 602 extend toward the rear surface 628 of the power transmission surface 605 in the second pulley main body 603 upon penetrating the boss 625 in the second pulley main body 603. The boss 622 constitutes a portion extending, toward a rear surface of the second pulley main body 603. At an end of the boss 622 serving as the portion extending toward the rear surface, a connecting section 630 composed of an annular flange for connecting the end and the radially inner portion 614 of the diaphragm spring 611 to each other so as to be integrally rotatable is integrally formed.

The inner periphery of the connecting section 630 is coupled to the end of the boss 622 by a screw, and is fixed so as to be integrally rotatable. Torque transmitted through the connecting section 630 is exerted in the direction in which the screw is tightened, not to loosen the screw.

The connecting section 630 has a pressing surface 633 for axially pressing the radially inner portion 614 of the diaphragm spring 611 formed therein, and a plurality of connecting projections 634 radially formed equally spaced in the circumferential direction is formed on the pressing surface 633. The pressing surface 633 is pressed by the radially inner portions 614 of the diaphragm spring 611. The first pulley main body 602 is urged in the direction to be nearer to the second pulley main body 603 (rightward in FIG. 31) through the connecting section 630, the boss 622, and the shaft 619. Further, the plurality of connecting projections 634 are respectively fitted in the plurality of connecting grooves 616 in the radially inner portion 614 of the diaphragm spring 611.

The connecting section 612 is penetrated in the axial direction by a plurality of through holes 635 formed equally spaced in the circumferential direction. A washer member 640 and the connecting shaft 613 passing through the connecting hole 631 in the diaphragm spring 611 are inserted through and fixed to each of the through holes 635. That is, the diaphragm spring 611 is in a state where it is interposed between the washer member 640 and the connecting section 612 in the vicinity of the connecting hole 631. Portions where the washer member 640 and the connecting section 612 are opposite to the diaphragm spring 611 are respectively formed in conical tapered inclined surfaces 641 and 642, centered around the connecting shaft 613 so as to allow inclination at the time of displacement of the diaphragm spring 611. Each of the connecting shafts 613 is formed in a direction parallel to the axis of the rotating shaft 601, and is fitted in the connecting hole 631 in the diaphragm spring 611, to connect the diaphragm spring 611 and the connecting section 612 such that torque can be transmitted. A headed rivet, for example, can be used as the connecting shaft 613. When the rivet is used, its end is caulked to increase the diameter thereof, thereby making easy fixing possible.

Referring to FIG. 36, the connecting hole 631 is composed of a long hole which is long in the radial direction, and has a pair of engaged surfaces 636 and 637, parallel to each other, which are long along its radius formed on its inner surface, as shown in FIG. 36. On the other hand, the connecting shaft 613 has a cross-sectional shape having a so-called width across flat, and has a pair of engaged surfaces 638 and 639 respectively engaged with the pair of engaged surfaces 636 and 637 of the connecting hole 631.

The pair of engaged surfaces 636 and 637 of the connecting hole 631 is so set as to be longer along the radius of the diaphragm spring 611 than the pair of engaged surfaces 638 and 639 of the corresponding connecting shaft 613. Each of the engaged surfaces 636 and 639. is a surface parallel. to the axis of the diaphragm spring 611 (in a direction perpendicular to FIG. 36) and parallel to the radius thereof (in a vertical direction in FIG. 36). The width between both the engaged surfaces 636 and 637 of the connecting hole 631 is so set as to be approximately equal to the width between both the engaged surfaces 638 and 639 of the connecting shaft 613. The connecting shaft 613 is thus engaged with an inner surface of the connecting hole 631 so as to regulate only displacement in the circumferential direction R of the diaphragm spring 611.

A position along the radius of the connecting hole 631 (indicated by a distance d from the axis of rotation K in FIGS. 31 to 34) is the position where the radially inner portion 614 and the radially outer portion 615 can be displaced in opposite directions by an equal amount of stroke if the axial displacement of the diaphragm spring 611 in the position of the connecting hole 631 is regulated by the connecting shaft 613.

Referring to FIGS. 31 to 34 again, an opposing member 644 having a surface 643 opposite to the rear surface 628 of the second pulley main body 603 is fixed so as to be integrally rotatable on the outer periphery of the boss 622 in the first pulley main body 602. The opposing member 644 has a disc 645 and a boss 646. The boss 646 is fitted in the outer periphery of the boss 622 in the first pulley main body 602. An annular containing space 648 containing the inertia member 647 is defined between the rear surface 628 of the second pulley main body 603 and the opposite surface 643 of the opposing member 644. A portion outside the containing space 648 is defined by the annular flange 632 which is in an L shape in cross section in the second pulley main body 603, and the inside of the containing space 648 is defined by the boss 625 in the second pulley main body 603. The rear surface 628 of the second pulley main body 603 is inclined in a tapered shape, so that the containing space 648 is in a wedge shape in cross section which narrows outward along its radius.

The inertia member 647 is displaced in the circumferential direction (from the state shown in FIG. 31 to the state shown in FIG. 34) in the containing space 648, to urge the power transmission ring 606 to a position which is concentric with the axis of rotation K through both the pulley main bodies 602 and 603 in cooperation with the diaphragm spring 611. Referring to FIGS. 31, 34, and 37, the inertia member 647 comprises the roller 649 composed of a cylinder serving as a rolling member and a supporting shaft member 650 axially penetrating the roller 649.

The inertia member 647 comprises a bearing 651 composed of a bush made of a metal, for example, which is interposed between the supporting shaft member 650 and the roller 649 for allowing relative rotation between the roller 649 and the supporting shaft member 650.

On the opposite surface 643 of the opposing member 644, a guide groove 652 for guiding the rolling movement of the roller 649 is formed in the radial direction in a state where both ends of the supporting shaft member 650 are supported on their edges 653 and 654. An outer peripheral surface of the roller 649 may be subjected to crowing along its axis. The inertia member 647 rotates along with both the pulley main bodies 602 and 603, and produces a centrifugal force which increases as the rotational speed increases. When the inertia member 647 increases the winding radius by the centrifugal force, to move toward a narrow portion of the containing space 648 (outward in the radial direction), both the pulley main bodies 602 and 603 are brought nearer to each other. Accordingly, the power transmission ring 606 is displaced toward the concentric position.

In the tenth embodiment, when the rotational speed of the variable radius pulley 659 changes, the centrifugal force produced by the inertia member 647 contained in the variable radius pulley 659 changes. Therefore, the power transmission ring 606 is automatically displaced to the position where a resultant force of tensions exerted on the belt 607 by the diaphragm spring 611 and the inertia member 647 in the variable radius pulley 659 and tension exerted on the belt 607 by the elastic member 657 in the tensioner 655 are balanced with each other, thereby achieving speed variation.

In simple construction using the centrifugal force produced by the inertia member 647 contained in the variable radius pulley 659, the effective radius D of the variable radius pulley 659 is automatically changed, thereby making it possible to automatically achieve speed variation. Moreover, in the belt type continuously variable speed system 600 using the variable radius pulley 659, a tensioner for adjusting a change gear ratio, a driving mechanism for driving the tensioner, and a mechanism such as a controller for controlling the operation of the driving mechanism need not be used. The use of a general receiving type tensioner 655 (a so-called auto-tensioner) is sufficient. Therefore, the construction of the system can be significantly simplified, so that the fabrication cost and the space for arrangement can be reduced.

The inertia member 647 has the roller 649 which rolls to the rear surface 628 of the second pulley main body 603 for defining the containing space 648. Accordingly, the inertia member 647 can be smoothly displaced. As a result, it is possible to prevent the occurrence of situations where the inertia member 647 does not move upon being held in the containing space 648.

Furthermore, the connecting section 612 serving as the second connection means collectively connects both the pulley main bodies 602 and 603 to the rotating shaft 601 through the diaphragm spring 611 serving as the first connection means. Therefore, the construction of the system can be simplified, as compared with that in a case where the pulley main bodies 602 and 603 are individually connected to the rotating shaft 601.

The diaphragm spring 611 for connecting both the pulley main bodies 602 and 603 so as to be integrally rotatable is also used as an urging member, so that the construction of the system can be simplified. Since the diaphragm spring 611 can directly urge both the pulley main bodies 602 and 603, both the pulley main bodies 602 and 603 can be smoothly displaced. As a result, smooth speed variation is possible.

Both the pulley main bodies 602 and 603 respectively connected to the radially inner portion 614 and the radially outer portion 615 of the diaphragm spring 611 can be symmetrically displaced in the axial direction by an equal amount of displacement. Therefore, the belt center L can be kept constant while achieving smooth speed variation in simple construction.

The diaphragm spring 611 is deflected as both the pulley main bodies 602 and 603 are displaced. If the radially inner portion 614 and the radially outer portion 615 differ in axial displacement, however, the connecting shaft 613 allows the axial displacement in a part of the connecting hole 631 in the diaphragm spring 611. Therefore, no excessive stress is produced in the vicinity of the connecting hole 613. As a result, it is possible to improve the durability of the diaphragm spring 611. The center of the power transmission ring 606 always coincides with the position of the belt center L, so that no vibration and abnormal friction occur in the power transmission ring 606.

Particularly in the present embodiment, the connecting shaft 613 is brought into contact with the pair of engaged surfaces 636 and 637 which are long along the radius of the connecting hole 631. Therefore, a wide contact area can be ensured, and stress imposed on the diaphragm spring 611 can be further reduced. As a result, it is possible to further improve the durability.

Both the pulley main bodies 602 and 603 are displaced to a position which is balanced with the actual belt center L by following displacement along the width of the belt 102. Therefore, smooth speed variation becomes possible in simple construction.

When a large width across flat of the connecting shaft 613 is ensured in order to ensure the contact area, the flexural rigidity of the connecting shaft 613 is secondarily increased. Accordingly, the fall of the connecting shaft 613 at the time of applying torque can be prevented. As a result, the fall can prevent an adverse effect exerted on the diaphragm spring 611 and the connecting hole 631.

In the present embodiment, the axial displacement in the vicinity of the connecting hole 631 of the diaphragm spring 611 can be also regulated by the connecting shaft 613. In this case, a universal joint may be interposed between the connecting shaft 613 and the connecting hole 631.

Eleventh Embodiment

Figure 38:
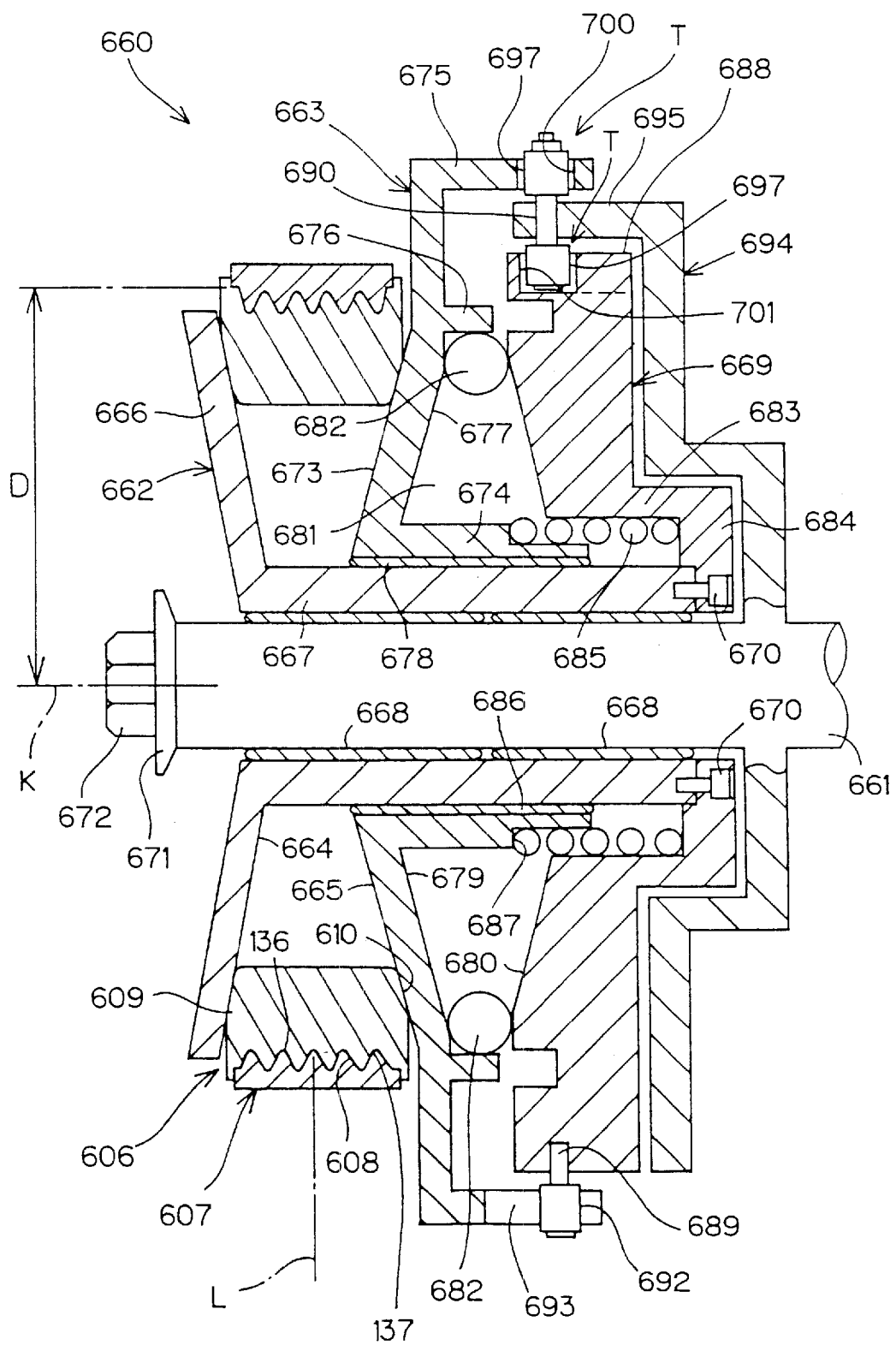
FIG. 38 is a cross-sectional view of a variable radius pulley included in a belt type continuously variable speed system according to a tenth embodiment of the present invention, which illustrates a state where a power transmission ring is in a concentric position.

FIGS. 38, 39 and 40 illustrate an eleventh embodiment of the present invention. Referring to FIG. 38, a variable radius pulley 660 in a system providing an auxiliary machine driving device mainly differs from the variable radius pulley shown in FIG. 31 in the tenth embodiment in the following items 1) to 3). That is:

1) Although in the embodiment shown in FIG. 31, the first connection means for connecting both the pulley main bodies 602 and 603 to each other so as to be integrally rotatable is constituted by the diaphragm spring 611, and is also used as the elastic member for urging both the pulley main bodies 602 and 603 in the directions to be nearer to each other by the diaphragm spring 611, first connection means is constituted by a plurality of connecting shafts 689 and 690 for connecting an opposing member 669 fixed to a first pulley main body 662 and a second pulley main body 663, while an elastic member is composed of a helical compression spring 685 interposed between the second pulley main body 663 and the opposing member 669 in the eleventh embodiment.

2) Although in the embodiment shown in FIG. 31, symmetrical displacement of both the pulley main bodies 602 and 603 in the axial direction is achieved by setting a position d along the radius of the connecting hole 631 of the diaphragm spring 611 to a required position, it is achieved by respectively engaging rollers 697 provided at both ends of the connecting shaft 690 included in the first connection means with cam surfaces 700 and 701 respectively formed in the first pulley main body 662 and the opposing member 669 in the eleventh embodiment. The cam surfaces 700 and 701 and the rollers 697 serving as cam followers respectively engaged with the corresponding cam surfaces 700, and 701 constitute a pair of conversion mechanisms T (also referred to as torque cam mechanisms) for respectively converting rotational angular displacements of the pulley main bodies 662 and 663 from a rotating shaft 661 into axial displacements in opposite directions.

3) In the eleventh embodiment, an inertia member and a rolling member are constituted by balls 682. More specifically, referring to FIG. 38, the variable radius pulley 660 comprises the first and second annular pulley main bodies 662 and 663 which are rotatable around the rotating shaft 661 and are axially movable, and power transmission surfaces 664 and 665 are respectively formed in opposite surfaces of the pulley main bodies 662 and 663. The power transmission surfaces 664 and 665 are in tapered shapes which are inclined in opposite directions. A power transmission ring 606 which is approximately trapezoidal in cross section is interposed such that it can be eccentric from an axis K of both the pulley main bodies 662 and 663 by both the power transmission surfaces 664 and 665. FIG. 38 illustrates a state where the power transmission ring 606 is concentric with the axis K.

The first pulley main body 662 comprises a conical disc 666 and a cylindrical boss 667 formed in the inner periphery of the disc 666. A disc 666 has the above-mentioned power transmission surface 664 formed therein. The boss 667 is supported so as to be slidable in the axial direction through bushes 668 serving as a slide bearing on a peripheral surface of the rotating shaft 661. An end of the boss 667 is integrally coupled to the opposing member 669, described later, by a screw 670. Reference numeral 671 denotes a stopper for preventing the first pulley main body 662 from slipping off the rotating shaft 661. The stopper 671 is fixed to the rotating shaft 661 by a nut 672 which is screwed into an end of the rotating shaft 661. The second pulley main body 663 comprises an annular plate 673 in such a shape that a disc extends in the outer periphery of a conical plate with a hole, a boss 674 serving as an inner cylinder extending in the inner periphery of the annular plate 673, an outer cylinder 675 extending in the outer periphery of the annular plate 673, and an intermediate cylinder 676 formed in an intermediate portion in the radial direction of the annular plate 673. Any of the boss 674, the outer cylinder 675, and the intermediate cylinder 676 are so formed as to extend toward a rear surface 677 of the power transmission surface 665 in the second pulley main body 663. The boss 674 in the second pulley main body 663 is supported on an outer peripheral surface of the boss 667 in the first pulley main body 662 so as to be axially movable toward the direction of the shaft through a bush 678 serving as a slide bearing.

The opposing member 669 is composed of an annular member, and has a tapered surface 680 opposite to a tapered portion 679 of the rear surface 677 of the second pulley main body 663. A containing space 681 is formed by the tapered section 679 of the rear surface 677 and the opposite surface 680 of the opposing member 669 between the boss 674 and the intermediate cylinder 676 in the second pulley main body 663.

The plurality of balls 682 serving as an inertia member and a rolling member are contained in a containing space 681. The containing space 681 is in a wedge shape in cross section which narrows outward along its radius, and can bring both the pulley main bodies 662 and 663 nearer to each other by the displacement of the balls 682 in the centrifugal direction as a centrifugal force increases.

The opposing member 669 has an inner cylinder 688 on the inside in the radial direction of the opposite surface 680, and an annular end surface 684 of the inner cylinder 683 is fixed to an end of the boss 667 in the first pulley main body 662 by the screw 670. Consequently, the opposing member 669 rotates integrally with the first pulley main body 662 and moves integrally therewith in the axial direction.

The helical compression spring 685 is contained as an elastic member for urging both the pulley main bodies 662 and 663 in the directions to be nearer to each other in the inner cylinder 683 of the opposing member 669. An end (a left end in the drawing) of the helical compression spring 685 is engaged with a stepped portion 687 of the boss 674 in a state where it is fitted in a small diameter portion 686 at an end of the boss 674 in the second pulley main body 663, and presses and urges the second pulley main body 663 toward the first pulley main body 662 through the stepped portion 687. On the other hand, the other end (a right end in the drawing) of the helical compression spring 685 is engaged with the end surface 684 of the inner cylinder 683 of the opposing member 669, and presses and urges the first pulley main body 662 toward the second pulley main body 663 through the end surface 684. The expansion and contraction of the helical compression spring 685 are guided by the inner cylinder 683 of the opposing member 669 and the small diameter portion 686 of the boss 674 in the second pulley main body 663. Therefore, the helical compression spring 685 can be smoothly displaced.

The outer periphery 688 of the opposing member 669 and the outer cylinder 675 in the second pulley main body 663 are connected to each other so as to be integrally rotatable through the plurality of connecting shafts 689 and 690, arranged in the radial direction, serving as the first connection means. The connecting shaft 689 has its one end fixed to the outer periphery 688 of the opposing member 669 and has the other end on which a roller 692 is supported so as to be rotatable through a bush 691 (see FIG. 39). The roller 692 is fitted and engaged such that it can roll in a guide groove 693, formed in the outer cylinder 675 in the second pulley main body 636, parallel to the rotating shaft 661 and having an opened end.

Figure 40A:
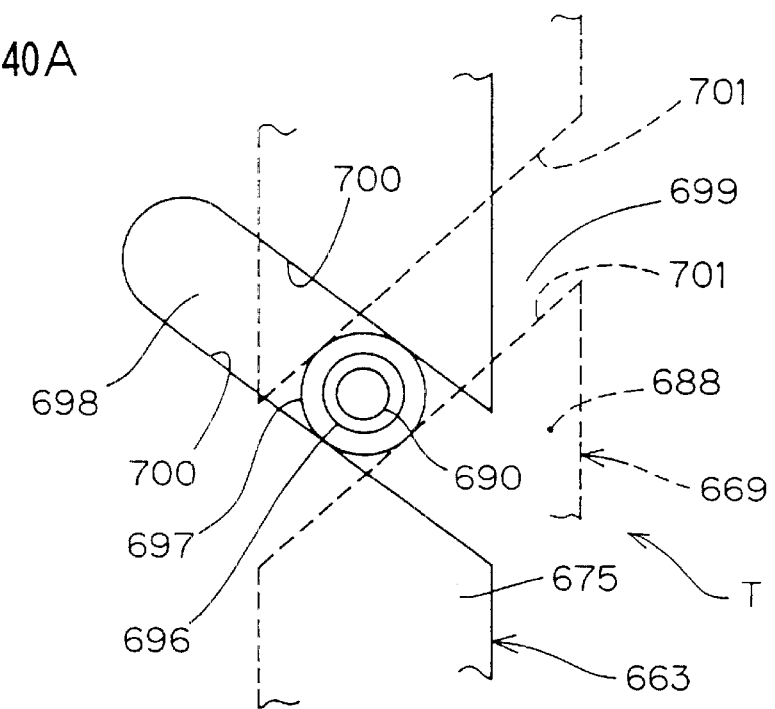
FIGS. 40A and 40B are schematic views showing a second pulley main body, an opposing member, and a connecting shaft with a roller for connecting the second pulley main body and the opposing member in the variable radius pulley shown in FIG. 38, where FIG. 40A corresponds to a state where a power transmission ring is in a concentric position, and FIG. 40B corresponds to a state where the power transmission ring is eccentric.
Figure 40B:
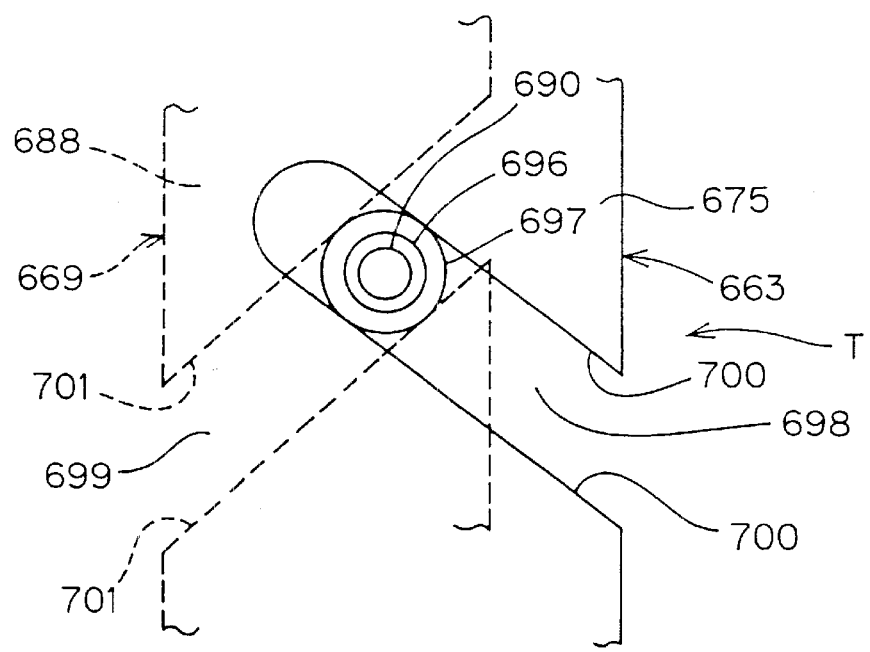

On the other hand, an intermediate portion of the connecting shaft 690 is fixed upon penetrating an outer cylinder 695 of a connecting section 694 serving as second connection means in the radial direction, which is in a two-stage cylindrical shape, integrally formed around the rotating shaft 66,1. Referring to FIGS. 38, 40A and 40B, rollers 697 are respectively supported on both ends of the connecting shaft 690 so as to be rotatable through the bushes 696. The rollers 697 are respectively fitted and engaged such that they can roll in a guide groove 698 formed in the outer cylinder 675 in the second pulley main body 663 and a guide groove 699 formed in the outer cylinder 695 of the opposing member 669. The guide grooves 698 and 699 are inclined in opposite directions, and cam surfaces 700 and 701 are respectively constituted by inner surfaces of the guide grooves 698 and 699, as shown in FIGS. 40A and 40B. The cam surfaces 700 and 701 respectively convert, when both the pulley main bodies 662 and 663 produce rotational angular displacements from the rotating shaft 661 depending on load torque to the variable radius pulley 660, the rotational angular displacements into axial displacements produced by both the pulley main bodies 662 and 663 so that both the pulley main bodies 662 and 663 are axially displaced by an equal amount of displacement in opposite directions, as shown in FIGS. 40A and 40B (a so-called torque cam mechanism). Consequently, the position of a belt center L is kept constant irrespective of speed variation. FIG. 40A corresponds to the state shown in FIG. 38 where the power transmission ring 606 is in a concentric position, and FIG. 40B corresponds to a state where the power transmission ring 606 is eccentric.

In the eleventh embodiment, the same components as those in the tenth embodiment (shown in FIG. 31) are assigned the same reference numerals and hence, the description thereof is not repeated.

According to the present embodiment, the power transmission ring 606 is automatically displaced to the position where a resultant force (G+H) of tension given to the belt 102 by the helical compression spring 685 serving as an elastic member and the ball 682 serving as an inertia member and tension F given to the belt 102 by an elastic member 657 in a tensioner 655 are balanced with each other. Therefore, the effective radius D of the variable radius pulley 660 is automatically changed in simple construction utilizing a centrifugal force produced by the inertia member composed of the contained ball 682, thereby making it possible to achieve automatic speed variation.

Furthermore, the ball 682 also used as a rolling member is used as an inertia member, thereby making it possible to further simplify the construction of the system as well as to prevent the occurrence of situations where the inertia member does not move upon being held in the containing space 681. When variable load torque is exerted, both the pulley main bodies 662 and 663 are brought nearer to each other by the functions of the cam surfaces 700 and 701 included in the conversion mechanism (the torque cam mechanism) T, so that a force to clamp the power transmission ring 606 can be increased. Therefore, it is possible to prevent the occurrence of slip between the power transmission ring 606 and the power transmission surfaces 664 and 665 of both the pulley main bodies 662 and 663. As a result, efficient power transmission is possible.

Furthermore, the cam surfaces 700 and 701 are provided on inner surfaces of the guide grooves 698 and 699, to roll the rollers 6971 at both ends of the connecting shaft 690. Therefore, relative rotation of both the pulley main bodies 662 and 663 from the rotating shaft 661 can be smoothly converted into axial displacement. As a result, smooth speed variation can be achieved.

Since both the pulley main bodies 662 and 663 can be symmetrically displaced in the axial direction by the functions of the cam surfaces 700 and 701, the belt center L can be kept constant irrespective of the speed variation.

The present invention is not limited to the above-mentioned embodiments. For example, the present invention can be also employed as a belt type continuously variable speed system of a general machine in addition to one carried in an automobile.

What is claimed is:

1. A belt type continuously variable speed system, comprising
   a variable radius pulley for changing the effective radius of a wound endless belt; and
   a tensioner for adjusting tension on the belt;
   wherein the variable radius pulley comprises i) first and second pulley main bodies arranged around a rotating shaft and axially movable, ii) first and second tapered power transmission surfaces formed on opposite surfaces of the first and second pulley main bodies, iii) a power transmission ring interposed between the first and second power transmission surfaces such that the power transmission ring can be eccentric from an axis of the rotating shaft and having the belt wound around an outer peripheral surface of the power transmission ring, and iv) first urging means for urging the power transmission ring toward a position which is concentric with the axis through the first and second pulley main bodies, wherein the tensioner comprises i) a fixed member, ii) a movable member which relatively moves from the fixed member, iii) a tensioner pulley supported so as to be rotatable by the movable member and engaged with the belt, and iv) second urging means for urging the tensioner pulley through the movable member in a direction in which the tension is given to the belt, wherein at least one of the first and second urging means comprises means for changing a position where the power transmission ring operates, wherein a force produced by the second urging means to make the power transmission ring eccentric from the axis through the belt and a force produced by the first urging means to urge the power transmission ring toward the position which is concentric with the axis are balanced with each other, so that the position where the power transmission ring operates is defined, wherein the second urging means comprises an elastic member for giving the tension to the belt through the tensioner pulley, and an actuator for actively changing the position where the tension pulley operates through the variable member so as to adjust the tension on the belt, wherein the actuator is composed of a hydraulic actuator, and wherein the tensioner comprises a hydraulic pump driven by the tensioner pulley for supplying the working oil to the hydraulic actuator, and a clutch for cutting driving connection between the tensioner pulley and the hydraulic pump, the position where the tensioner pulley operates being changed-by an operation of the clutch.

2. The belt type continuously variable speed system according to claim 1, wherein the hydraulic pump is provided coaxially with the tensioner pulley and is driven by a rotation of the tensioner pulley, the movable member is composed of a member which is swingable around a predetermined axis, and the hydraulic actuator swings the movable member by receiving supply of the working oil from the hydraulic pump, to change the position where the tensioner pulley operates.

3. The belt type continuously variable speed system according to claim 2, wherein the hydraulic pump is connected to the hydraulic actuator through a discharge-side oil path and a return-side oil path, a check valve allowing only a flow of the working oil toward the hydraulic actuator is arranged in the discharge-side oil path, and a portion, positioned on the hydraulic actuator side of the check valve, of the discharge-side oil path is connected to the return-side oil path through a communication path having a chock.

4. A belt type continuously variable speed system, comprising a variable radius pulley for changing the effective radius of a wound endless belt; and a tensioner for adjusting tension on the belt, wherein the variable radius pulley comprises i) first and second pulley main bodies arranged around a rotating shaft and axially movable, ii) first and second tapered power transmission surfaces formed on opposite surfaces of the first and second pulley main bodies, iii) a power transmission ring interposed between the first and second power transmission surfaces such that the power transmission ring can be eccentric from an axis of the rotating shaft and having the belt wound around an outer peripheral surface of the power transmission ring, and iv) first urging means for urging the power transmission ring toward a position which is concentric with the axis through the first and second pulley main bodies, wherein the tensioner comprises i) a fixed member, ii) a movable member which relatively moves from the fixed member, iii) a tensioner pulley supported so as to be rotatable by the movable member and engaged with the belt, and iv) second urging means for urging the tensioner pulley through the movable member in a direction in which the tension is given to the belt, wherein at least one of the first and second urging means comprises means for changing a position where the power transmission ring operates, wherein a force produced by the second urging means to make the power transmission ring eccentric from the axis through the belt and a force produced by the first urging means to urge the power transmission ring toward the position which is concentric with the axis are balanced with each other, so that the position where the power transmission ring operates is defined, wherein the second urging means comprises an elastic member for giving the tension to the belt through the tensioner pulley, and an actuator for actively changing the position where the tension pulley operates through the variable member so as to adjust the tension on the belt, wherein at least one of the first and second urging means comprises means for changing a position where the power transmission ring operates, wherein a force produced by the second urging means to make the power transmission ring eccentric from the axis through the belt and a force produced by the first urging means to urge the power transmission ring toward the position which is concentric with the axis are balanced with each other, so that the position where the power transmission ring operates is defined, and wherein the actuator is composed of a hydraulic actuator;

further comprising locking means for fixing a position where the tensioner pulley operates so as to be releasable, wherein the actuator is composed of a hydraulic actuator, and wherein the locking mechanism comprises means for inhibiting the working oil from flowing. into and out of the hydraulic actuator.

5. The belt type continuously variable speed system according to claim 4, further comprising a hydraulic circuit for controlling a flow of the working oil into and out of the hydraulic actuator.

6. The belt type continuously variable speed system according to claim 5, wherein the hydraulic circuit comprises valve means which is switchable to a state where the flow of the working oil into and out of the hydraulic actuator is allowed through chock means.

7. The belt type continuously variable speed system according to claim 6, wherein the hydraulic circuit comprises a check valve arranged in parallel with the chock means, the check valve allowing only a flow of the working oil caused by a displacement of the tensioner pulley in a direction in which the tension on the belt is increased.

8. The belt type continuously variable speed system according to claim 6, wherein the tensioner comprises a hydraulic pump that drives a flow of the working oil into and out of the hydraulic actuator, the hydraulic circuit comprises a first path for feeding the working oil to the hydraulic actuator through the check valve from the hydraulic pump and a second path provided in parallel with the first path, and the valve means is arranged in the second path and is switchable to a state where the flow of the working oil from the hydraulic actuator is inhibited through the second path.

9. The belt type continuously variable speed system according to claim 6, wherein the valve means is composed of a solenoid valve, and contains the chock means.

10. The belt type continuously variable speed system according to claim 6, wherein the hydraulic actuator comprises a hydraulic chamber contracting as the tensioner pulley is displaced in a direction in which the tension on the belt is decreased, the chock means being arranged in a path communicating with the hydraulic chamber.

11. The belt type continuously variable speed system according to claim 6, wherein the valve means is arranged in parallel with the chock means and is switchable to a state where a flow of the working oil to and from the hydraulic actuator is allowed while avoiding the chock means.

12. The belt type continuously variable speed system according to claim 6, further comprising detection means for detecting an amount relating to generation of vibration of the belt, and means for controlling an operation of the valve means in response to an amount relating to the generation of the vibration of the belt which is detected by the detection means.

13. The belt type continuously variable speed system according to claim 12, wherein the detection means for detecting the amount relating to the generation of the vibration of the belt comprises means for detecting a number of revolutions of a driving source of a vehicle.

14. A belt type continuously variable speed system comprising:

a variable radius pulley for changing the effective radius of a wound endless belt; and a tensioner for adjusting tension on the belt;

wherein the variable radius pulley comprises i) first and second pulley main bodies arranged around a rotating shaft and axially movable, ii) first and second tapered power transmission surfaces formed on opposite surfaces of the first and second pulley main bodies, iii) a power transmission ring interposed between the first and second power transmission surfaces such that the power transmission ring can be eccentric from an axis of the rotating shaft and having the belt wound around an outer peripheral surface of the power transmission ring, and iv) first urging means for urging the power transmission ring toward a position which is concentric with the axis through the first and second pulley main bodies, wherein the tensioner comprises i) a fixed member, ii) a movable member which relatively moves from the fixed member, iii) a tensioner pulley supported so as to be rotatable by the movable member and engaged with the belt, and iv) second urging means for urging the tensioner pulley through the movable member in a direction in which the tension is given to the belt, wherein at least one of the first and second urging means comprises means for changing a position where the power transmission ring operates, wherein a force produced by the second urging means to make the power transmission ring eccentric from the axis through the belt and a force produced by the first urging means to urge the power transmission ring toward the position which is concentric with the axis are balanced with each other, so that the position where the power transmission ring operates is defined, wherein the variable radius pulley is provided in either one of an output shaft connecting with a driving source of an automobile and a drive shaft of an auxiliary machine, and wherein the tensioner pulley is engaged with a slack portion of the belt.

15. The belt type continuously variable speed system according to claim 14, wherein the second urging means comprises an elastic member for giving the tension to the belt through the tensioner pulley, and an actuator for actively changing the position where the tension pulley, operates through the variable member so as to adjust the tension on the belt.

16. The belt type continuously variable speed system according to claim 15, wherein a force produced by the elastic member in the tensioner to make the power transmission ring eccentric through the belt is smaller than the force produced by the first urging means in the variable radius pulley to urge the power transmission ring toward the position which is concentric with the axis.

17. The belt type continuously variable speed system according to claim 15, wherein the actuator is composed of a hydraulic actuator.

18. The belt type continuously variable speed system according to claim 17, further comprising a hydraulic pump provided outside the tensioner for supplying working oil to the hydraulic actuator, and valve means for supplying and discharging the working oil from the hydraulic pump to the hydraulic actuator.

19. A belt type continuously variable speed system, comprising a variable radius pulley for changing the effective radius of a wound endless belt; and a tensioner for adjusting tension on the belt;

wherein the variable radius pulley comprises i) first and second pulley main bodies arranged around a rotating shaft and axially movable, ii) first and second tapered power transmission surfaces formed on opposite surfaces of the first and second pulley main bodies, iii) a power transmission ring interposed between the first and second power transmission surfaces such that the power transmission ring can be eccentric from an axis of the rotating shaft and having the belt wound around an outer peripheral surface of the power transmission ring, and iv) first urging means for urging the power transmission ring toward a position which is concentric with the axis through the first and second pulley main bodies, wherein the tensioner comprises i) a fixed member, ii) a movable member which relatively moves from the fixed member, iii) a tensioner pulley supported so as to be rotatable by the movable member and engaged with the belt, and iv) second urging means for urging the tensioner pulley through the movable member in a direction in which the tension is given to the belt, wherein at least one of the first and second urging means comprises means for changing a position where the power transmission ring operates, wherein a force produced by the second urging means to make the power transmission ring eccentric from the axis through the belt and a force produced by the first urging means to urge the power transmission ring toward the position which is concentric with the axis are balanced with each other, so that the position where the power transmission ring operates is defined, and wherein the variable radius pulley further comprises a mechanism for correlating the first and second pulley main bodies to each other such that the first and second pulley main bodies are displaced by amounts of displacement which are equal to each other in opposite directions along the axis of the rotating shaft.

20. The belt type continuously variable speed system according to claim 19, wherein the mechanism for correlating the first and second pulley main bodies comprises a diaphragm spring having a radially inner portion and radially outer portion respectively engaged with the corresponding pulley main bodies so as to be integrally rotatable and having a predetermined radially intermediate portion connected to the rotating shaft through a connection means such that the diaphragm spring can transmit power to the rotating shaft, and the first urging means comprises the diaphragm spring.

21. The belt type continuously variable speed system according to claim 19, wherein the second urging means comprises an elastic member for giving the tension to the belt through the tensioner pulley, and an actuator for actively changing the position where the tension pulley operates through the variable member so as to adjust the tension on the belt.

22. The belt type continuously variable speed system according to claim 21, wherein a force produced by the elastic member in the tensioner to make the power transmission ring eccentric through the belt is smaller than the force produced by the first urging means in the variable radius pulley to urge the power transmission ring toward the position which is concentric with the axis.

23. The belt type continuously variable speed system according to claim 21, wherein the actuator is composed of a hydraulic actuator.

24. The belt type continuously variable speed system according to claim 23, further comprising a hydraulic pump provided outside the tensioner for supplying working oil to the hydraulic actuator, and valve means for supplying and discharging the working oil from the hydraulic pump to the hydraulic actuator.

* * * * *